United States Patent [19]

Borland et al.

[11] 4,326,190

[45] Apr. 20, 1982

[54] BOUNDARY TRACE SLOPE FEATURE DETECTION SYSTEM

[76] Inventors: David L. Borland, 400 Britain Ct., Irving, Tex. 75062; Lyle W. Shaw, 127 Skyline Dr., Plano, Tex. 75074

[21] Appl. No.: 938,271

[22] Filed: Aug. 30, 1978

[51] Int. Cl.³ .............................................. G06K 9/48
[52] U.S. Cl. ................ 340/146.3 AE; 340/146.3 AC
[58] Field of Search ........... 340/146.3 AE, 146.3 AC, 340/146.3 MA; 364/416

[56] References Cited

U.S. PATENT DOCUMENTS

| | | | |
|---|---|---|---|
| 3,766,520 | 10/1973 | Patterson | 340/146.3 AE |
| 4,075,605 | 2/1978 | Hilley et al. | 340/146.3 MA |
| 4,093,941 | 6/1978 | Bryan et al. | 340/146.3 AE |
| 4,097,845 | 6/1978 | Bacus | 364/416 |
| 4,097,847 | 6/1978 | Forsen et al. | 340/146.3 AE |

OTHER PUBLICATIONS

Stevens, "Automatic Char. Rec., State of the Art Report", *N.B.S. Technical Note No. 112*, May, 1961 pp. 98–101, 123–130.

*Primary Examiner*—Leo H. Boudreau

[57] ABSTRACT

A character feature detection system is provided for reliably reading alphanumeric characters. An information field is scanned by sensor array and the sensor responses are digitized to form a binary character image. The image is traced from boundary point to boundary point. A transition from one boundary point to another is defined by one of eight equally divergent vectors which are indicative of the local slope of a boundary between connected points. The sequence of vectors in their xy locations recorded in the boundary slopes are indicated by averaging vectors representative of the cell to cell transition. Character features are detected from the sequence of boundary slopes to form a feature set. The feature decision logic analyzes the primary features to form a set of secondary features based upon the occurrence and order of the features. The set of secondary features are then analyzed in a sequential logic decision tree to identify the character.

5 Claims, 78 Drawing Figures

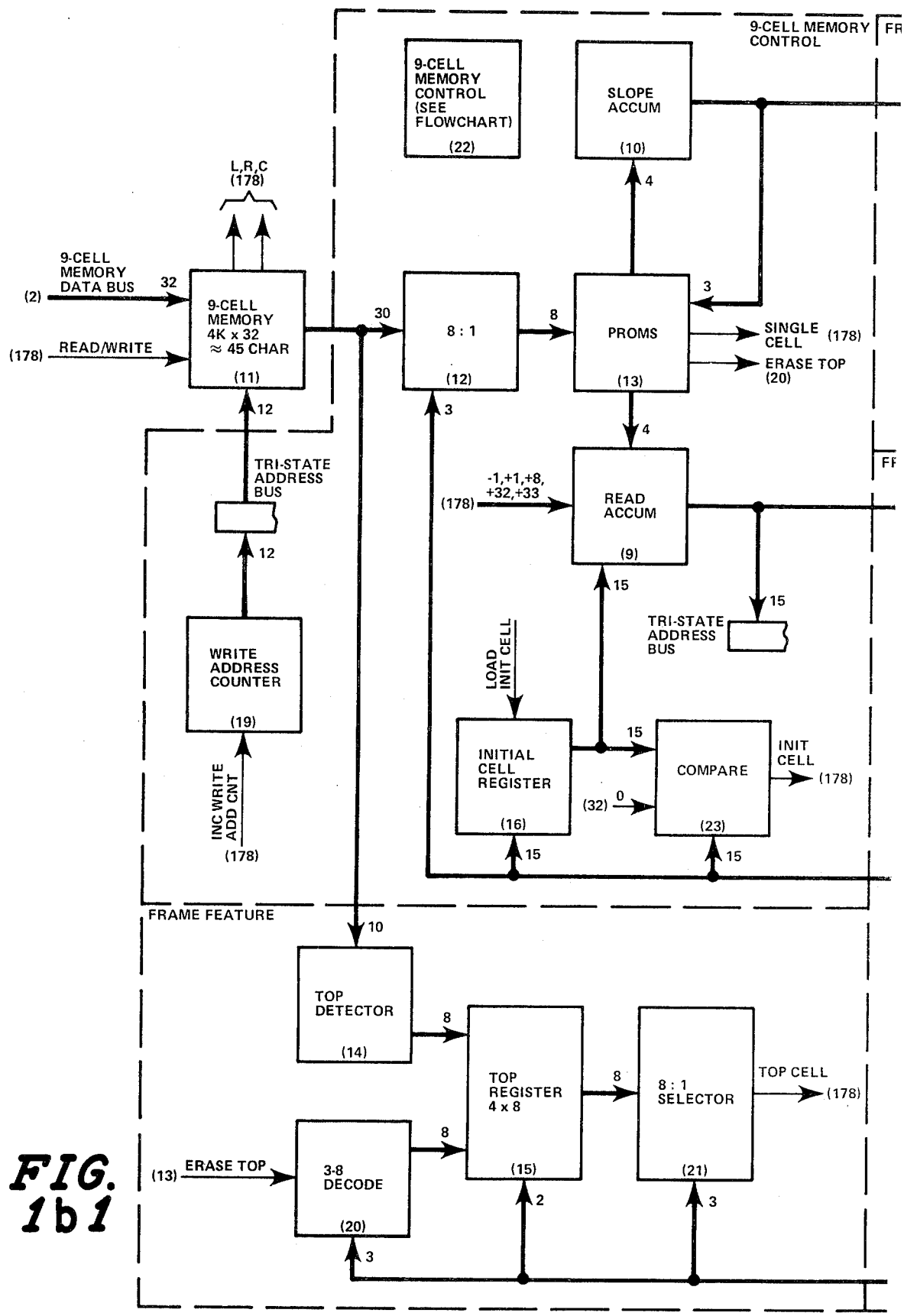
FIG. 1b1

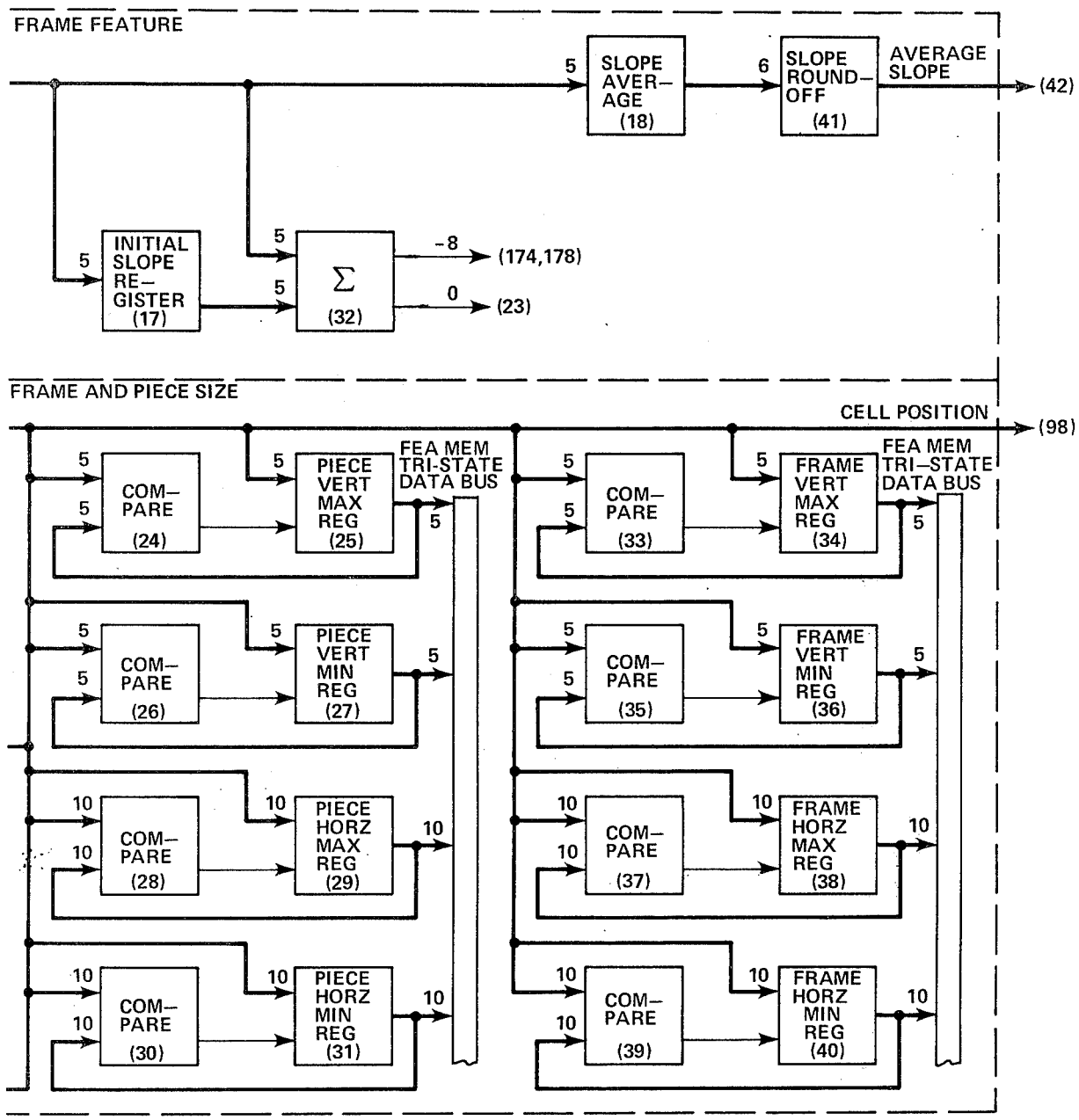
FIG. 1b2

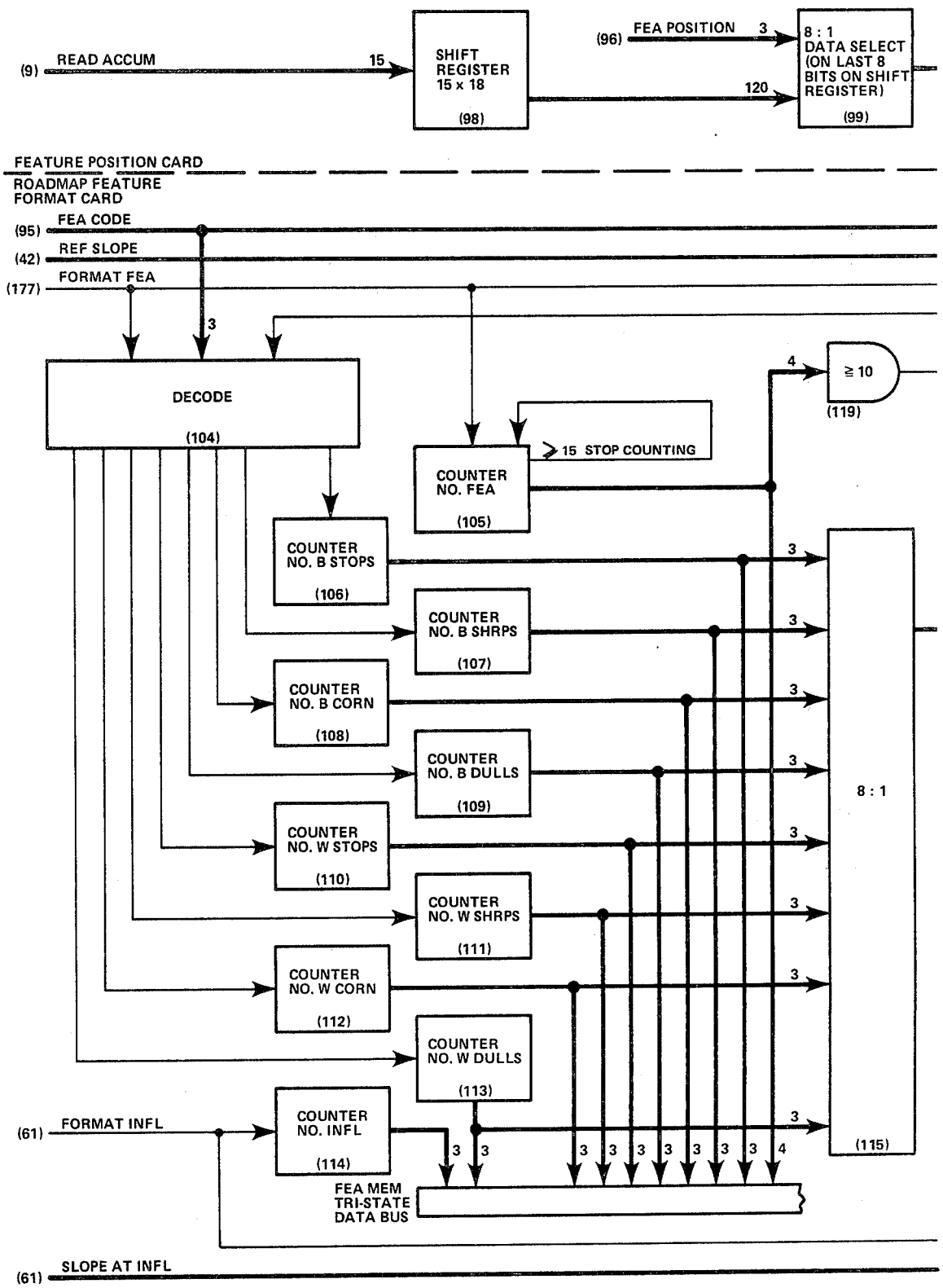
FIG. 1e1

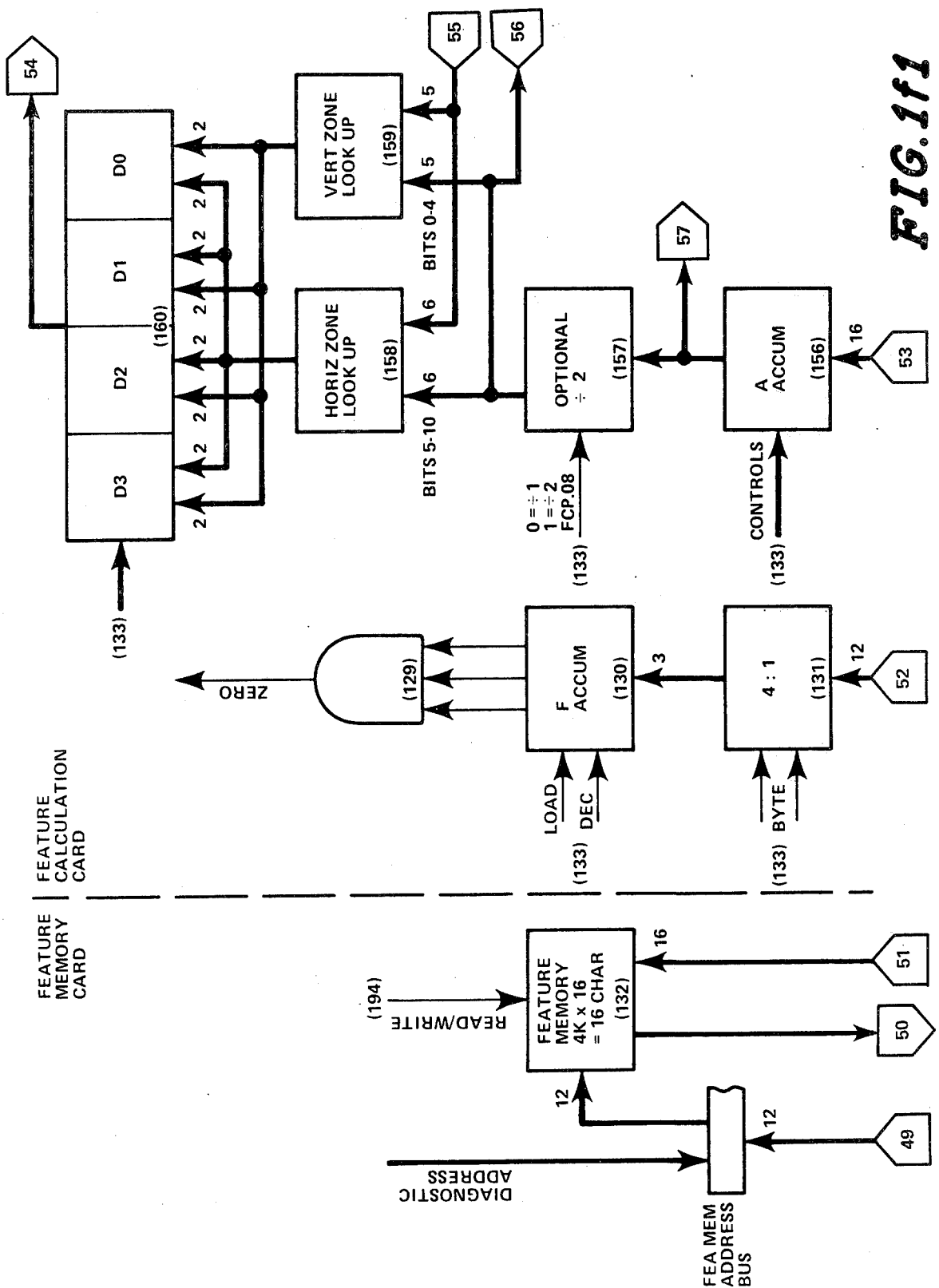
FIG.1f1

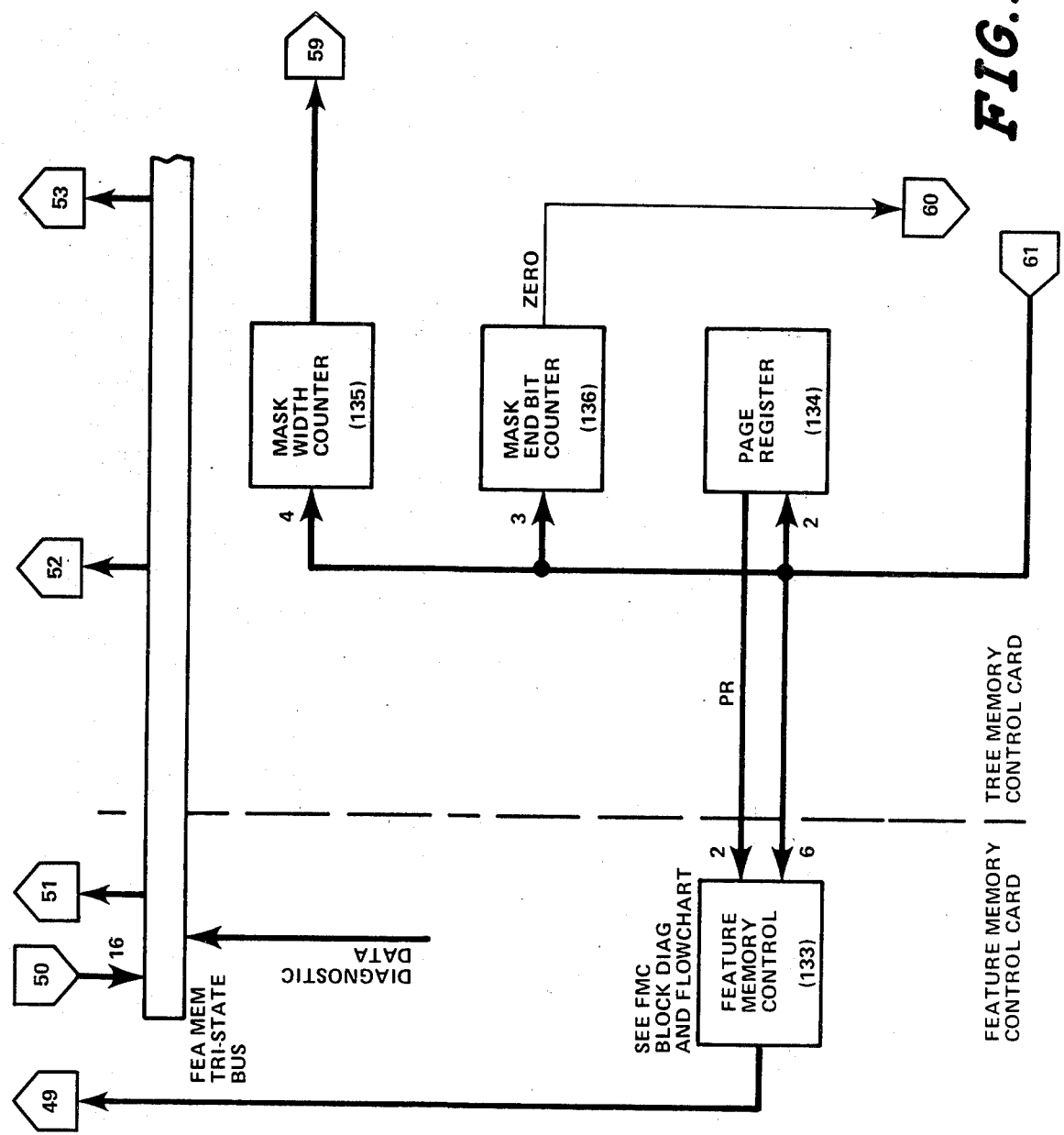

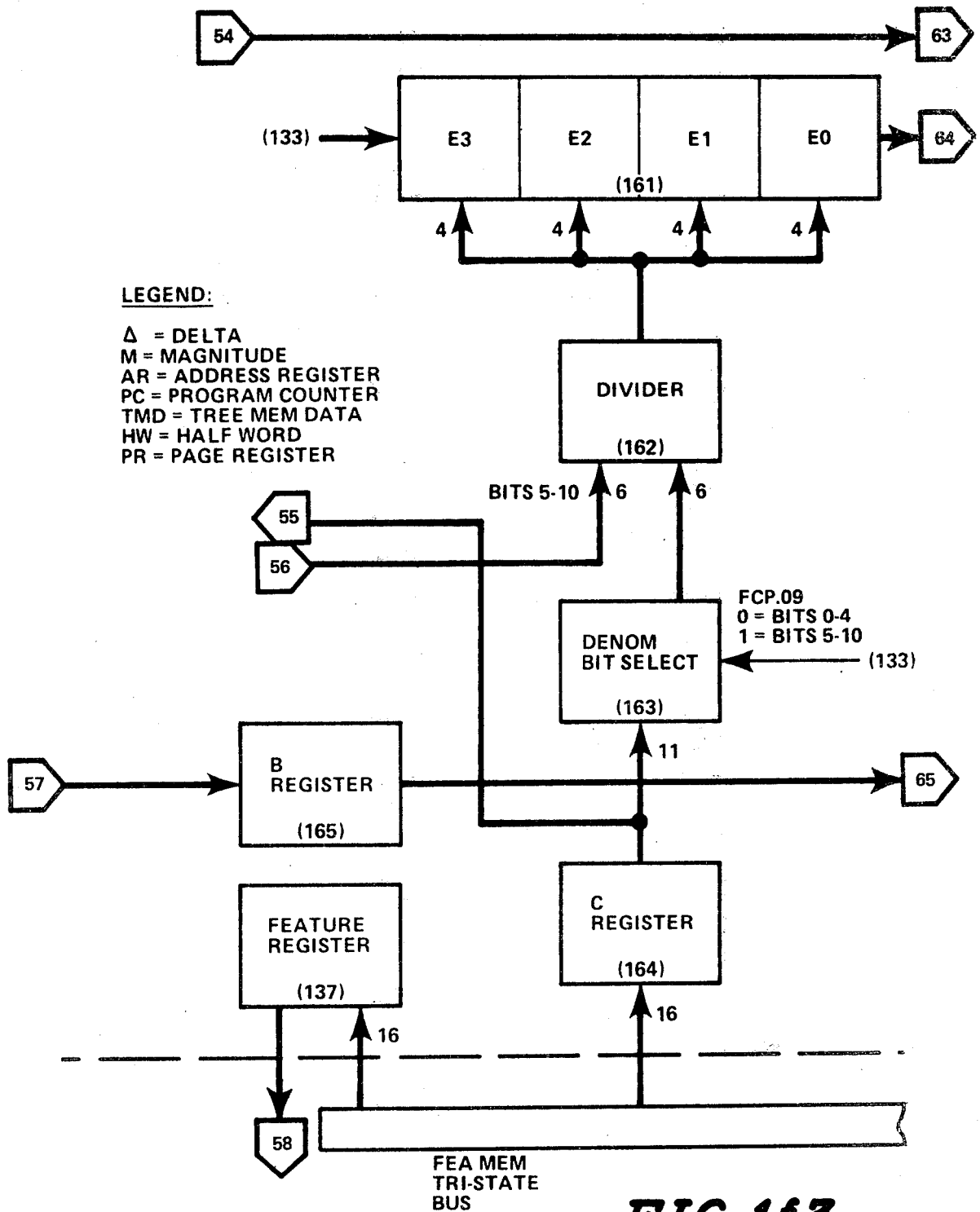
FIG.11/3

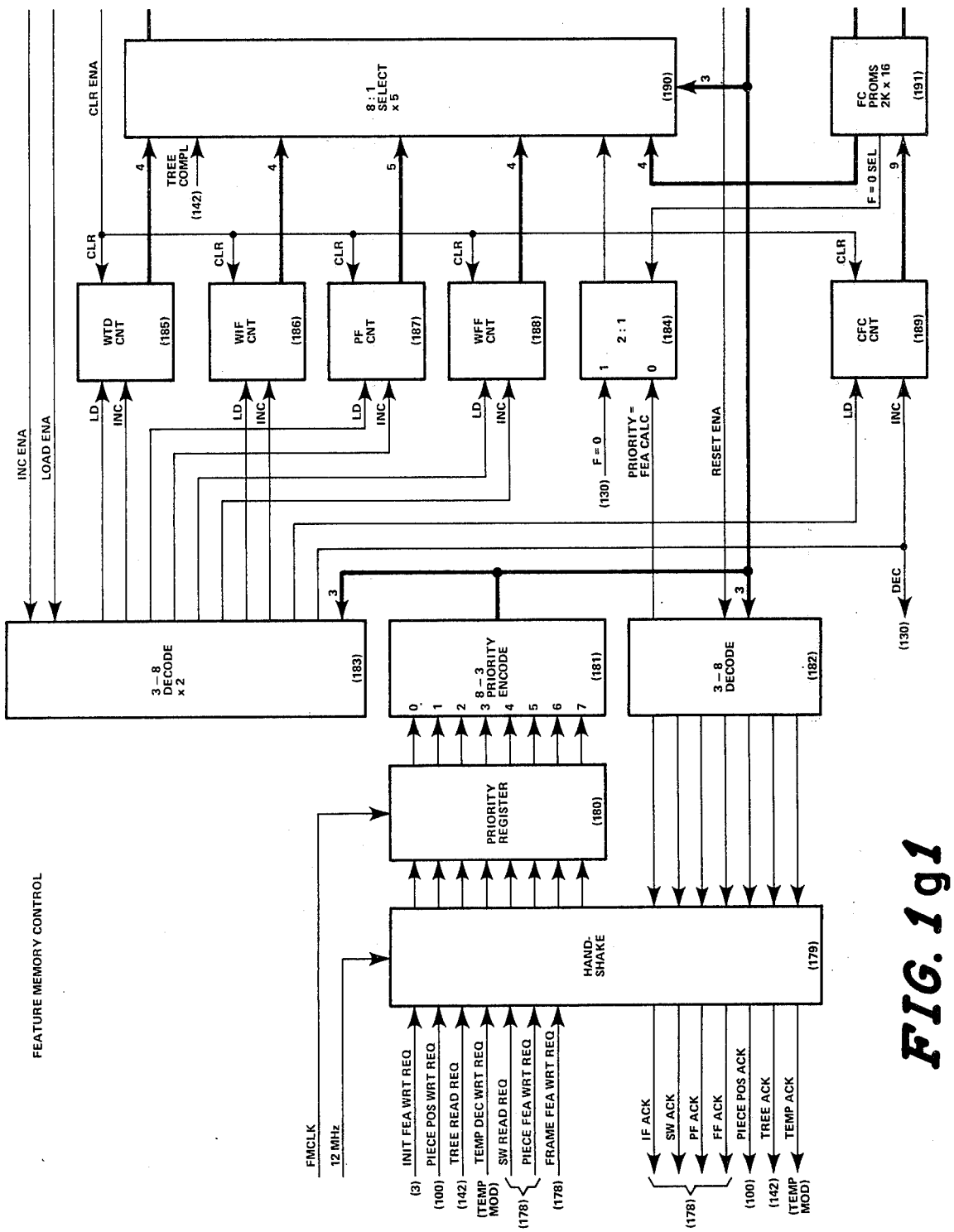
FIG. 1g1

```
23                            23
22        *                   22 } 1  ← SIXTH DIGIT NOT
21                            21 } 0     SHIFTED IN
20      *****                 20 ]
19     *******                19 } 1
18     *******                18 ]
17     *****  ***             17 ]
16     *****   ****           16 ]
15     ****    ****           15 } 2
14     ****    ****           14 ]
13     *****   ****           13 ]
12 *****************          12 } 1
11 ******       ******        11 ]
10 *****         *****        10 } 2
09 ****           ****        09 ]
08 ***             ***        08 ]
07                            07
```

```
1111111110000000000
8765432109876543210
```
```
   1    2 3   1
```

HORIZONTAL STAR = 21210
VERTICAL STAR   = 01321

```
                            ┌─ SLOPE = 0
       2211111111110000000000
       10987654321098765432l0
                    26                   26
                    25                   25
                    24                   24
                    23      *****        23
                    22      ******       22 ── SLOPE = 1
SLOPE = 7 ─ 21      ********     21
            20      **********   20
            19      *****  *****  19
            18      *****   *****  18
            17      ******   ****  17
            16      *****    *****  16 ── SLOPE = 2
            15      ****      ****  15
            14      ****      *****  14
            13      ******************  13
            12      ******************  12
            11      ******      *****  11
SLOPE = 6 ─ 10      *****       ****  10
            09      ****        ***   09
            08                        08
            07                        07
       2211111111110000000000
       10987654321098765432l0
            SLOPE = 4 ─┘   └─ SLOPE = 5
                     └─ SLOPE = 3
```

FIG. 6

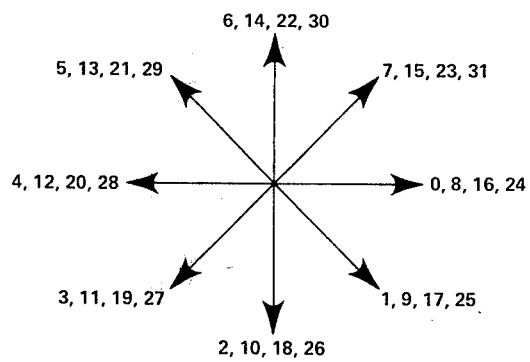
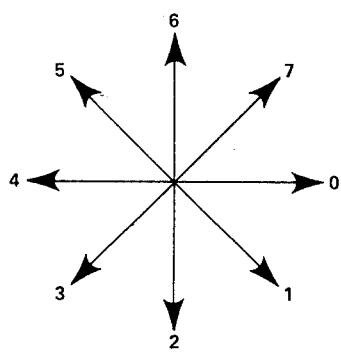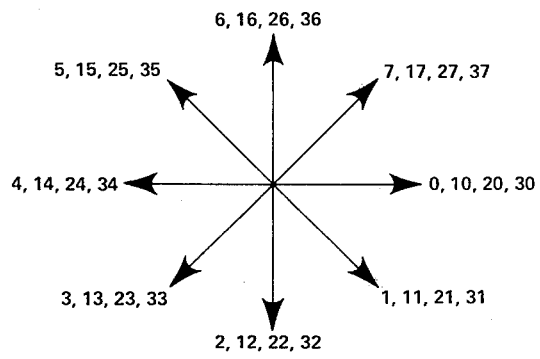
FIG. 5

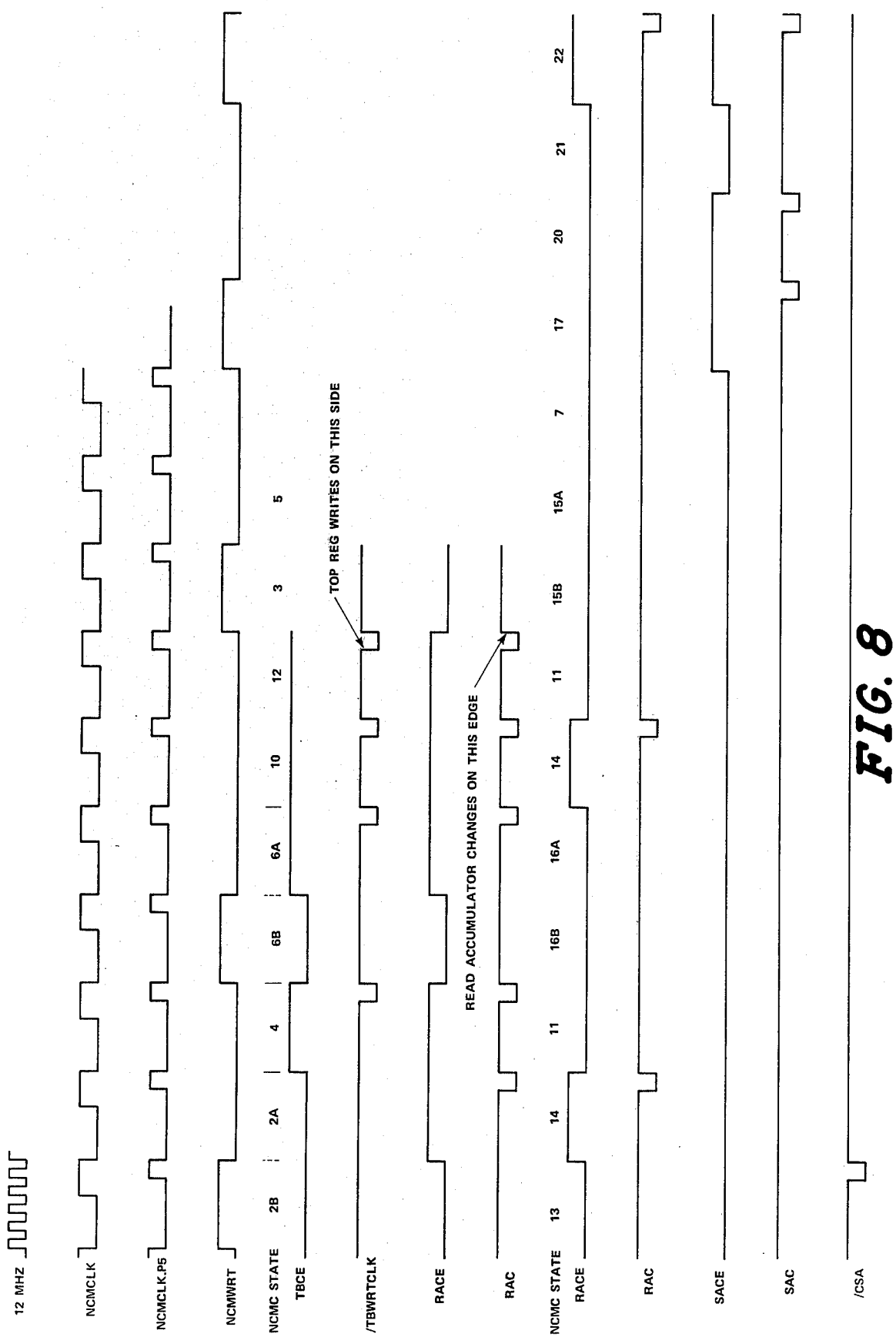

| PIECE-1 RA | | PATTERN | SLOPE | DSA | DRA | ETP | SBAR | SW | FDC | LBC | PRI | FEAT | | ITR | ETR | PTR |
|---|---|---|---|---|---|---|---|---|---|---|---|---|---|---|---|---|
| 0011 | 23 | O | 000 111 111 | 0 | 000 | 340 | 0 | 20 | 0 | 00 | 00 | 0 | 0 | 31 | 0 | 0 | 0 |
| | | | | | | | | | | | | | | 30 | 0 | 0 | 0 |
| | | | | | | | | | | | | | | 29 | 0 | 0 | 0 |
| | | | | | | | | | | | | | | 28 | 0 | 0 | 0 |
| | | | | | | | | | | | | | | 27 | 0 | 0 | 0 |
| | | | | | | | | | | | | | | 26 | 0 | 0 | 0 |
| | | | | | | | | | | | | | | 25 | 0 | 0 | 0 |
| 0010 | 23 | N | 000 110 111 | 0 0 | 001 | 337 | 0 | 20 | 0 | 00 | 00 | 0 | 0 | 24 | 0 | 0 | 0 |
| | | | | | | | | | | | | | | 23 | 1 | 0 | 1 |
| 0009 | 22 | N | 100 111 111 | 1 | 337 | 340 | 0 | 20 | 0 | 00 | 00 | 0 | 0 | 22 | 0 | 0 | 0 |
| | | | | | | | | | | | | | | 21 | 0 | 0 | 0 |
| | | | | | | | | | | | | | | 20 | 0 | 0 | 0 |
| 0008 | 22 | N | 000 110 110 | 0 | 002 | 377 | 0 | 20 | 0 | 00 | 00 | 0 | 0 | 19 | 0 | 0 | 0 |
| | | | | | | | | | | | | | | 18 | 0 | 0 | 0 |
| | | | | | | | | | | | | | | 17 | 0 | 0 | 0 |
| | | | | | | | | | | | | | | 16 | 0 | 0 | 0 |
| 0008 | 21 | N | 110 110 111 | 2 | 377 | 337 | 0 | 21 | 0 | 00 | 00 | 0 | 0 | 15 | 0 | 0 | 0 |
| | | | | | | | | | | | | | | 14 | 0 | 0 | 0 |
| | | | | | | | | | | | | | | 13 | 0 | 0 | 0 |
| 0007 | 20 | N | 100 110 111 | 1 | 000 | 337 | 0 | 21 | 0 | 00 | 00 | 0 | 0 | 12 | 1 | 0 | 1 |
| | | | | | | | | | | | | | | 11 | 0 | 0 | 0 |
| | | | | | | | | | | | | | | 10 | 0 | 0 | 0 |
| 0006 | 19 | N | 100 110 110 | 1 | 001 | 377 | 0 | 21 | 0 | 00 | 00 | 0 | 0 | 09 | 0 | 0 | 0 |
| | | | | | | | | | | | | | | 08 | 0 | 0 | 0 |
| | | | | | | | | | | | | | | 07 | 0 | 0 | 0 |
| 0006 | 18 | N | 110 110 111 | 2 | 377 | 337 | 0 | 22 | 0 | 00 | 00 | 0 | 0 | 06 | 0 | 0 | 0 |
| | | | | | | | | | | | | | | 05 | 0 | 0 | 0 |
| | | | | | | | | | | | | | | 04 | 0 | 0 | 0 |
| | | | | | | | | | | | | | | 03 | 0 | 0 | 0 |
| | | | | | | | | | | | | | | 02 | 0 | 0 | 0 |
| | | | | | | | | | | | | | | 01 | 0 | 0 | 0 |
| ........ | | | | | | | | | | | | | 0 ........ | 00 | 0 | 0 | 0 |

AVERAGE OF LAST FOUR SLOPES

NOT USED

CHANGE IN READ ACCUMULATOR TO GET TO NEXT CELL (337 = -33)

CHANGE IN SLOPE TO GET TO NEXT CELL (377 = -1)

CELL OF CENTER SCAN

TOPS FOUND IN INITIAL TRAVERSE OF CENTER SCAN

TOPS ERASED DURING BOUNDARY TRACING

TOPS USED TO INITIATE TRACES

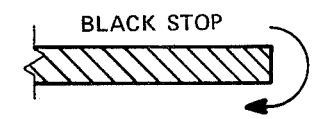

CHANGE OF SLOPE OF
+4 IN A STROKEWIDTH

FIG. 14a

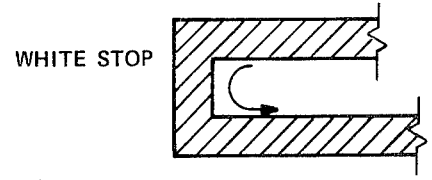

CHANGE OF SLOPE OF
-4 IN A STROKEWIDTH

FIG. 14e

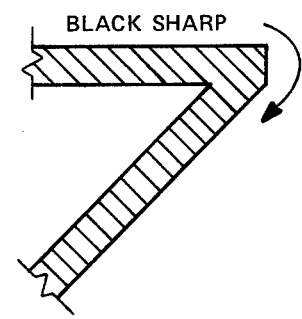

CHANGE OF SLOPE OF
+3 IN A STROKEWIDTH

FIG. 14b

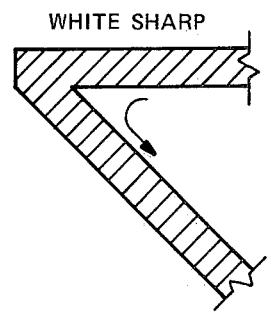

CHANGE IN SLOPE OF
-3, NOT HIGHLY DEPENDENT
ON STROKEWIDTH

FIG. 14f

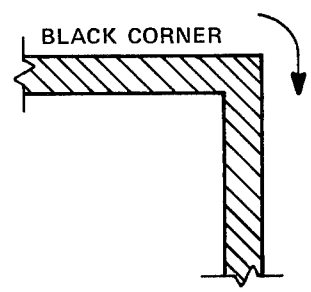

CHANGE OF SLOPE OF
+2; NOT HIGHLY DEPENDENT
ON STROKEWIDTH

FIG. 14c

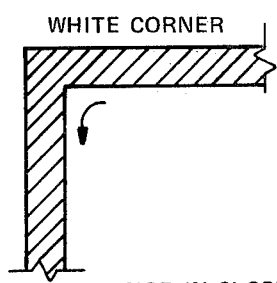

CHANGE IN SLOPE OF
-2, NOT HIGHLY DEPENDENT
ON STROKEWIDTH

FIG. 14g

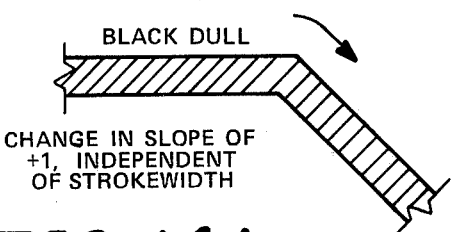

CHANGE IN SLOPE OF
+1, INDEPENDENT
OF STROKEWIDTH

FIG. 14d

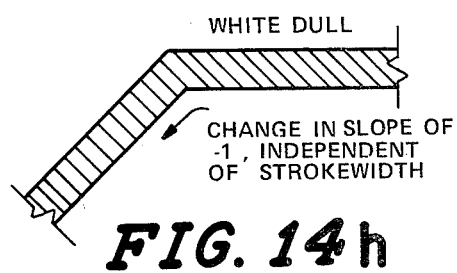

CHANGE IN SLOPE OF
-1, INDEPENDENT
OF STROKEWIDTH

FIG. 14h

| STROKE WIDTH | REFERENCE SLOPE | PROM ADDRESS (OCTAL) | PROM B12 (10-16) | | PROM B12 (19-16) | | PROM C12 (1-16) | |
|---|---|---|---|---|---|---|---|---|
| | | | MAX CIRC COUNTS ALLOWABLE TO DECLARE A | | | | | |
| | | | WHITE STOP | BLACK STOP | WHITE SHARP | BLACK SHARP | WHITE CORNER | BLACK CORNER |
| 0 | 0,4 | 00 | 4 | 4 | 4 | 5 | 3 | 3 |
| | 1,5 | 10 | 4 | 4 | 4 | 5 | 3 | 3 |
| | 2,6 | 20 | 4 | 4 | 4 | 6 | 3 | 3 |
| | 3,7 | 30 | 4 | 4 | 4 | 5 | 3 | 3 |
| 1 | 0,4 | 01 | 4 | 4 | 4 | 5 | 3 | 3 |
| | 1,5 | 11 | 5 | 5 | 4 | 6 | 3 | 3 |
| | 2,6 | 21 | 6 | 6 | 4 | 6 | 3 | 3 |
| | 3,7 | 31 | 5 | 5 | 4 | 6 | 3 | 3 |
| 2 | 0,4 | 02 | 4 | 4 | 5 | 6 | 4 | 4 |
| | 1,5 | 12 | 6 | 6 | 5 | 7 | 4 | 4 |
| | 2,6 | 22 | 8 | 8 | 5 | 8 | 4 | 4 |
| | 3,7 | 32 | 6 | 6 | 5 | 7 | 4 | 4 |
| 3 | 0,4 | 03 | 5 | 5 | 5 | 7 | 4 | 4 |
| | 1,5 | 13 | 8 | 8 | 5 | 9 | 4 | 4 |
| | 2,6 | 23 | 10 | 10 | 5 | 10 | 4 | 4 |
| | 3,7 | 33 | 8 | 8 | 5 | 9 | 4 | 4 |
| 4 | 0,4 | 04 | 6 | 6 | 5 | 8 | 4 | 4 |
| | 1,5 | 14 | 9 | 9 | 5 | 10 | 4 | 4 |
| | 2,6 | 24 | 12 | 12 | 5 | 12 | 4 | 4 |
| | 3,7 | 34 | 9 | 9 | 5 | 10 | 4 | 4 |
| 5 | 0,4 | 05 | 7 | 7 | 6 | 9 | 5 | 5 |
| | 1,5 | 15 | 11 | 11 | 6 | 12 | 5 | 5 |
| | 2,6 | 25 | 14 | 14 | 6 | 14 | 5 | 5 |
| | 3,7 | 35 | 11 | 11 | 6 | 12 | 5 | 5 |
| 6 | 0,4 | 06 | 8 | 8 | 6 | 10 | 5 | 5 |
| | 1,5 | 16 | 12 | 12 | 6 | 13 | 5 | 5 |
| | 2,6 | 26 | 15 | 15 | 6 | 15 | 5 | 5 |
| | 3,7 | 36 | 12 | 12 | 6 | 13 | 5 | 5 |
| 7 | 0,4 | 07 | 9 | 9 | 6 | 11 | 5 | 5 |
| | 1,5 | 17 | 13 | 13 | 6 | 15 | 5 | 5 |
| | 2,6 | 27 | 15 | 15 | 6 | 15 | 5 | 5 |
| | 3,7 | 37 | 13 | 13 | 6 | 15 | 5 | 5 |

| STROKE WIDTH | REFERENCE SLOPE | PROM ADDRESS (OCTAL) | PROM B12 (10-16) | | PROM B12 (19-16) | | PROM C12 (1-16) | |
|---|---|---|---|---|---|---|---|---|
| | | | MAX CIRC COUNTS ALLOWED TO DECLARE A | | | | | |
| | | | WHITE STOP | BLACK STOP | WHITE SHARP | BLACK SHARP | WHITE CORNER | BLACK CORNER |
| 0 | 0,4 | 00 | 4 | 4 | 4 | 5 | 3 | 3 |
| 1 | | 01 | 4 | 4 | 4 | 5 | 3 | 3 |
| 2 | | 02 | 4 | 4 | 5 | 6 | 4 | 4 |
| 3 | | 03 | 5 | 5 | 5 | 7 | 4 | 4 |
| 4 | | 04 | 6 | 6 | 5 | 8 | 4 | 4 |
| 5 | | 05 | 7 | 7 | 6 | 9 | 5 | 5 |
| 6 | | 06 | 8 | 8 | 6 | 10 | 5 | 5 |
| 7 | | 07 | 9 | 9 | 6 | 11 | 5 | 5 |
| 0 | 1,5 | 10 | 4 | 4 | 4 | 5 | 3 | 3 |
| 1 | | 11 | 5 | 5 | 4 | 6 | 3 | 3 |
| 2 | | 12 | 6 | 6 | 5 | 7 | 4 | 4 |
| 3 | | 13 | 8 | 8 | 5 | 9 | 4 | 4 |
| 4 | | 14 | 9 | 9 | 5 | 10 | 4 | 4 |
| 5 | | 15 | 11 | 11 | 6 | 12 | 5 | 5 |
| 6 | | 16 | 12 | 12 | 6 | 13 | 5 | 5 |
| 7 | | 17 | 13 | 13 | 6 | 15 | 5 | 5 |
| 0 | 2,6 | 20 | 4 | 4 | 4 | 6 | 3 | 3 |
| 1 | | 21 | 6 | 6 | 4 | 6 | 3 | 3 |
| 2 | | 22 | 8 | 8 | 5 | 8 | 4 | 4 |
| 3 | | 23 | 10 | 10 | 5 | 10 | 4 | 4 |
| 4 | | 24 | 12 | 12 | 5 | 12 | 4 | 4 |
| 5 | | 25 | 14 | 14 | 6 | 14 | 5 | 5 |
| 6 | | 26 | 15 | 15 | 6 | 15 | 5 | 5 |
| 7 | | 27 | 15 | 15 | 6 | 15 | 5 | 5 |
| 0 | 3,7 | 30 | 4 | 4 | 4 | 5 | 3 | 3 |
| 1 | | 31 | 5 | 5 | 4 | 6 | 3 | 3 |
| 2 | | 32 | 6 | 6 | 5 | 7 | 4 | 4 |
| 3 | | 33 | 8 | 8 | 5 | 9 | 4 | 4 |
| 4 | | 34 | 9 | 9 | 5 | 10 | 4 | 4 |
| 5 | | 35 | 11 | 11 | 6 | 12 | 5 | 5 |
| 6 | | 36 | 12 | 12 | 6 | 13 | 5 | 5 |
| 7 | | 37 | 13 | 13 | 6 | 15 | 5 | 5 |

*FIG. 15*

|  | PIECE 1 | | | PIECE 2 | |
|---|---|---|---|---|---|
| CC | SLOPE | F CODE | | SLOPE | F CODE |
| 1 | 20 | 0 | | 20 | 0 |
| 2 | 20 | 0 | | 20 | 0 |
| 3 | 20 | 0 | BLACK CORNER | 20 | 0 |
| 4 | 20 | 0 | (DISCARDED AS IT WAS FIRST FEATURE) | 20 | 0 |
| 5 | 21 | 0 | | 20 | 0 |
| 6 | 21 | 0 | | 20 | 0 |
| 7 | 21 | 0 | | 17 | 0 |
| 8 | 22 | 0 — WHITE DULL | | 16 | 0 |
| 9 | 21 | 0 | | 16 | 0 |
| 10 | 21 | 0 | | 15 | 0 |
| 11 | 22 | 0 — BLACK DULL, WHITE DULL | | 16 | 0 |
| 12 | 21 | 0 — (CANCEL EACH OTHER) | | 16 | 0 |
| 13 | 21 | 0 | | 15 | 0 |
| 14 | 21 | 0 | | 15 | 0 |
| 15 | 21 | 0 | | 14 | 0 |
| 16 | 21 | 0 | | 13 | 0 |
| 17 | 21 | 0 | | 13 | 0 |
| 18 | 22 | 0 — BLACK DULL, WHITE DULL | | 13 | 0 |
| 19 | 21 | 0 — (CANCEL EACH OTHER) | | 13 | 0 |
| 20 | 22 | 0 | | 12 | 0 |
| 21 | 23 | 0 | | 12 | 0 |
| 22 | 23 | 0 — BLACK STOP | | 11 | 0 |
| 23 | 24 | 0 | | 11 | 0 |
| 24 | 25 | 0 | | 10 | 0 |
| 25 | 25 | 0 | | 10 | 0 |
| 26 | 25 | 0 | | 10 | 0 |
| 27 | 25 | 0 — WHITE DULL | | 10 | 0 |
| 28 | 24 | 0 | | 10 | 0 |
| 29 | 24 | 0 | | 07 | 0 |
| 30 | 24 | 0 | | 06 | 0 |
| 31 | 24 | 0 | | 06 | 0 |
| 32 | 24 | 0 | | 05 | 0 |
| 33 | 24 | 0 | | 06 | 0 |
| 34 | 24 | 0 | | 06 | 0 |
| 35 | 24 | 0 | | 05 | 0 |
| 36 | 24 | 0 | | 05 | 0 |
| 37 | 24 | 0 — WHITE DULL | | 04 | 0 |
| 38 | 23 | 0 | | 03 | 0 |
| 39 | 23 | 0 | | 03 | 0 |
| 40 | 23 | 0 — BLACK STOP | | 03 | 0 |
| 41 | 24 | 0 | | 03 | 0 |
| 42 | 24 | 0 | | 02 | 0 |
| 43 | 25 | 0 | | | |
| 44 | 25 | 0 | | | |
| 45 | 26 | 0 | | | |
| 46 | 27 | 0 | | | |
| 47 | 27 | 0 | | | |
| 48 | 27 | 0 | | | |
| 49 | 27 | 0 | | | |
| 50 | 27 | 0 | | | |
| 51 | 26 | 0 — WHITE DULL, BLACK DULL | | | |
| 52 | 27 | 0 — (CANCEL EACH OTHER) | | | |
| 53 | 26 | 0 — WHITE DULL, BLACK DULL | | | |
| 54 | 27 | 0 — (CANCEL EACH OTHER) | | | |
| 55 | 27 | 0 | | | |
| 56 | 27 | 0 | | | |
| 57 | 27 | 0 | | | |
| 58 | 27 | 0 — BLACK SHARP | INITIAL CELL AND SLOPE FEATURE FINDING | | |
| 59 | 30 | 0 | TERMINATED AS SUM OF | | |
| 60 | 30 | 0 | FEATURES WAS = 8 | | |
| 61 | 30 | 0 | | | |
| 62 | 30 | 0 | | | |
| 63 | 31 | 0 | | | |
| 64 | 31 | 0 | | | |
| 65 | 31 | 0 | | | |
| 66 | 32 | 0 | | | |
| 67 | 31 | 0 | | | |
| 68 | 31 | 0 | | | |
| 69 | 32 | 0 | | | |
| 70 | 31 | 0 | | | |
| 71 | 31 | 0 | | | |
| 72 | 31 | 0 | | | |
| 73 | 31 | 0 | | | |
| 74 | 31 | 0 | | | |
| 75 | 31 | 0 | | | |
| 76 | 32 | 0 | | | |
| 77 | 31 | 0 | | | |
| 78 | 32 | 0 | | | |

*FIG. 17*

| OLD ΔSLOPE | NEW ΔSLOPE | POSSIBLE FEATURE STORED | LOAD POSSIBLE FEATURE | FORMAT FEATURE |
|---|---|---|---|---|
| −1 | −1 | 0 | | |
| −1 | 0 | 0 | | |
| −1 | +1 | 0 | X | |
| 0 | −1 | 0 | | |
| 0 | 0 | 0 | | |
| 0 | +1 | 0 | | |
| +1 | −1 | 0 | X | |
| +1 | 0 | 0 | | |
| +1 | +1 | 0 | | |
| −1 | −1 | 1 | | X |
| −1 | 0 | 1 | | |
| −1 | +1 | 1 | X | |
| 0 | −1 | 1 | | |
| 0 | 0 | 1 | | |
| 0 | +1 | 1 | | |
| +1 | −1 | 1 | X | |
| +1 | 0 | 1 | | |
| +1 | +1 | 1 | | X |

FIG. 18b

| ROM ADDRESS (OCTAL) | PRESENT STATE | +CHANGE (A<B) | −CHANGE (A>B) | NEXT STATE | INSFSLLD POSSIBLE FEATURE | INFCLR | INFCNT FORMAT FEATURE |
|---|---|---|---|---|---|---|---|
| 00 | 0 | 0 | 0 | 1 | 0 | 1 | 0 |
| 01 | | 0 | 1 | | | | |
| 02 | | 1 | 0 | | | | |
| 03 | | 1 | 1 | | | | |
| 04 | 1 | 0 | 0 | 1 | 0 | 0 | 0 |
| 05 | | 0 | 1 | 3 | | | |
| 06 | | 1 | 0 | 5 | | | |
| 07 | | 1 | 1 | 1 | | | |
| 10 | 2 | 0 | 0 | 0 | 0 | 0 | 0 |
| 11 | | 0 | 1 | | | | |
| 12 | | 1 | 0 | | | | |
| 13 | | 1 | 1 | | | | |
| 14 | 3 | 0 | 0 | 3 | 0 | 0 | 0 |
| 15 | | 0 | 1 | | | | |
| 16 | | 1 | 0 | 7 | 1 | | |
| 17 | | 1 | 1 | 3 | 0 | | |
| 20 | 4 | 0 | 0 | 0 | 0 | 0 | 0 |
| 21 | | 0 | 1 | | | | |
| 22 | | 1 | 0 | | | | |
| 23 | | 1 | 1 | | | | |
| 24 | 5 | 0 | 0 | 5 | 0 | 0 | 0 |
| 25 | | 0 | 1 | 6 | 1 | | |
| 26 | | 1 | 0 | 5 | 0 | | |
| 27 | | 1 | 1 | | | | |
| 30 | 6 | 0 | 0 | 6 | 0 | 0 | 0 |
| 31 | | 0 | 1 | 3 | | | 1 |
| 32 | | 1 | 0 | 5 | | | 0 |
| 33 | | 1 | 1 | 6 | | | |
| 34 | 7 | 0 | 0 | 7 | 0 | 0 | 0 |
| 35 | | 0 | 1 | 3 | | | |
| 36 | | 1 | 0 | 5 | | | 1 |
| 37 | | 1 | 1 | 7 | | | 0 |

FIG. 20

| IF SHIFTED | NUMERATOR | | 0,1 | 2,3 | 4,5 | 6,7 | 8,9 | 10,11 | 12,13 | 14,15 | 16,17 | 18,19 | 20,21 | 22,23 | 24,25 | 26,27 | 28,29 | 30,31 | 32,33 | 34,35 | 36,37 | 38,39 | 40,41 | 42,43 | 44,45 | 46,47 | 48,49 | 50,51 | 52,53 | 54,55 | 56,57 | 58,59 | 60,61 | 62,63 |
|---|---|---|---|---|---|---|---|---|---|---|---|---|---|---|---|---|---|---|---|---|---|---|---|---|---|---|---|---|---|---|---|---|---|---|
| | | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| DENOMINATOR | ROM ADDRESS A9–A0 | A5 | 00000 | 00001 | 00010 | 00011 | 00100 | 00101 | 00110 | 00111 | 01000 | 01001 | 01010 | 01011 | 01100 | 01101 | 01110 | 01111 | 10000 | 10001 | 10010 | 10011 | 10100 | 10101 | 10110 | 10111 | 11000 | 11001 | 11010 | 11011 | 11100 | 11101 | 11110 | 11111 |
| 0,1 | 0 | 00000 | 2 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 |
| 2,3 | 1 | 00001 | 0 | 2 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 |
| 4,5 | 2 | 00010 | 0 | 1 | 2 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 |
| 6,7 | 3 | 00011 | 0 | 1 | 3 | 2 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 |
| 8,9 | 4 | 00100 | 0 | 1 | 3 | 2 | 2 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 |
| 10,11 | 5 | 00101 | 0 | 0 | 1 | 3 | 2 | 2 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 |
| 12,13 | 6 | 00110 | 0 | 0 | 1 | 1 | 3 | 2 | 2 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 |
| 14,15 | 7 | 00111 | 0 | 0 | 1 | 1 | 3 | 3 | 2 | 2 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 |
| 16,17 | 8 | 01000 | 0 | 0 | 1 | 1 | 3 | 3 | 2 | 2 | 2 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 |
| 18,19 | 9 | 01001 | 0 | 0 | 0 | 1 | 1 | 3 | 3 | 2 | 2 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 |
| 20,21 | 10 | 01010 | 0 | 0 | 0 | 1 | 1 | 1 | 3 | 3 | 2 | 2 | 2 | 6 | 6 | 6 | 6 | 6 | 6 | 6 | 6 | 6 | 6 | 6 | 6 | 6 | 6 | 6 | 6 | 6 | 6 | 6 | 6 | 6 |
| 22,23 | 11 | 01011 | 0 | 0 | 0 | 1 | 1 | 1 | 3 | 3 | 3 | 2 | 2 | 2 | 6 | 6 | 6 | 6 | 6 | 6 | 6 | 6 | 6 | 6 | 6 | 6 | 6 | 6 | 6 | 6 | 6 | 6 | 6 | 6 |
| 24,25 | 12 | 01100 | 0 | 0 | 0 | 1 | 1 | 1 | 3 | 3 | 3 | 2 | 2 | 2 | 2 | 6 | 6 | 6 | 6 | 6 | 6 | 6 | 6 | 6 | 6 | 6 | 6 | 6 | 6 | 6 | 6 | 6 | 6 | 6 |
| 26,27 | 13 | 01101 | 0 | 0 | 0 | 0 | 1 | 1 | 1 | 3 | 3 | 3 | 2 | 2 | 2 | 6 | 6 | 6 | 6 | 6 | 6 | 6 | 6 | 6 | 6 | 6 | 6 | 6 | 6 | 6 | 6 | 6 | 6 | 6 |
| 28,29 | 14 | 01110 | 0 | 0 | 0 | 0 | 1 | 1 | 1 | 1 | 3 | 3 | 3 | 2 | 2 | 2 | 2 | 6 | 6 | 6 | 6 | 6 | 6 | 6 | 6 | 6 | 6 | 6 | 6 | 6 | 6 | 6 | 6 | 6 |
| 30,31 | 15 | 01111 | 0 | 0 | 0 | 0 | 1 | 1 | 1 | 1 | 3 | 3 | 3 | 3 | 2 | 2 | 2 | 2 | 6 | 6 | 6 | 6 | 6 | 6 | 6 | 6 | 6 | 6 | 6 | 6 | 6 | 6 | 6 | 6 |
| 32,33 | 16 | 10000 | 0 | 0 | 0 | 0 | 1 | 1 | 1 | 1 | 3 | 3 | 3 | 3 | 2 | 2 | 2 | 2 | 2 | 6 | 6 | 6 | 6 | 6 | 6 | 6 | 6 | 6 | 6 | 6 | 6 | 6 | 6 | 6 |
| 34,35 | 17 | 10001 | 0 | 0 | 0 | 0 | 0 | 1 | 1 | 1 | 1 | 3 | 3 | 3 | 2 | 2 | 2 | 2 | 2 | 6 | 6 | 6 | 6 | 6 | 6 | 6 | 6 | 6 | 6 | 6 | 6 | 6 | 6 | 6 |
| 36,37 | 18 | 10010 | 0 | 0 | 0 | 0 | 0 | 1 | 1 | 1 | 1 | 3 | 3 | 3 | 3 | 2 | 2 | 2 | 2 | 2 | 6 | 6 | 6 | 6 | 6 | 6 | 6 | 6 | 6 | 6 | 6 | 6 | 6 | 6 |
| 38,39 | 19 | 10011 | 0 | 0 | 0 | 0 | 0 | 1 | 1 | 1 | 1 | 3 | 3 | 3 | 3 | 2 | 2 | 2 | 2 | 2 | 6 | 6 | 6 | 6 | 6 | 6 | 6 | 6 | 6 | 6 | 6 | 6 | 6 | 6 |
| 40,41 | 20 | 10100 | 0 | 0 | 0 | 0 | 0 | 1 | 1 | 1 | 1 | 1 | 3 | 3 | 3 | 3 | 2 | 2 | 2 | 2 | 2 | 6 | 6 | 6 | 6 | 6 | 6 | 6 | 6 | 6 | 6 | 6 | 6 | 6 |
| 42,43 | 21 | 10101 | 0 | 0 | 0 | 0 | 0 | 0 | 1 | 1 | 1 | 1 | 3 | 3 | 3 | 3 | 2 | 2 | 2 | 2 | 2 | 6 | 6 | 6 | 6 | 6 | 6 | 6 | 6 | 6 | 6 | 6 | 6 | 6 |
| 44,45 | 22 | 10110 | 0 | 0 | 0 | 0 | 0 | 0 | 1 | 1 | 1 | 1 | 1 | 3 | 3 | 3 | 3 | 2 | 2 | 2 | 2 | 2 | 6 | 6 | 6 | 6 | 6 | 6 | 6 | 6 | 6 | 6 | 6 | 6 |
| 46,47 | 23 | 10111 | 0 | 0 | 0 | 0 | 0 | 0 | 1 | 1 | 1 | 1 | 1 | 3 | 3 | 3 | 3 | 2 | 2 | 2 | 2 | 2 | 6 | 6 | 6 | 6 | 6 | 6 | 6 | 6 | 6 | 6 | 6 | 6 |
| 48,49 | 24 | 11000 | 0 | 0 | 0 | 0 | 0 | 0 | 1 | 1 | 1 | 1 | 1 | 3 | 3 | 3 | 3 | 2 | 2 | 2 | 2 | 2 | 2 | 6 | 6 | 6 | 6 | 6 | 6 | 6 | 6 | 6 | 6 | 6 |
| 50,51 | 25 | 11001 | 0 | 0 | 0 | 0 | 0 | 0 | 0 | 1 | 1 | 1 | 1 | 1 | 3 | 3 | 3 | 3 | 3 | 2 | 2 | 2 | 2 | 2 | 2 | 6 | 6 | 6 | 6 | 6 | 6 | 6 | 6 | 6 |
| 52,53 | 26 | 11010 | 0 | 0 | 0 | 0 | 0 | 0 | 0 | 1 | 1 | 1 | 1 | 1 | 1 | 3 | 3 | 3 | 3 | 3 | 2 | 2 | 2 | 2 | 2 | 2 | 6 | 6 | 6 | 6 | 6 | 6 | 6 | 6 |
| 54,55 | 27 | 11011 | 0 | 0 | 0 | 0 | 0 | 0 | 0 | 1 | 1 | 1 | 1 | 1 | 1 | 3 | 3 | 3 | 3 | 3 | 2 | 2 | 2 | 2 | 2 | 2 | 2 | 6 | 6 | 6 | 6 | 6 | 6 | 6 |
| 56,57 | 28 | 11100 | 0 | 0 | 0 | 0 | 0 | 0 | 0 | 1 | 1 | 1 | 1 | 1 | 1 | 3 | 3 | 3 | 3 | 3 | 2 | 2 | 2 | 2 | 2 | 2 | 2 | 2 | 6 | 6 | 6 | 6 | 6 | 6 |
| 58,59 | 29 | 11101 | 0 | 0 | 0 | 0 | 0 | 0 | 0 | 0 | 1 | 1 | 1 | 1 | 1 | 1 | 3 | 3 | 3 | 3 | 3 | 3 | 2 | 2 | 2 | 2 | 2 | 2 | 2 | 2 | 6 | 6 | 6 | 6 |
| 60,61 | 30 | 11110 | 0 | 0 | 0 | 0 | 0 | 0 | 0 | 0 | 1 | 1 | 1 | 1 | 1 | 1 | 3 | 3 | 3 | 3 | 3 | 3 | 2 | 2 | 2 | 2 | 2 | 2 | 2 | 2 | 2 | 6 | 6 | 6 |
| 62,63 | 31 | 11111 | 0 | 0 | 0 | 0 | 0 | 0 | 0 | 0 | 1 | 1 | 1 | 1 | 1 | 1 | 3 | 3 | 3 | 3 | 3 | 3 | 2 | 2 | 2 | 2 | 2 | 2 | 2 | 2 | 2 | 2 | 2 | 2 |

*FIG. 21*

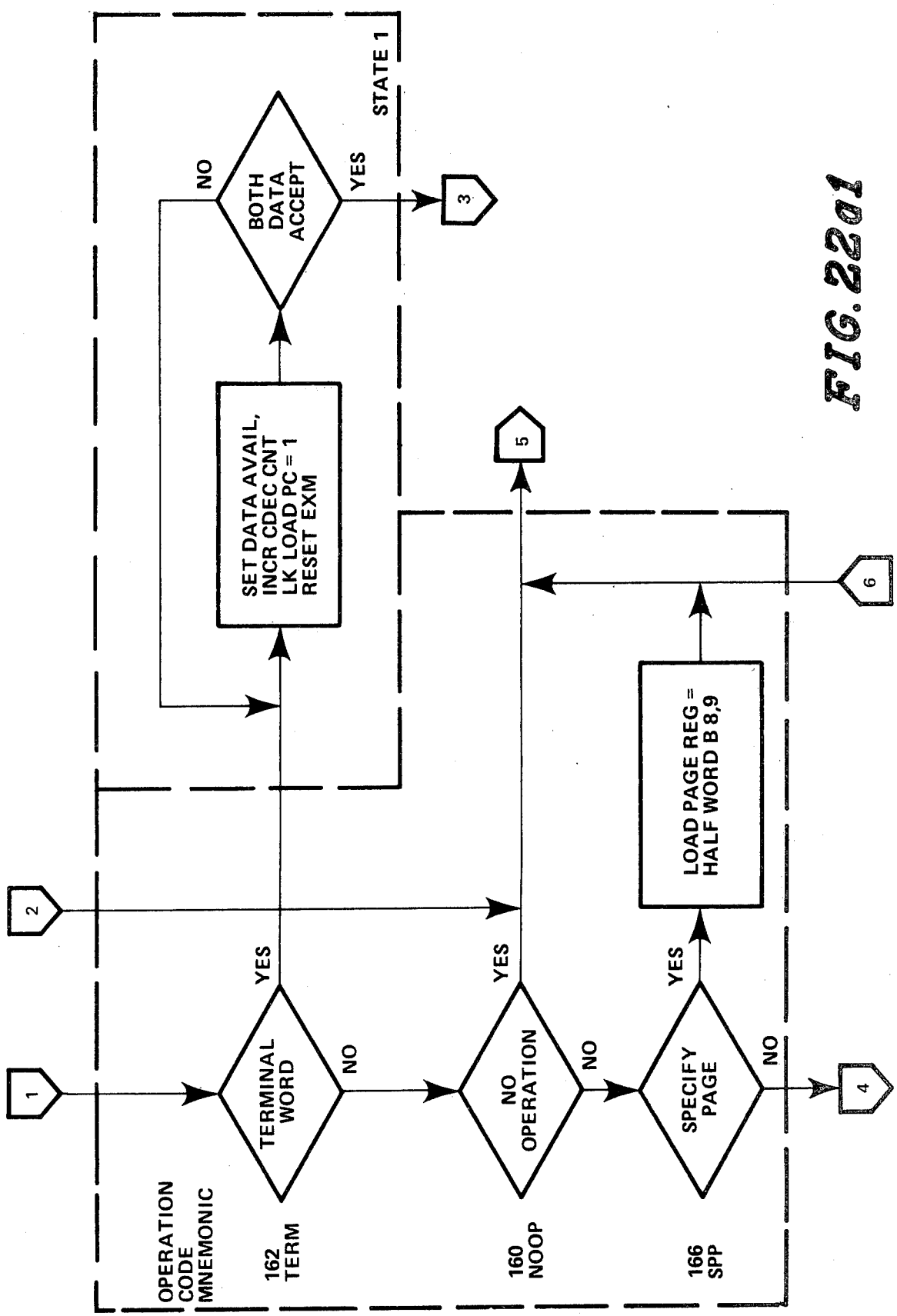
FIG. 22a1

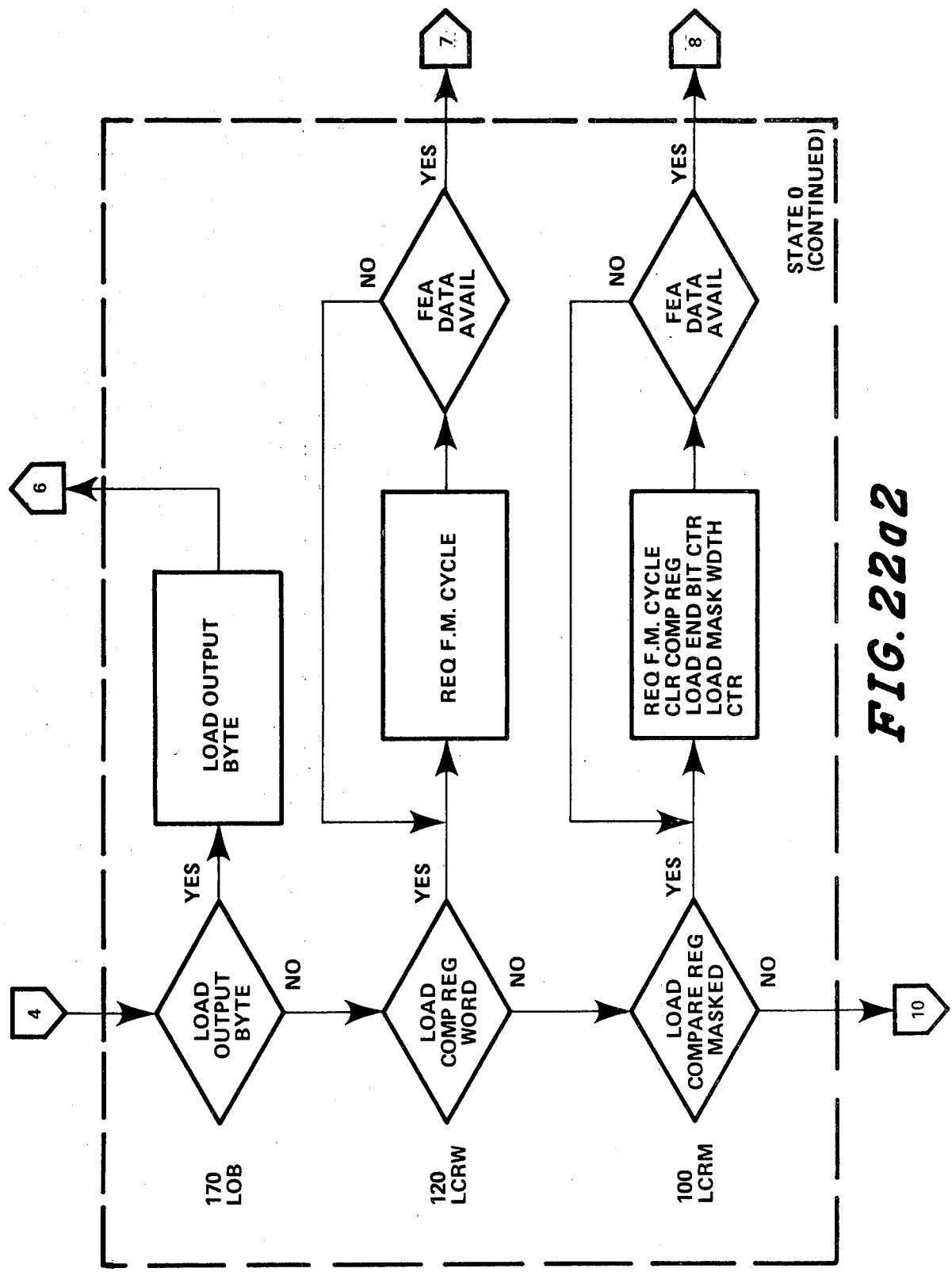
FIG. 22a2

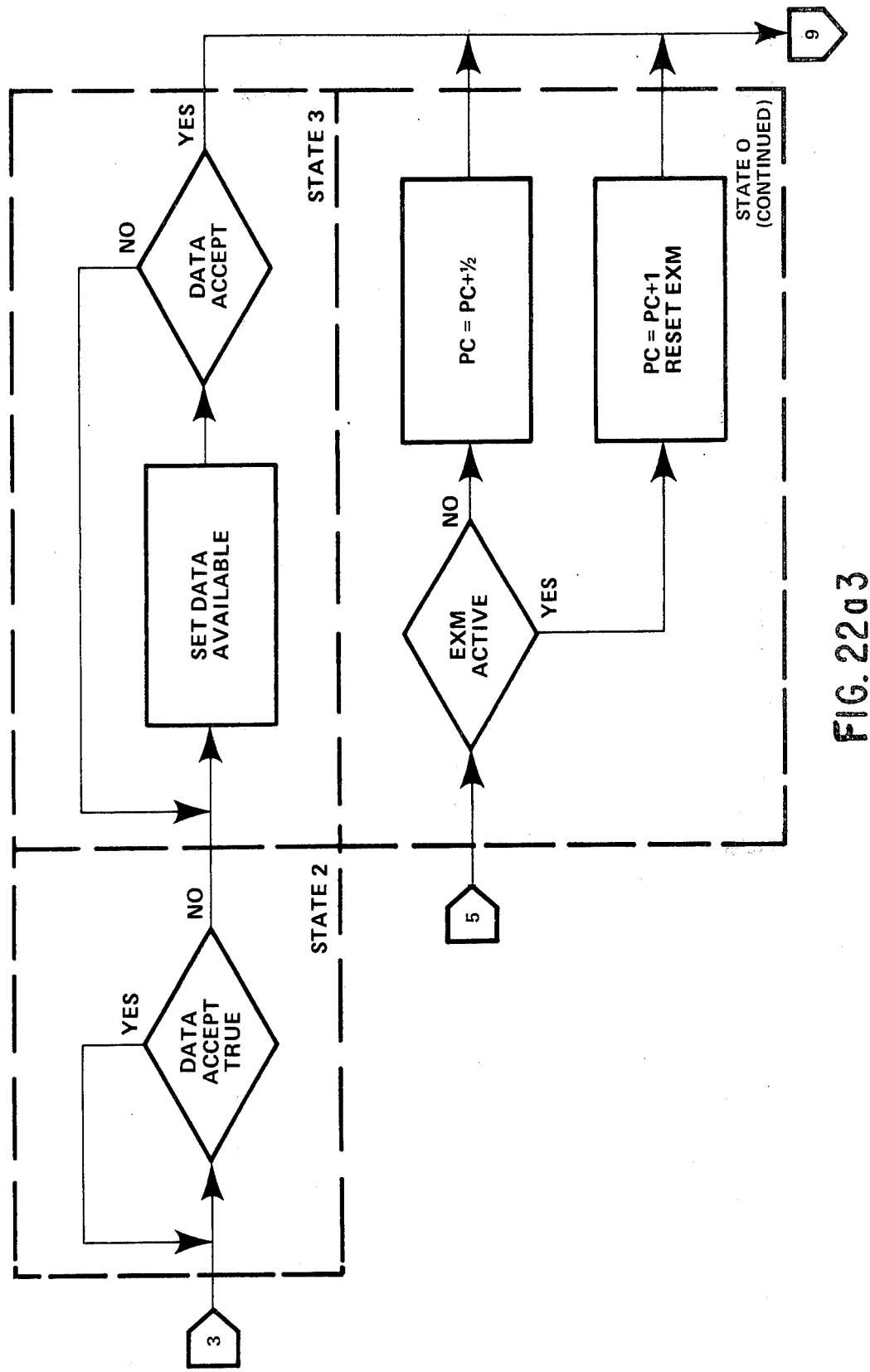
FIG. 22a3

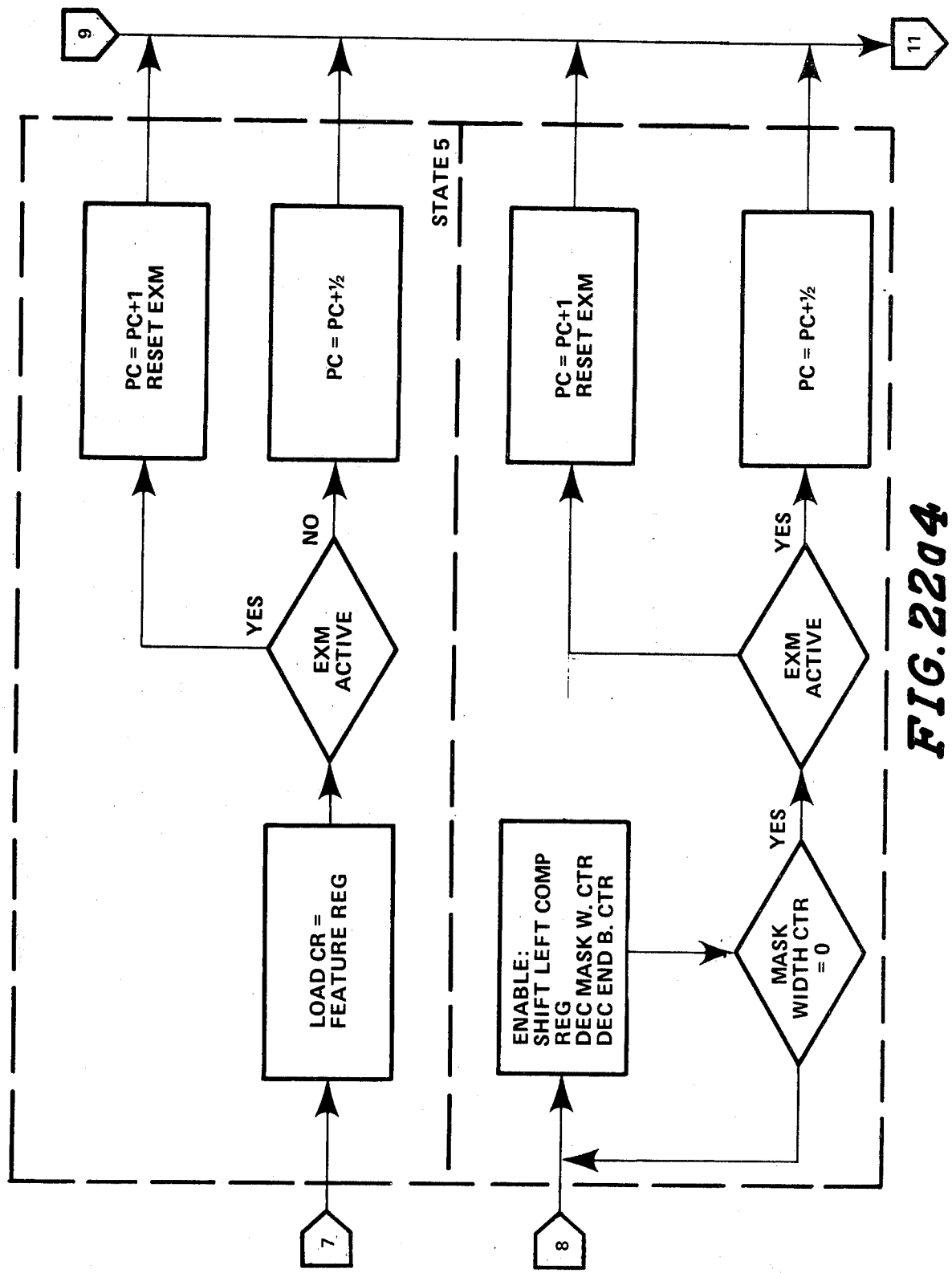
FIG. 22a4

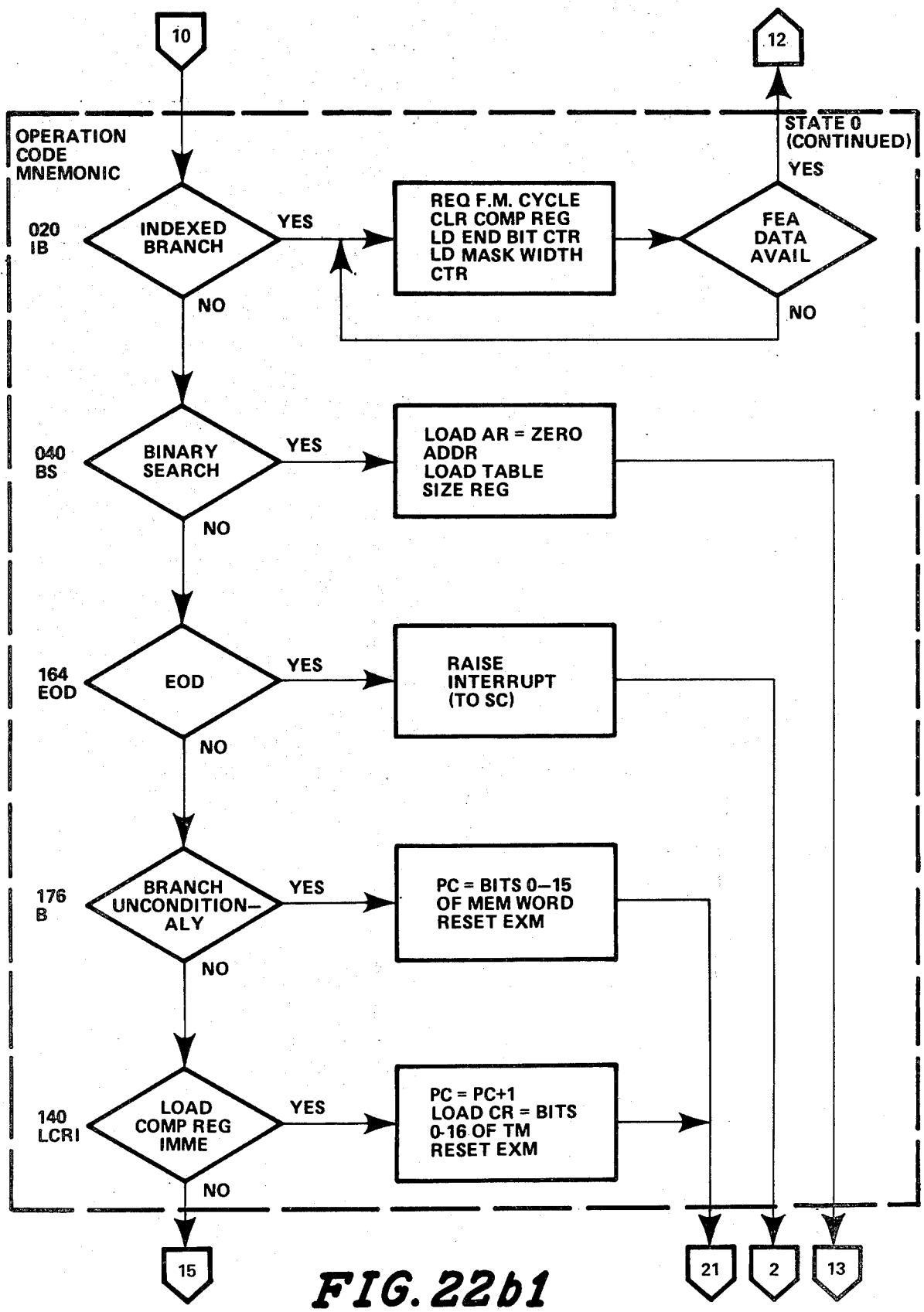
FIG. 22b1

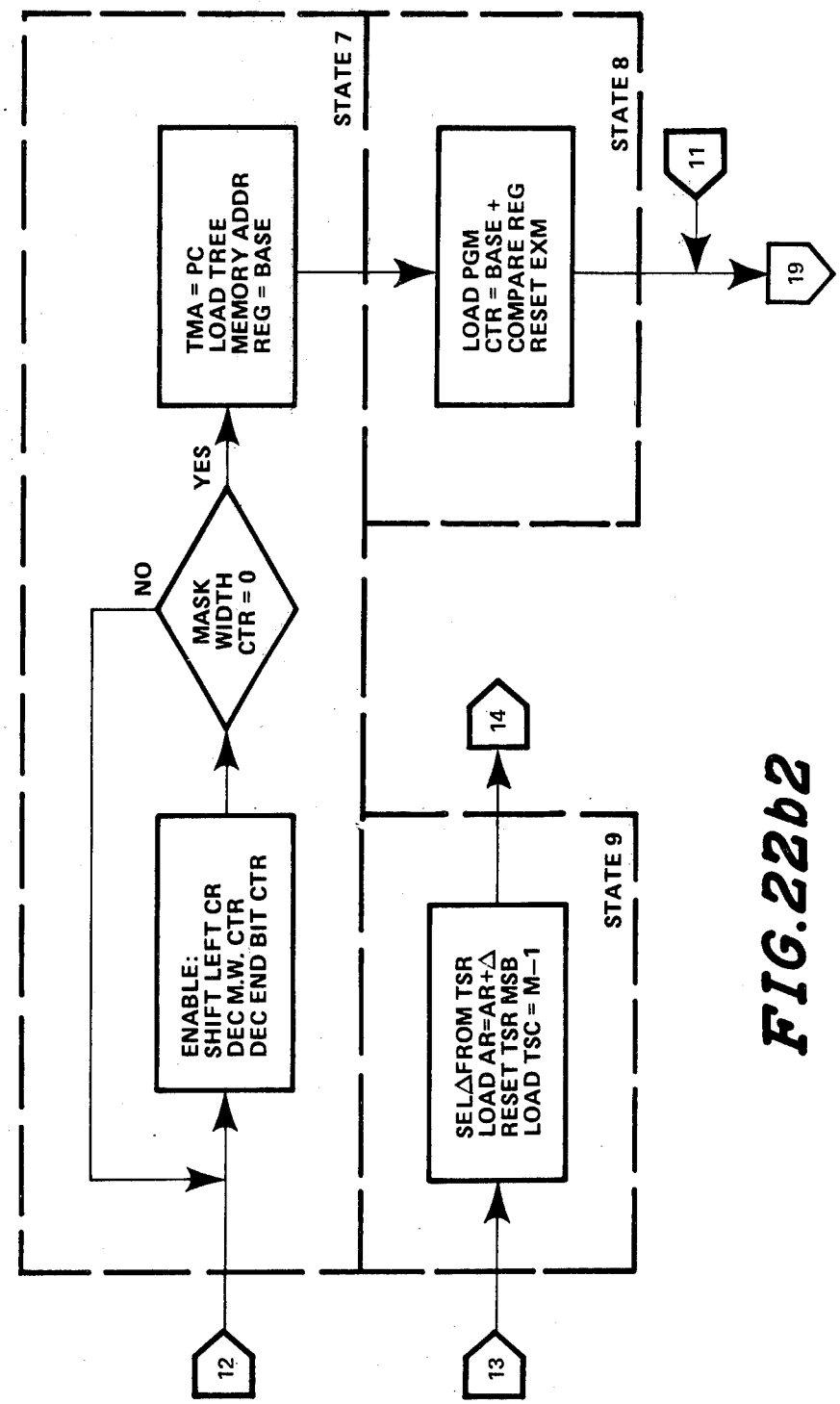
FIG.22b2

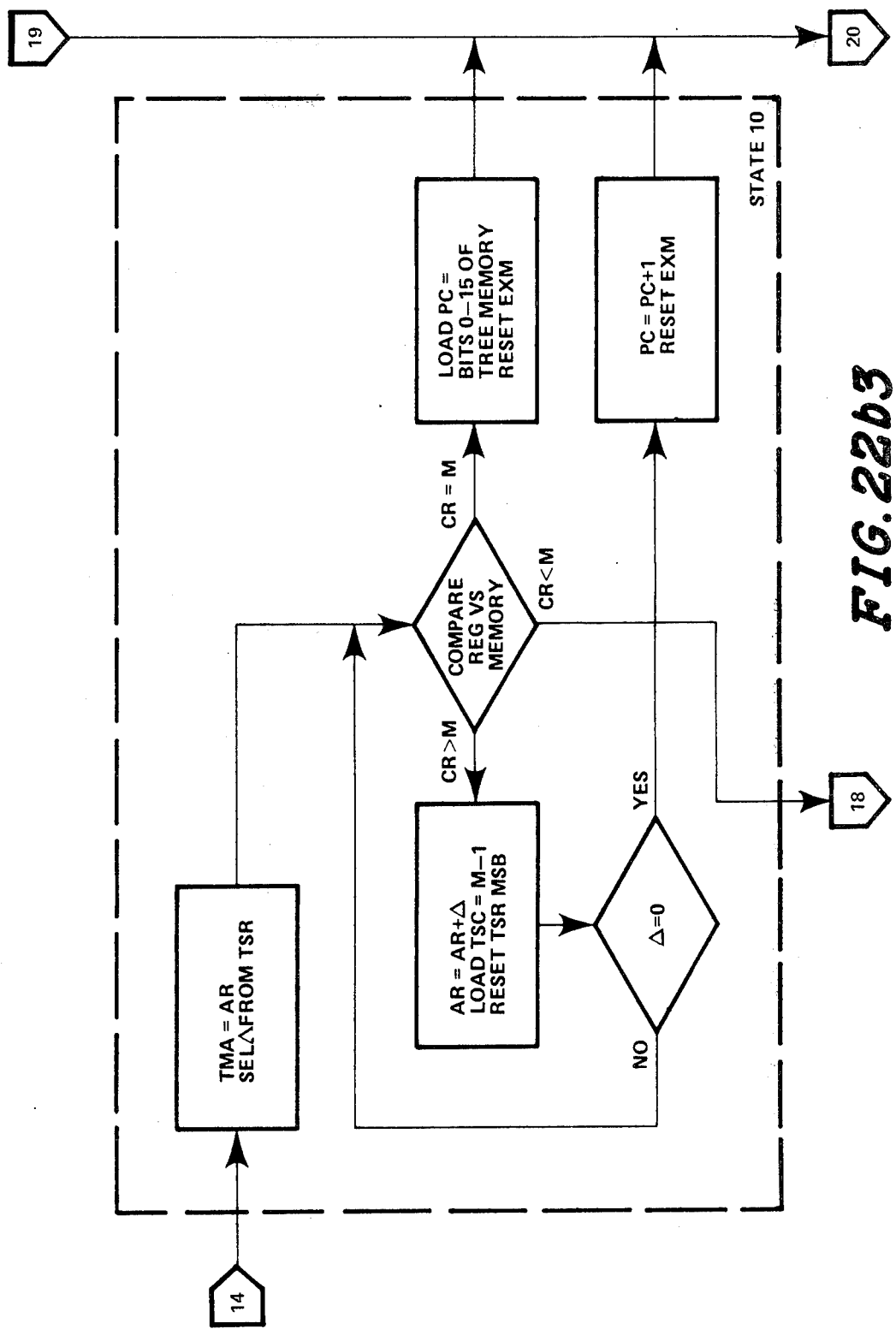
FIG.22b3

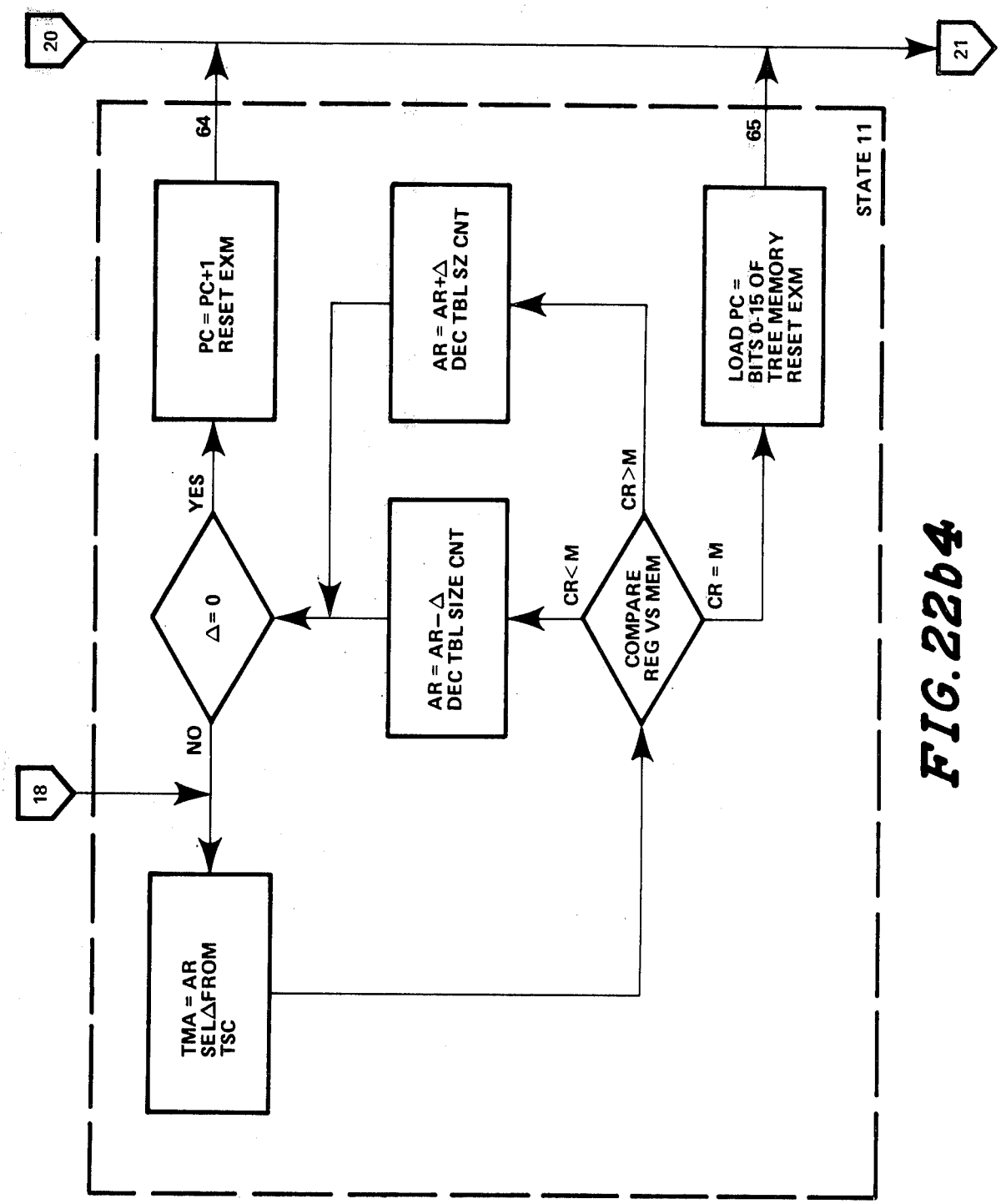
FIG. 22b4

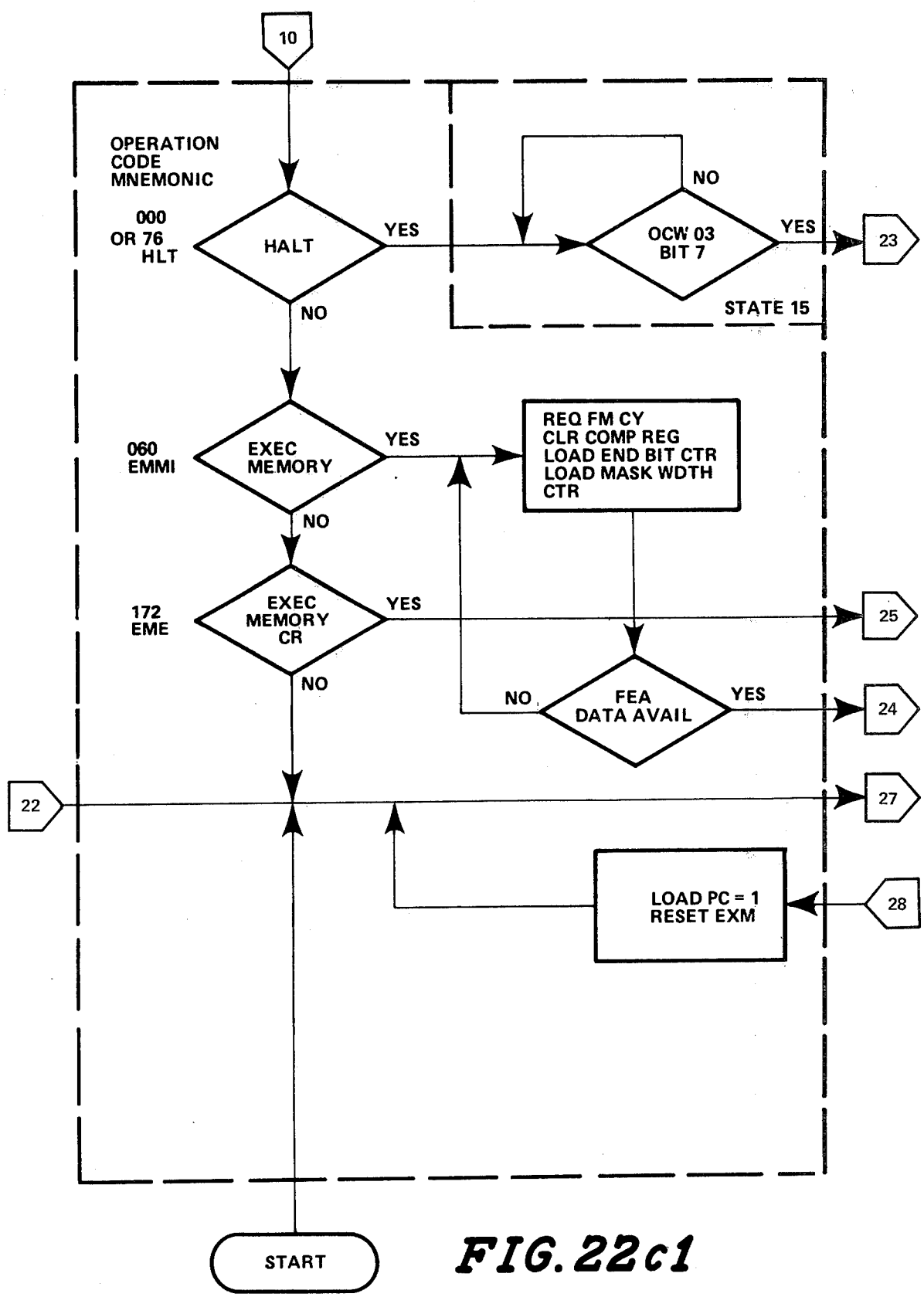
FIG.22c1

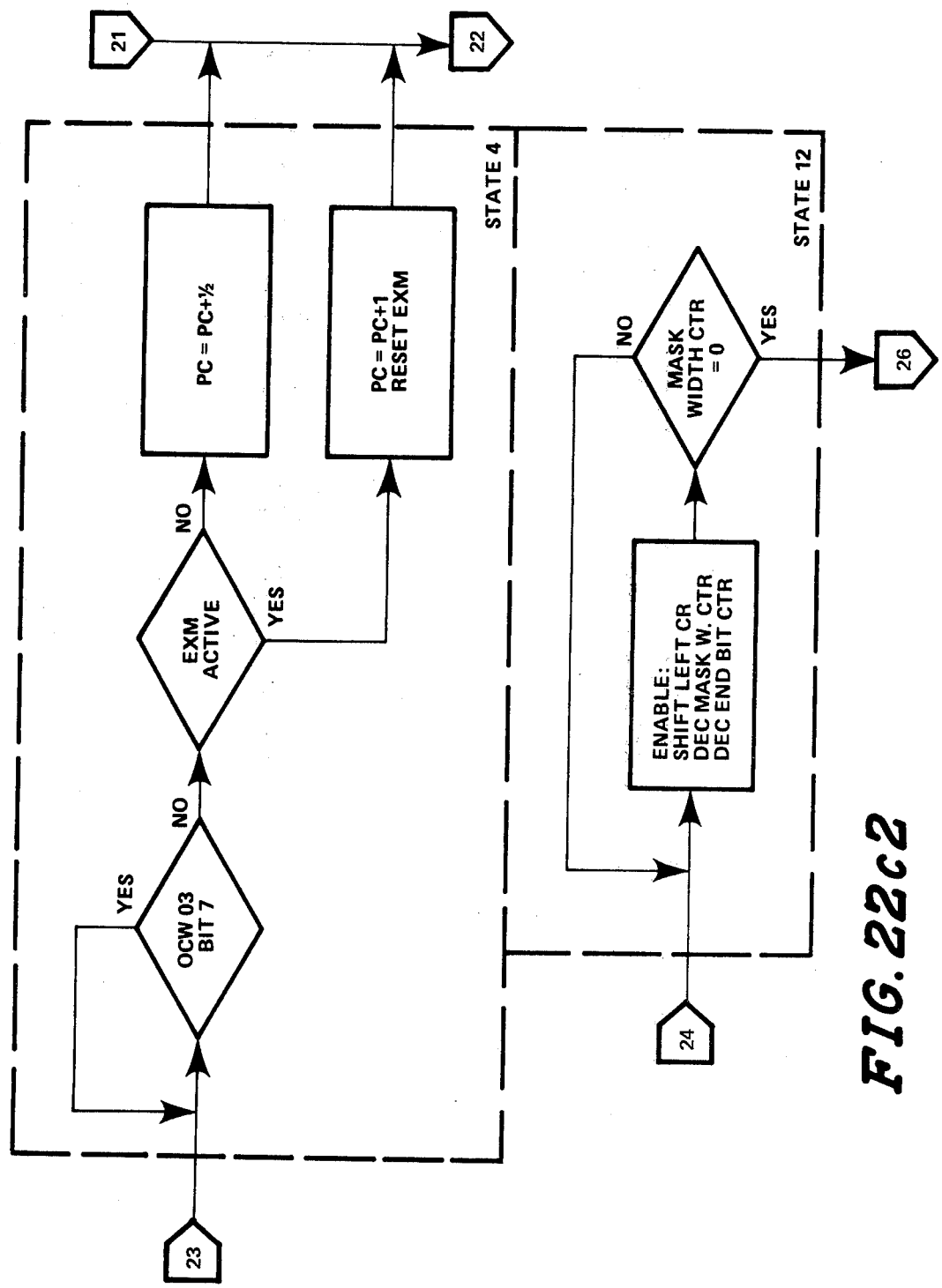
FIG.22c2

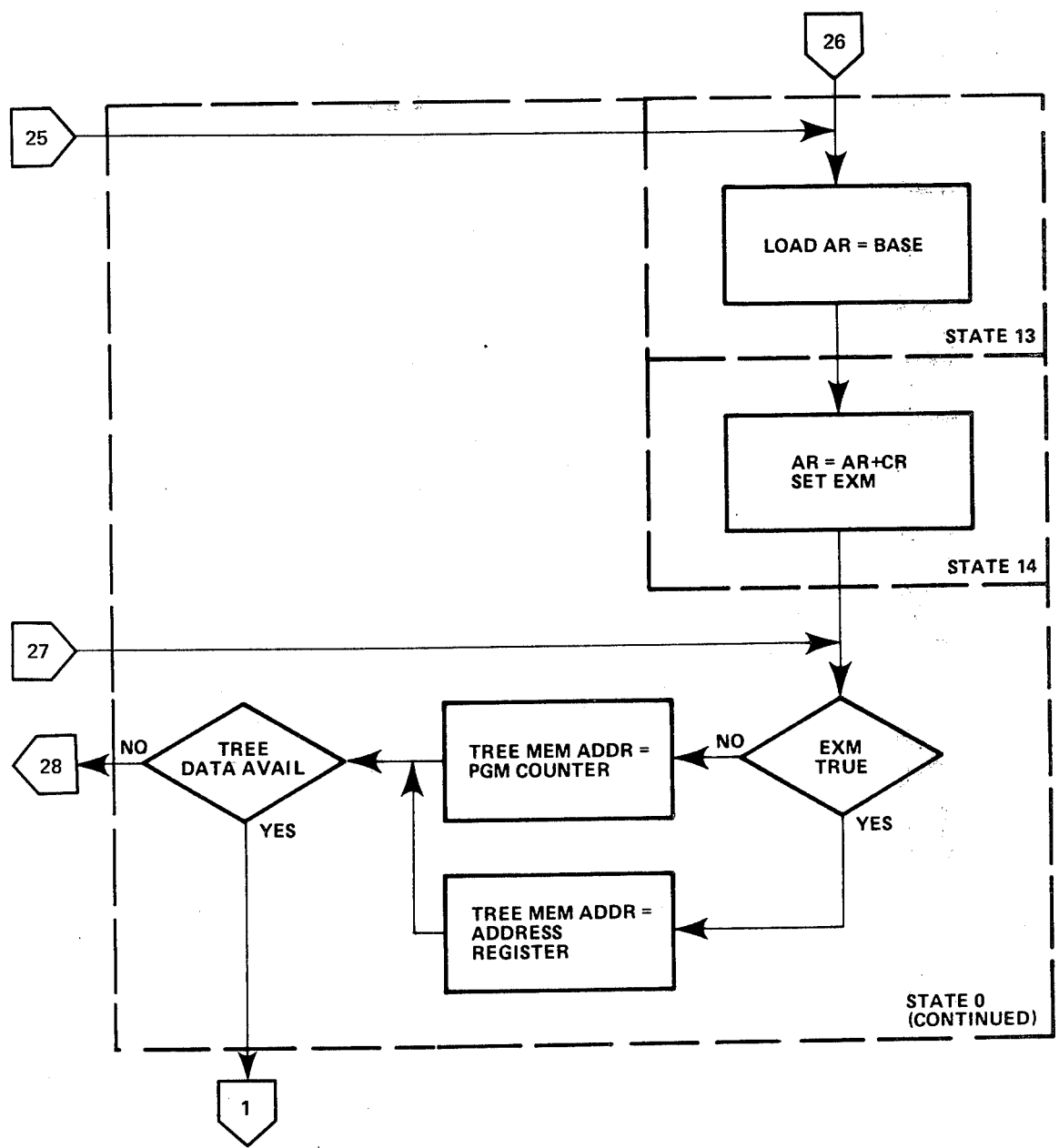
FIG.22c3

BOUNDARY TRACE SLOPE FEATURE DETECTION SYSTEM

FIELD OF THE INVENTION

The invention relates to the automatic reading of alphanumeric characters and more particularly to a system for identifying features of the characters in order to perform a character identification decision process.

PRIOR ART

Character recognition systems employing a two dimensional analysis of an electrical character image have been in use. Such systems generally fall into one of three categories including template matching, contoured tracing, and feature analysis system. U.S. Pat. No. 3,873,972 to Levine discloses a feature analysis character recognition system using row analysis and column analysis of an image stored in a memory. The row analysis is completed first, and a column analysis is initiated only if the row analysis has not lead to a single character identification. Character decision is accomplished by forming memory address from row and column sequence, duration, and orientation codes, and AND'-ing character designating words stored at the address memory locations. Further methods of two dimensional analysis are disclosed in U.S. Pat. No. 3,706,071 to Gray and U.S. Pat. No. 3,815,090 to Muenchheusen. In U.S. Pat. No. 4,093,941, a method of tracing the outline of a character is disclosed. This method consists of moving from one cell to a touching cell tracing boundary of the character and recording the value of the slope at each cell traced. The features noted during the boundary trace are found where inflections, i.e., thinner places where the slope changes from increasing slope to decreasing slope or from decreasing slope to increasing slope, and the slope at these inflection points. As the boundaries trace the character is thinned by deleting cells from the boundary according to a set of rules which eventually produces a character only one cell in thickness. When this condition is recognized the final trace around the character is generated.

The present invention is an improvement over this last mentioned reference in that the thinning of the character by eliminating cells is not necessary. It has been found that by eliminating thinning the procedure is more accurate at locating stops and considerably more accurate at determining the slope at each stop.

SUMMARY OF THE INVENTION

The present invention performs a feature analysis on a character to be recognized in a character optical recognition system by tracing the boundary of the character to locate stops or inflection points on the character. In the prior art method many characters were found to have only two stops and only two inflections and similar boundary traces. In the present invention an array of additional features are generated which describe the events encountered during the boundary tracing regardless of how many or whether or not any stops are encountered. These features include specific features such as a "sharp" feature useful in separating a "U" from a "V," "corner," "dull," "white dull," "white corner," "white sharp," and "white stop" defined later. The outer circumference of the character is traced in a "clockwise" direction or the inner circumference of any loops of the character are traced in a counterclockwise direction from an arbitrary cell on the character. For example the top most cell on the center line of the character may be used as a starting point. As each cell is processed, the slope of the vector to the next cell is determined. The starting slope is initialized with the slope value nearest 16 and continued to take the next value closest to the previous value until the entire boundary has been traced, including an overrun trace of several cells beyond the starting cell for reasons to be discussed later. The discrete slopes thus found are averaged by a four cell moving average and then the average slope is rounded to the integral value down if it ends in 0.00 or 0.25 or rounded up the next higher integral value if it ends in a 0.50 or 0.75. This rounded average slope which is generated on the first pass around a character is input to the feature derivation system.

DESCRIPTION OF THE DRAWINGS

For a more complete understanding of the present invention and of the technical events represented thereby reference is now made to the following description taken in conjunction in accompanying drawings in which:

FIGS. 1a, 1b1, 1b2, 1d1, 1d2, 1c, 1e1, 1e2, 1f1, 1f2, 1f3, 1f4, 1f5, 1f6, 1g1 1g2, and 1h together make up a block diagraph of the feature module (referred to herein as FIGS. 1a-1b);

FIG. 2 illustrates the scan assembler memory word format;

FIG. 3a and 3b illustrates the patterns, address and value added which are stored in initial feature programmable read only memory;

FIG. 4 is an example of a frame of video showing the horizontal and vertical STAR features;

FIGS. 5a, 5b and 5c illustrate the sequence of slopes used in tracing around a character;

FIG. 6 illustrates a frame of video showing one of each type of slope;

FIG. 8 is a timing diagram of the 9-cell Memory Control;

Figure 9A:
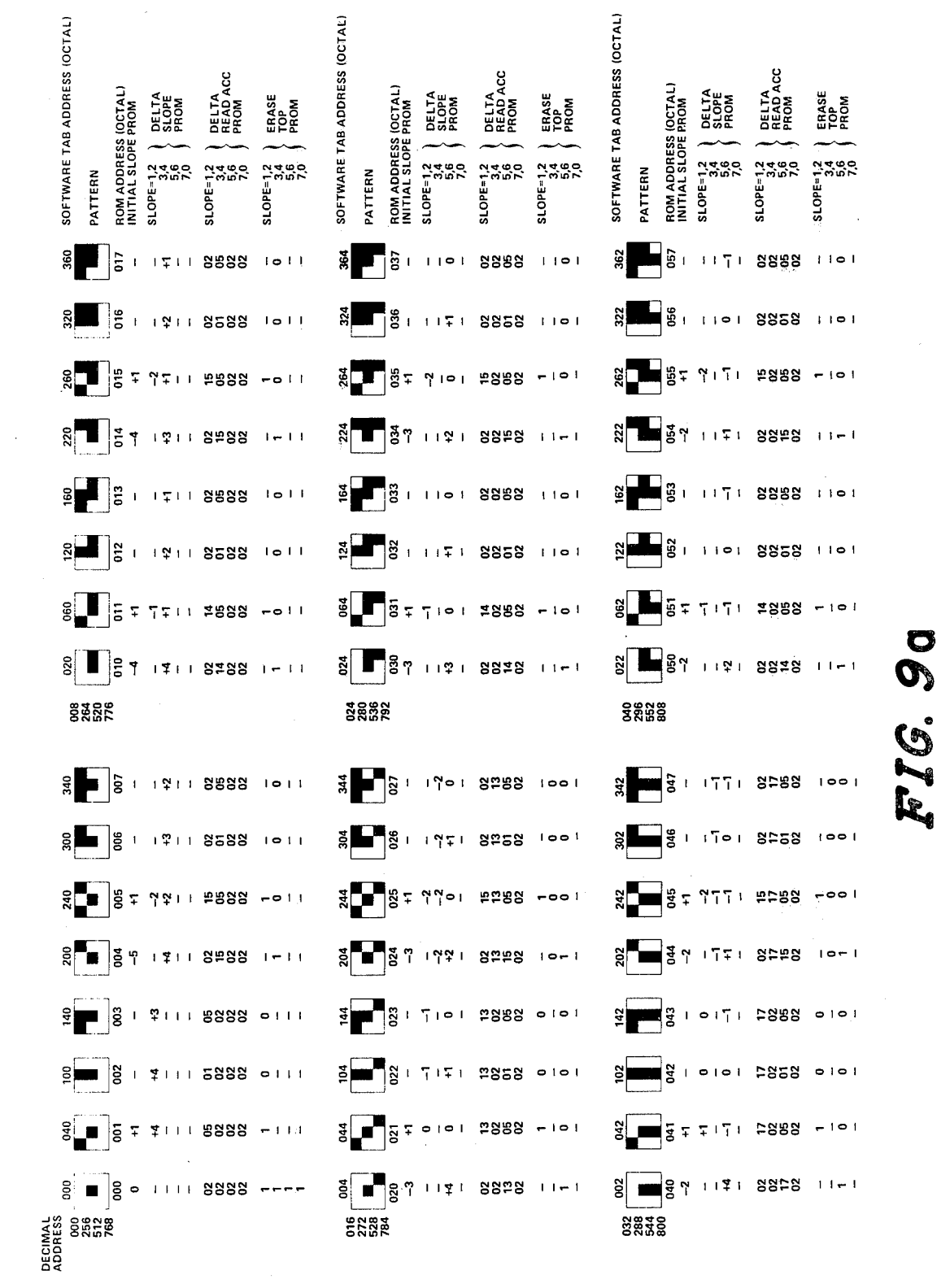
Figure 9B:
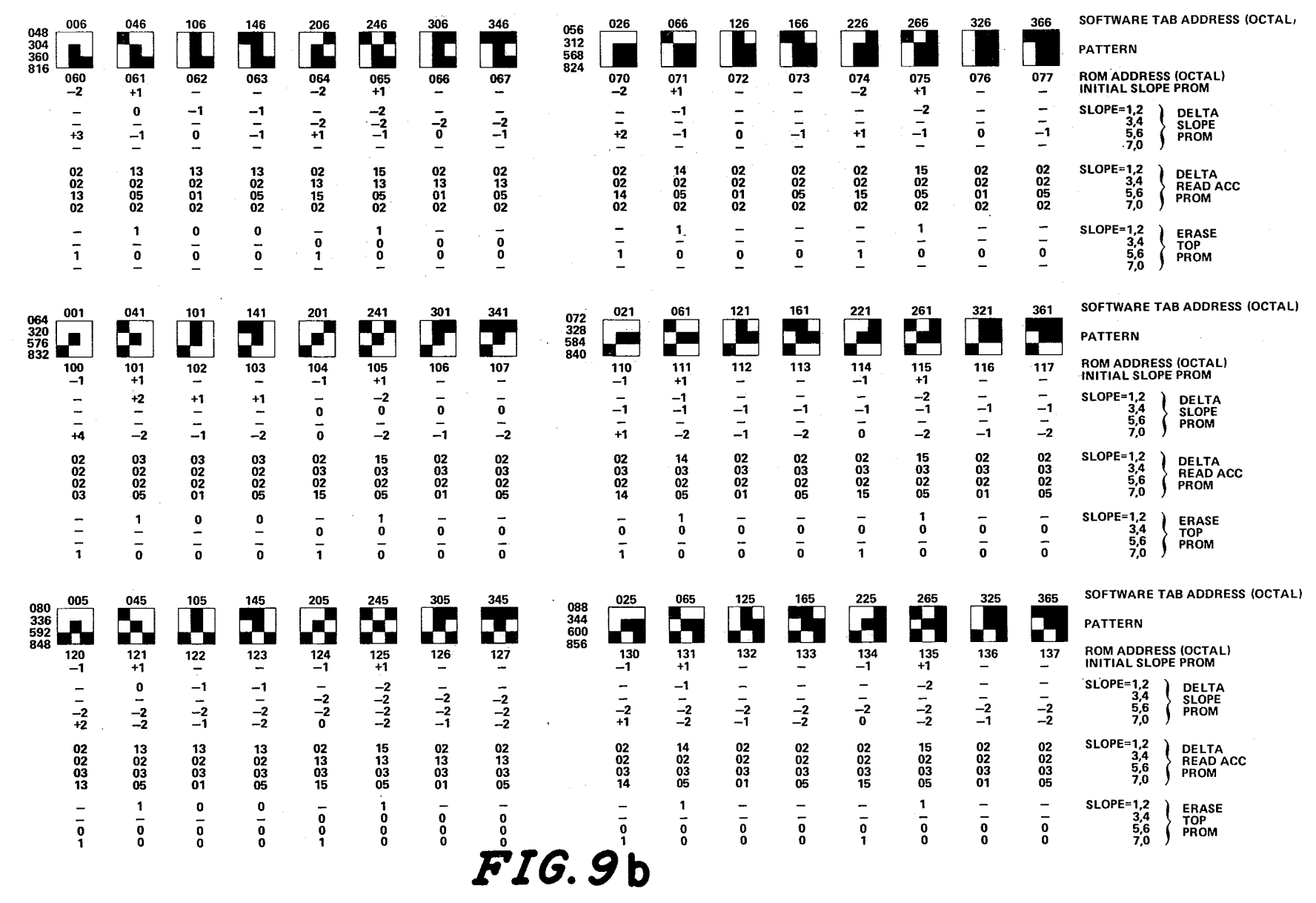
Figure 9C:
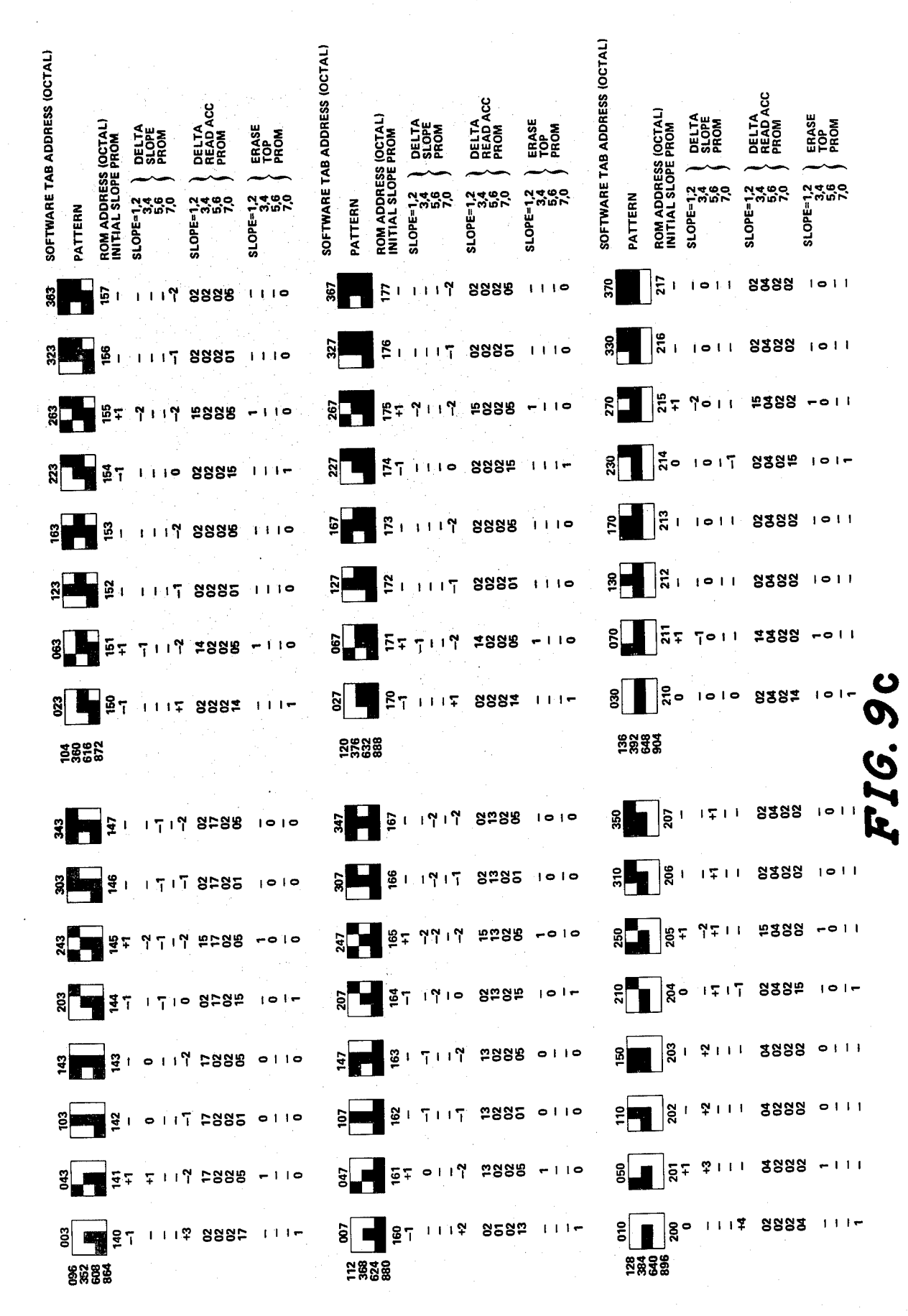
Figure 9D:
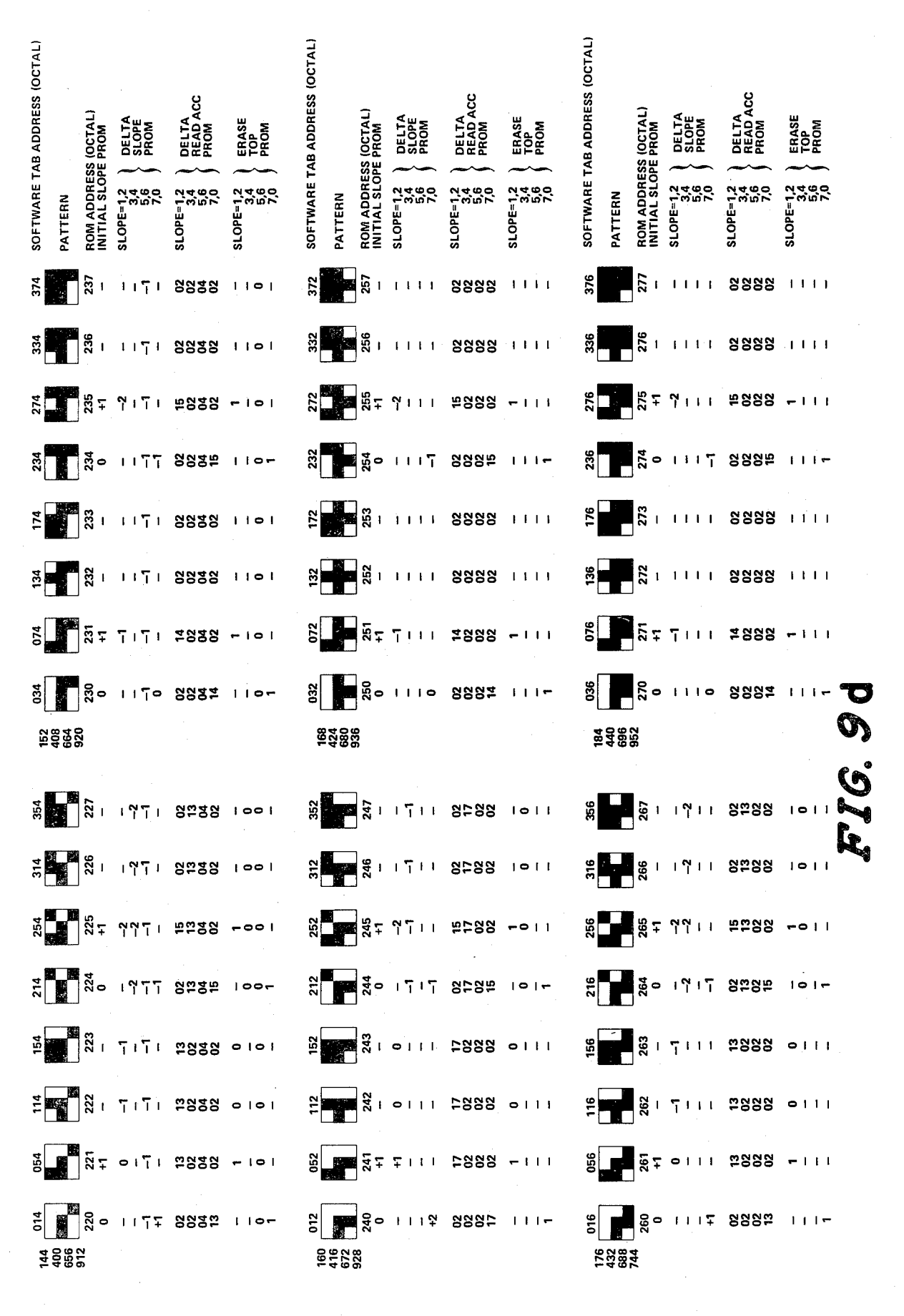
Figure 9E:
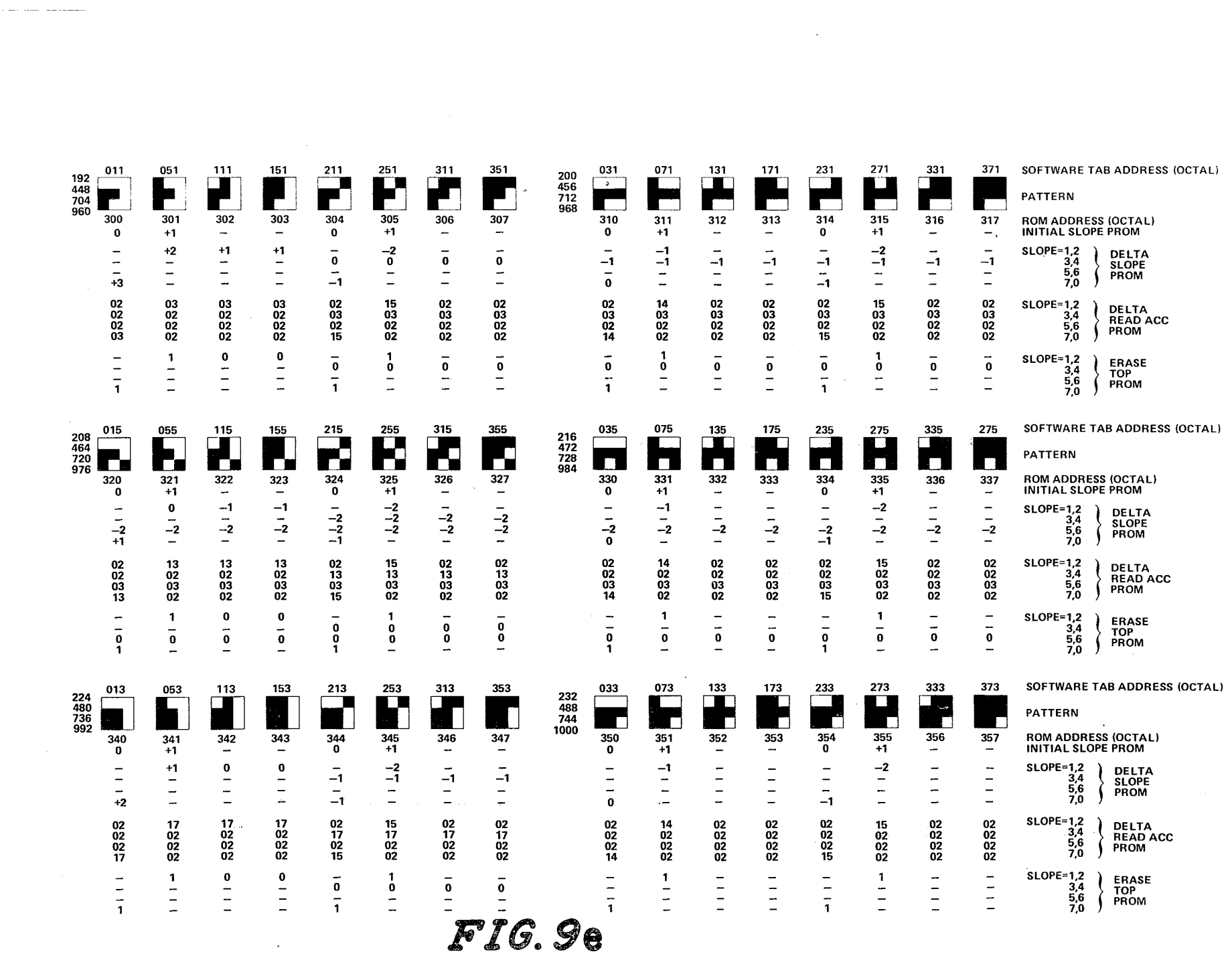
Figure 9F:
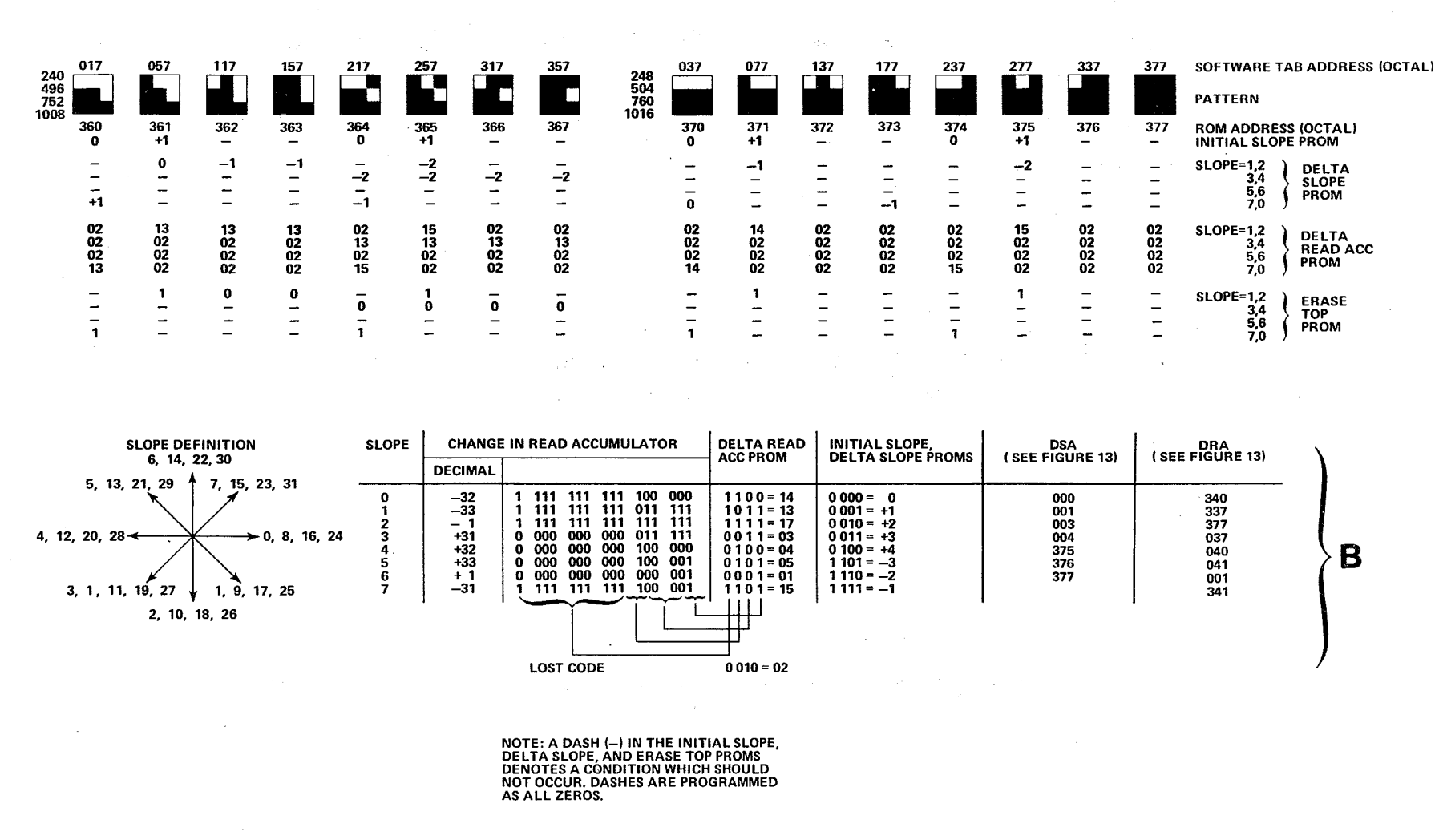

FIG. 9a-9f is a listing of the 9-cell Memory Control PROM Program;

FIG. 12a, b and c show the 9-cell video pattern available from the 9-cell memory;

FIGS. 13a-13b shows a partial slope sequence trace around the circumference of the character A;

FIG. 14a-14h shows the eight features recognized during boundary tracing;

FIG. 15 is a precise definition of the feature Limit PROMs;

FIG. 17 shows the slope average and feature track of the letter A;

FIGS. 18a and 18b are is a flow chart of the inflection detector;

FIG. 20 lists the program of the "DIVIDER PROM" in this feature calculation circuit;

FIG. 21 lists the program of the feature calculation zone lookup PROM;

FIG. 22a–22c is the Tree Memory Control Flow chart;

DESCRIPTION OF THE PREFERRED EMBODIMENT

Figure 1:
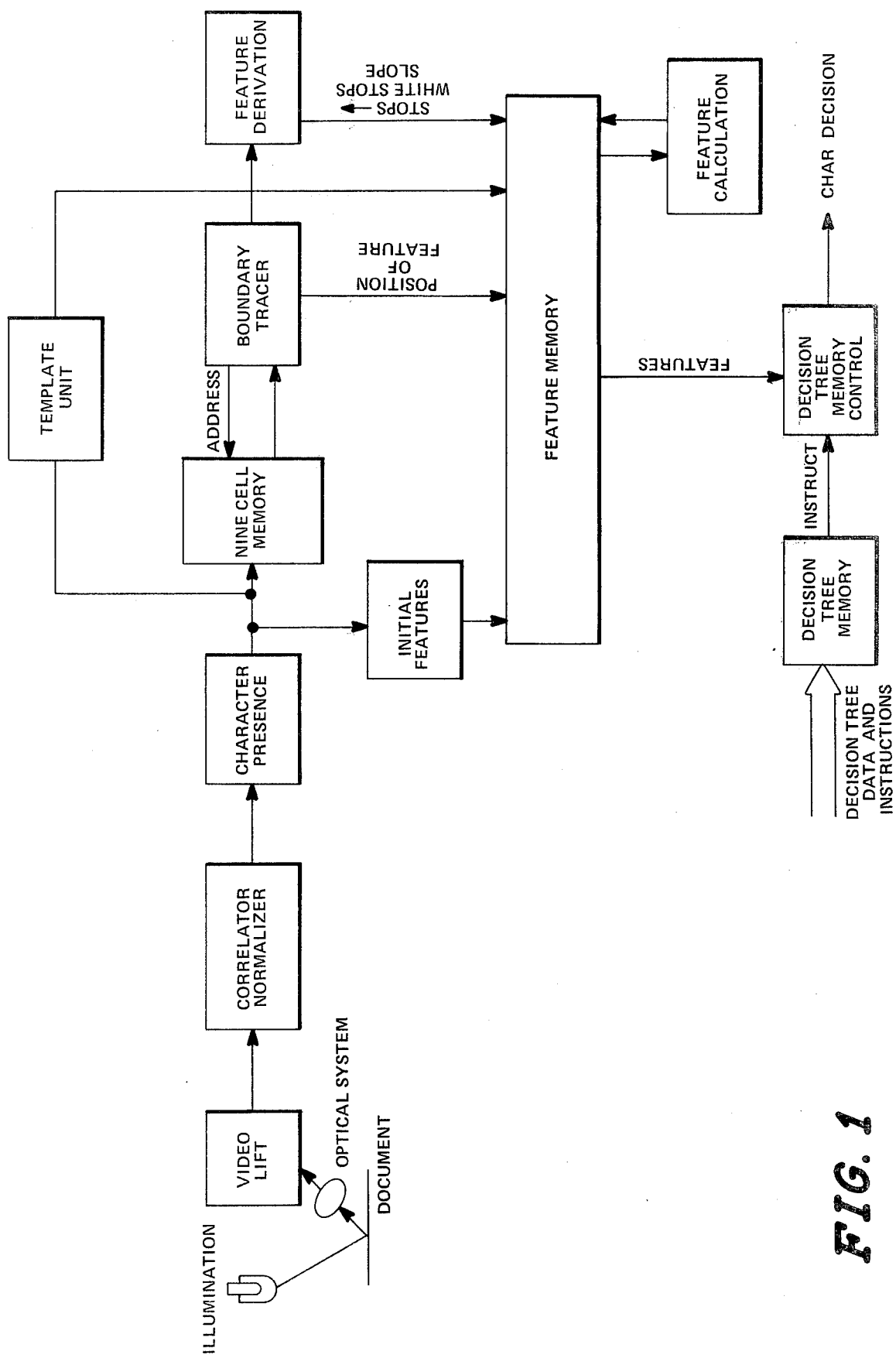
FIG. 1 is a block diagram of the character recognition system.
Figure 1A:
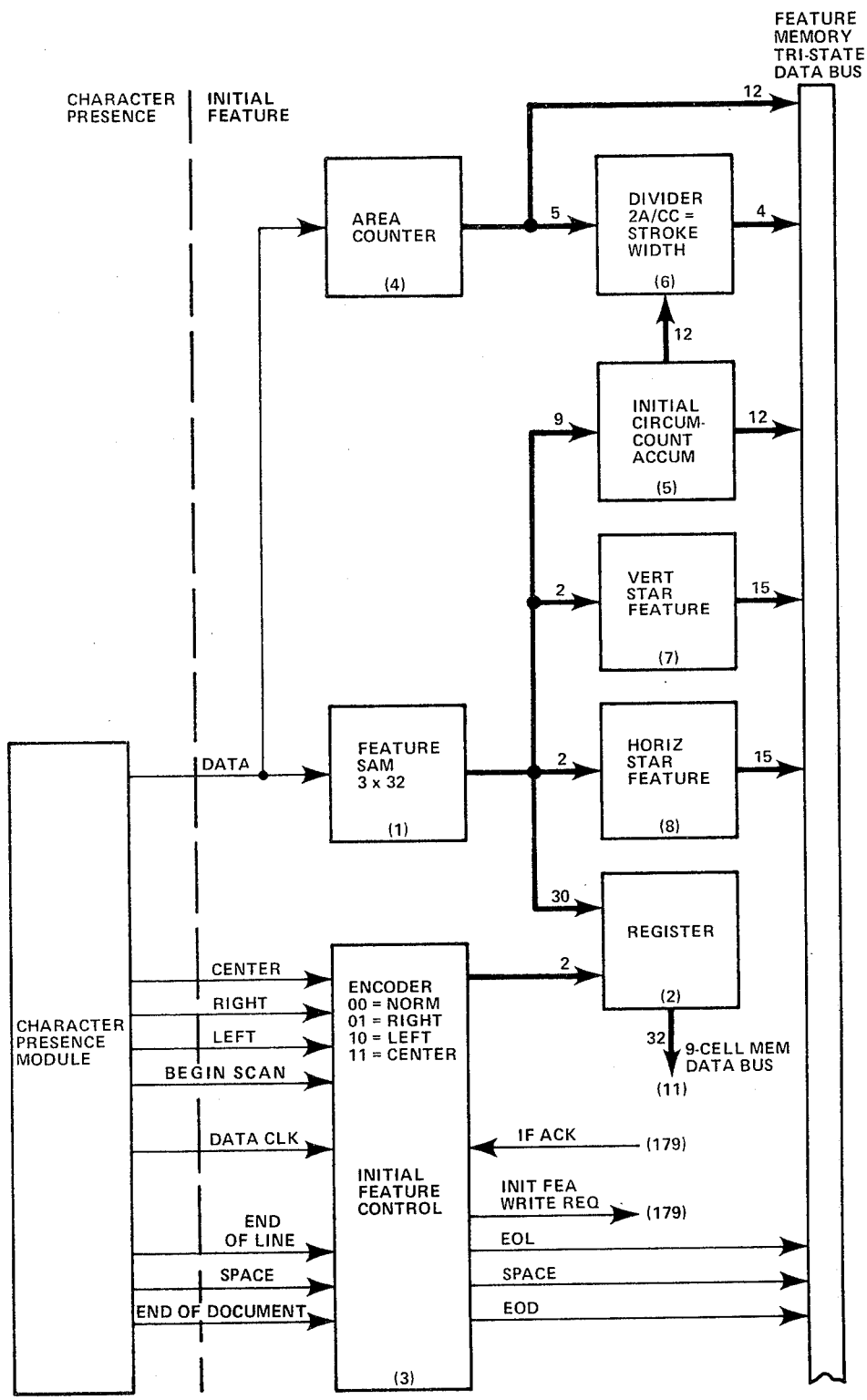
Figure 1C:
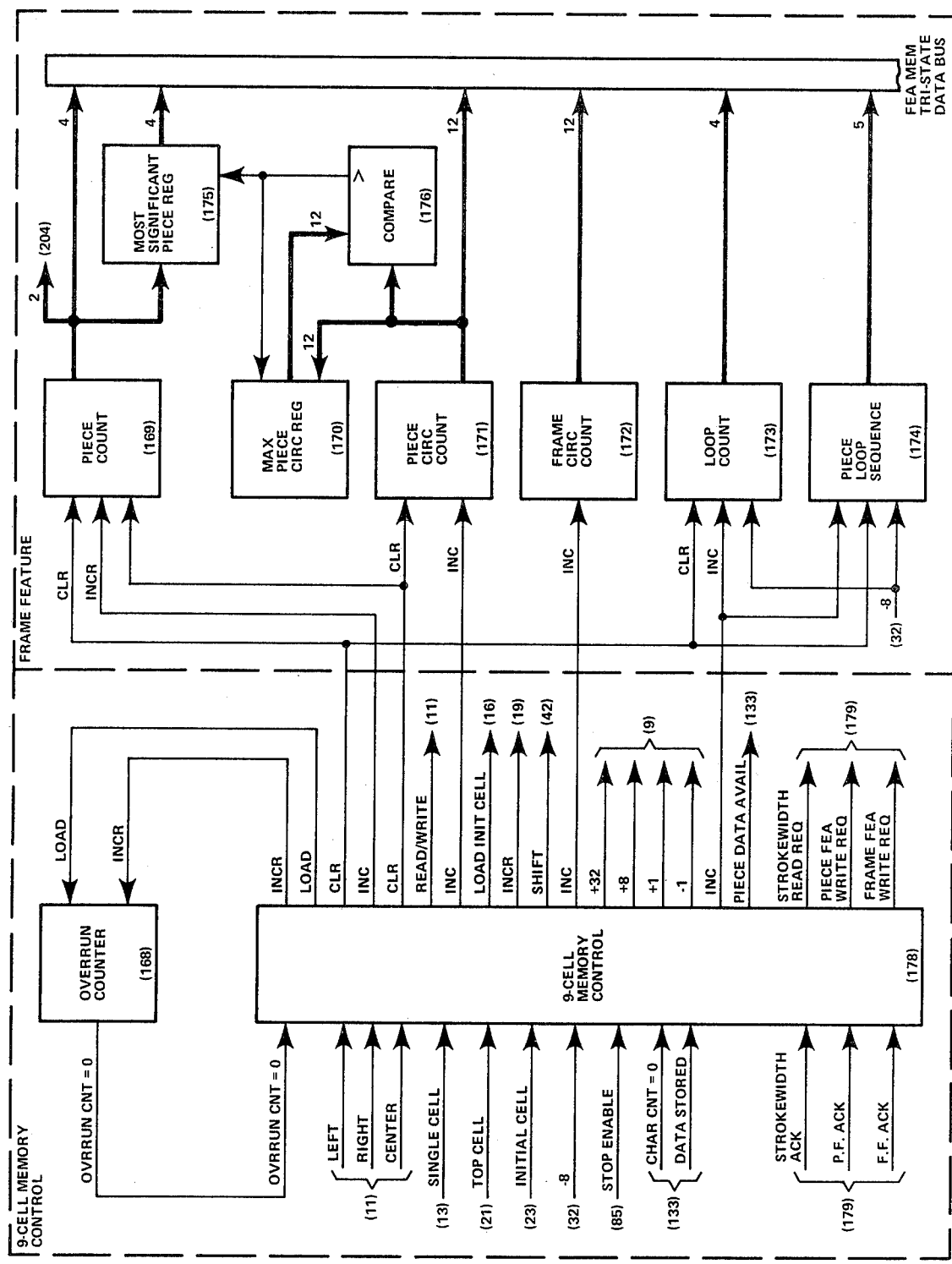
Figure 1D:
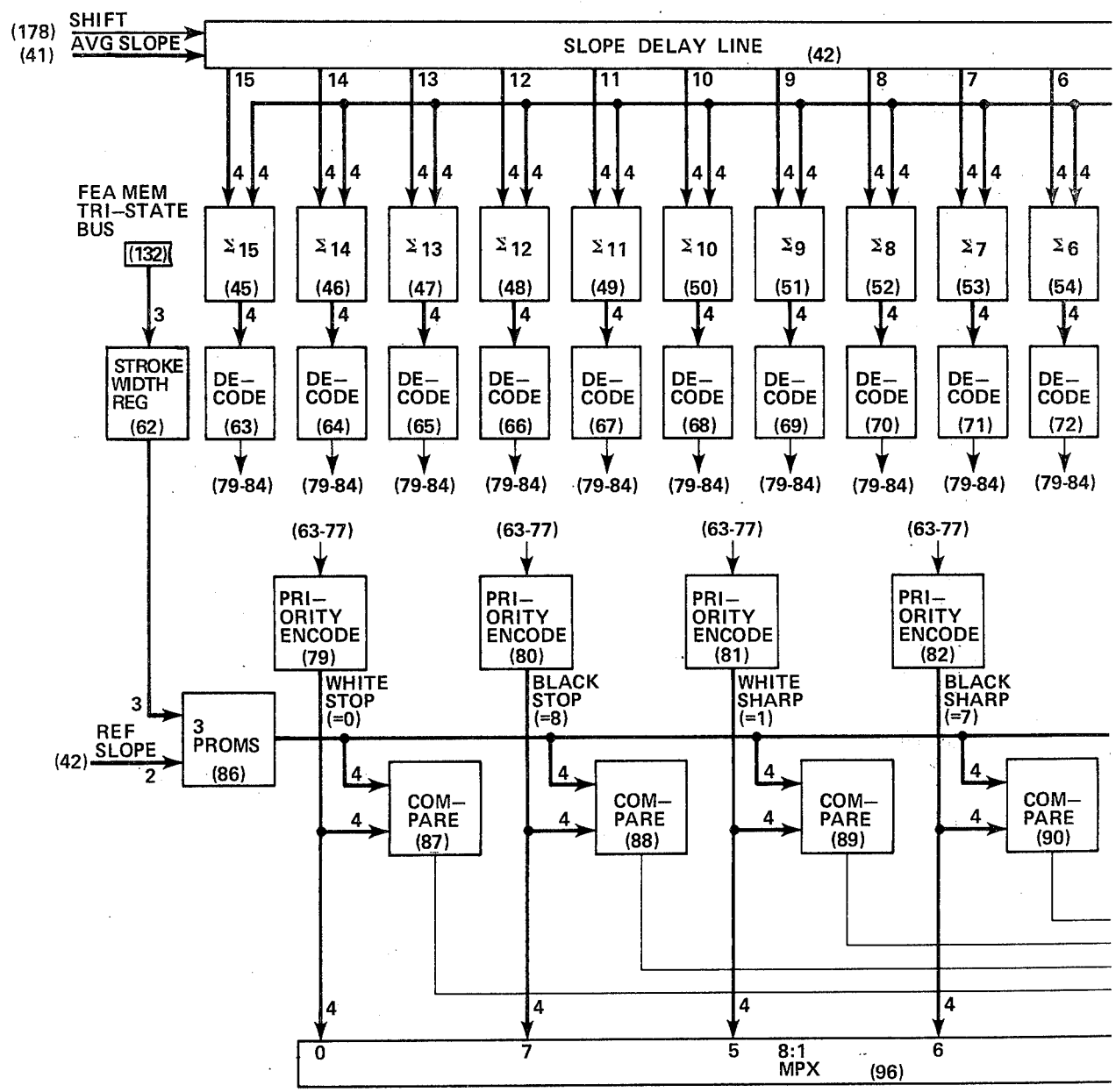
Figure 1D:
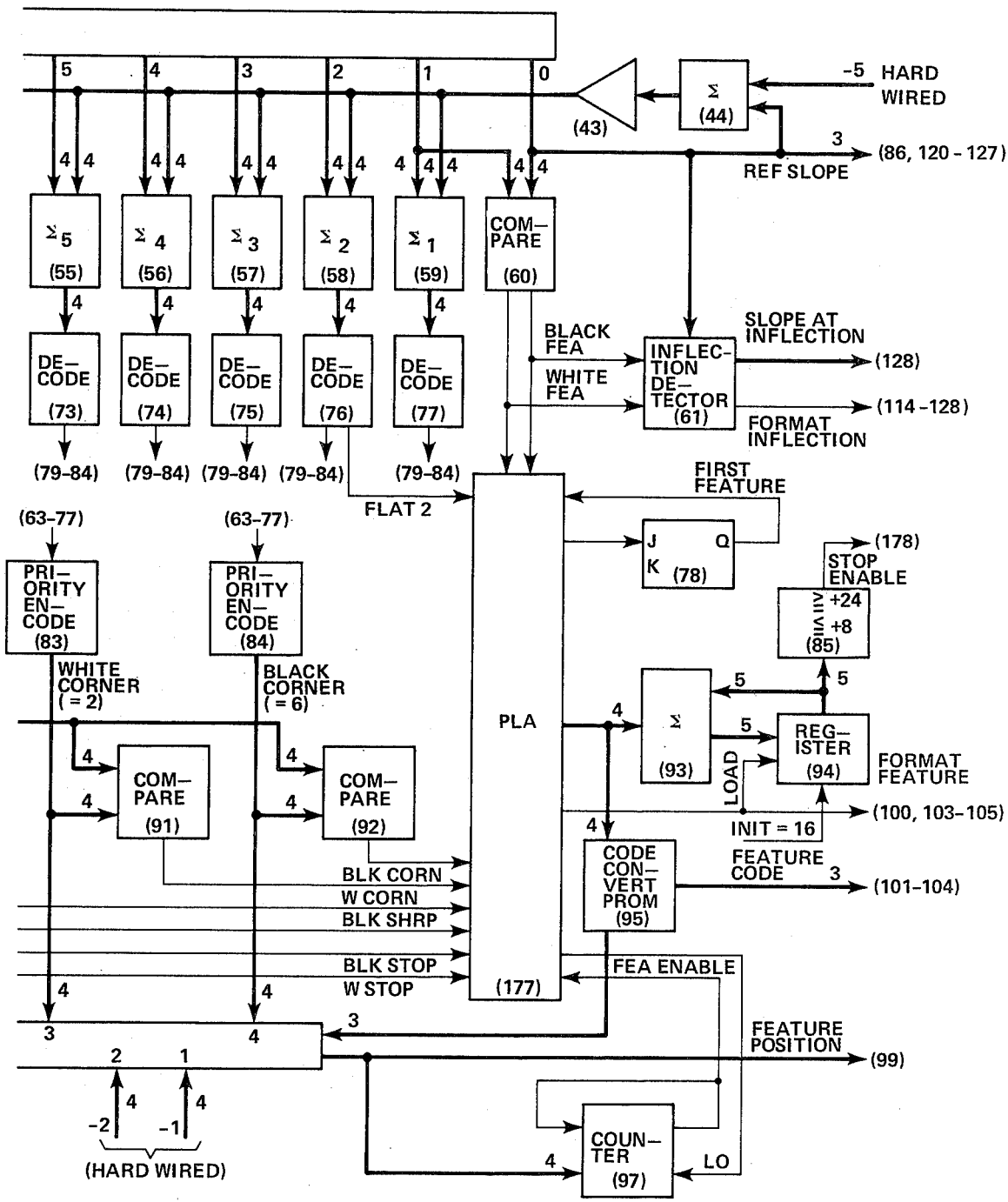
Figure 1E:
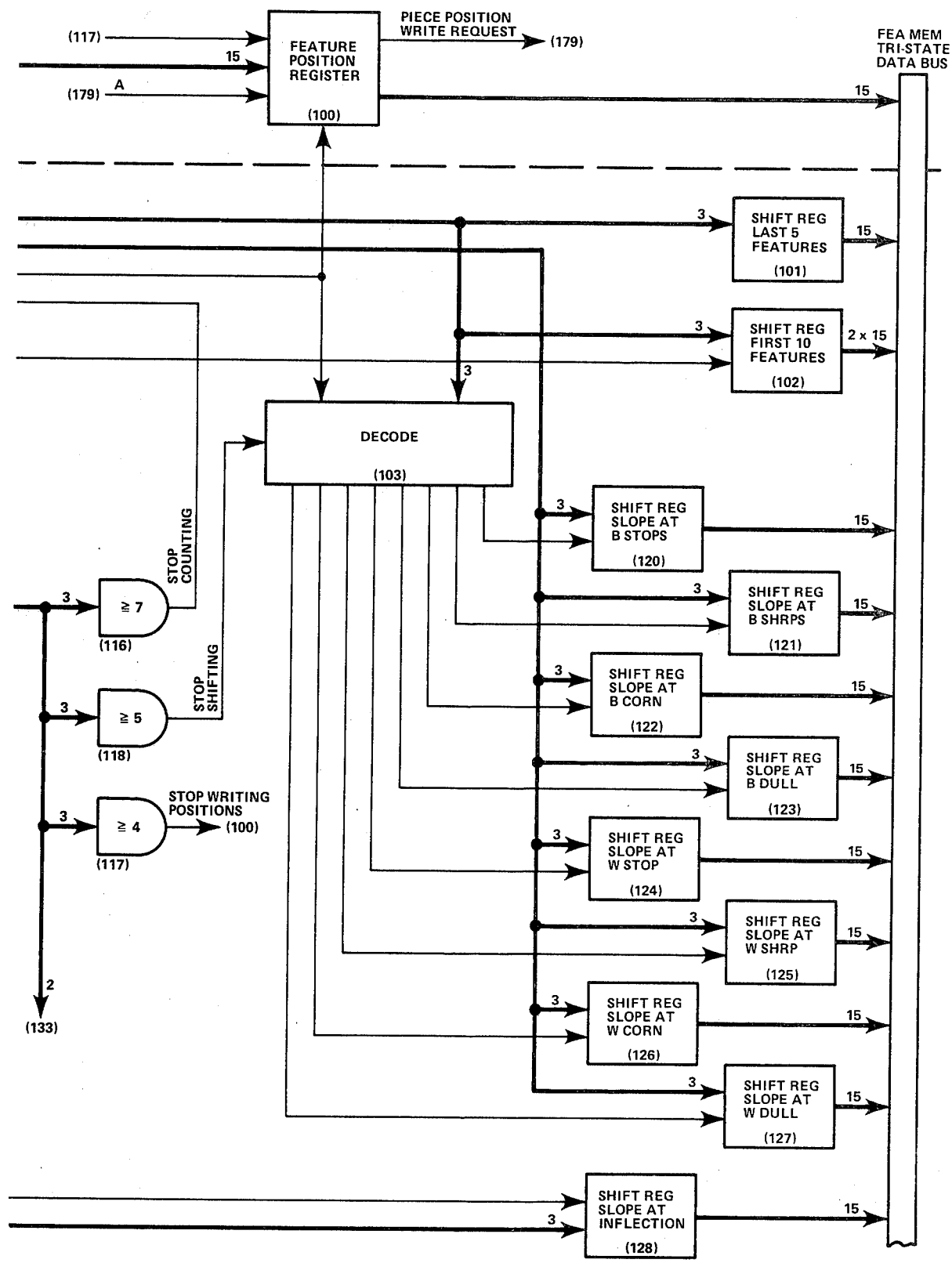
Figure 114:
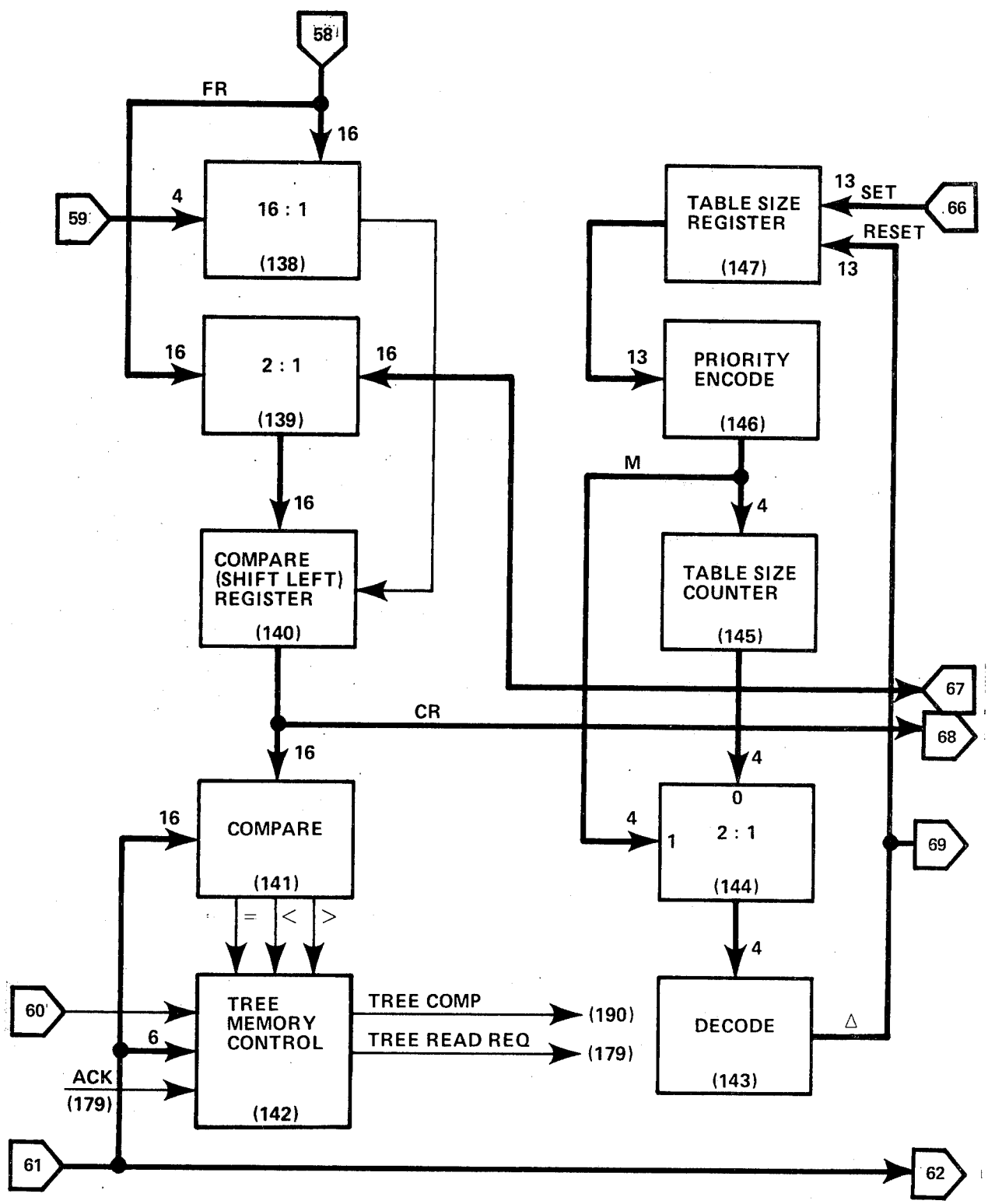
Figure 115:
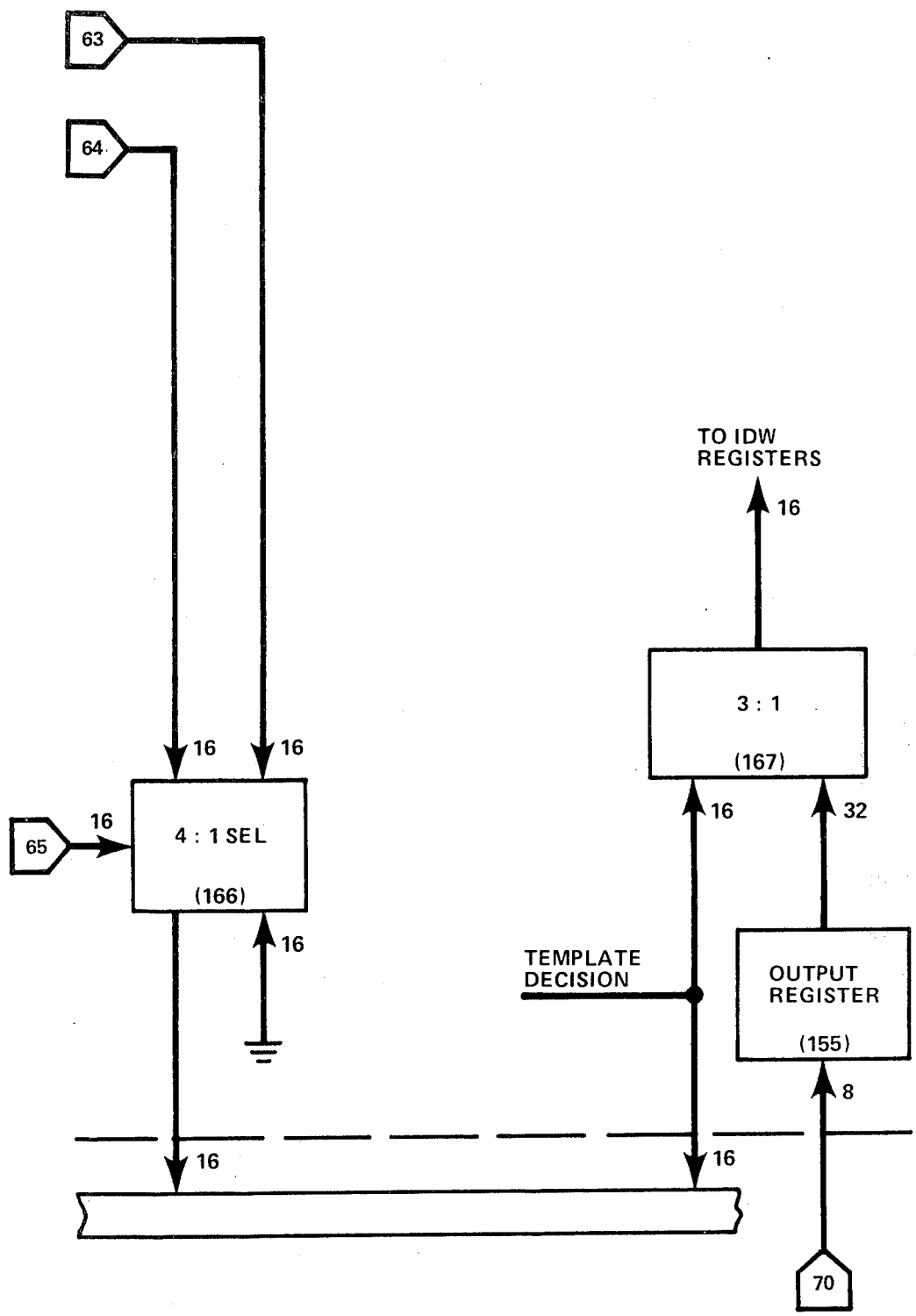
Figure 116:
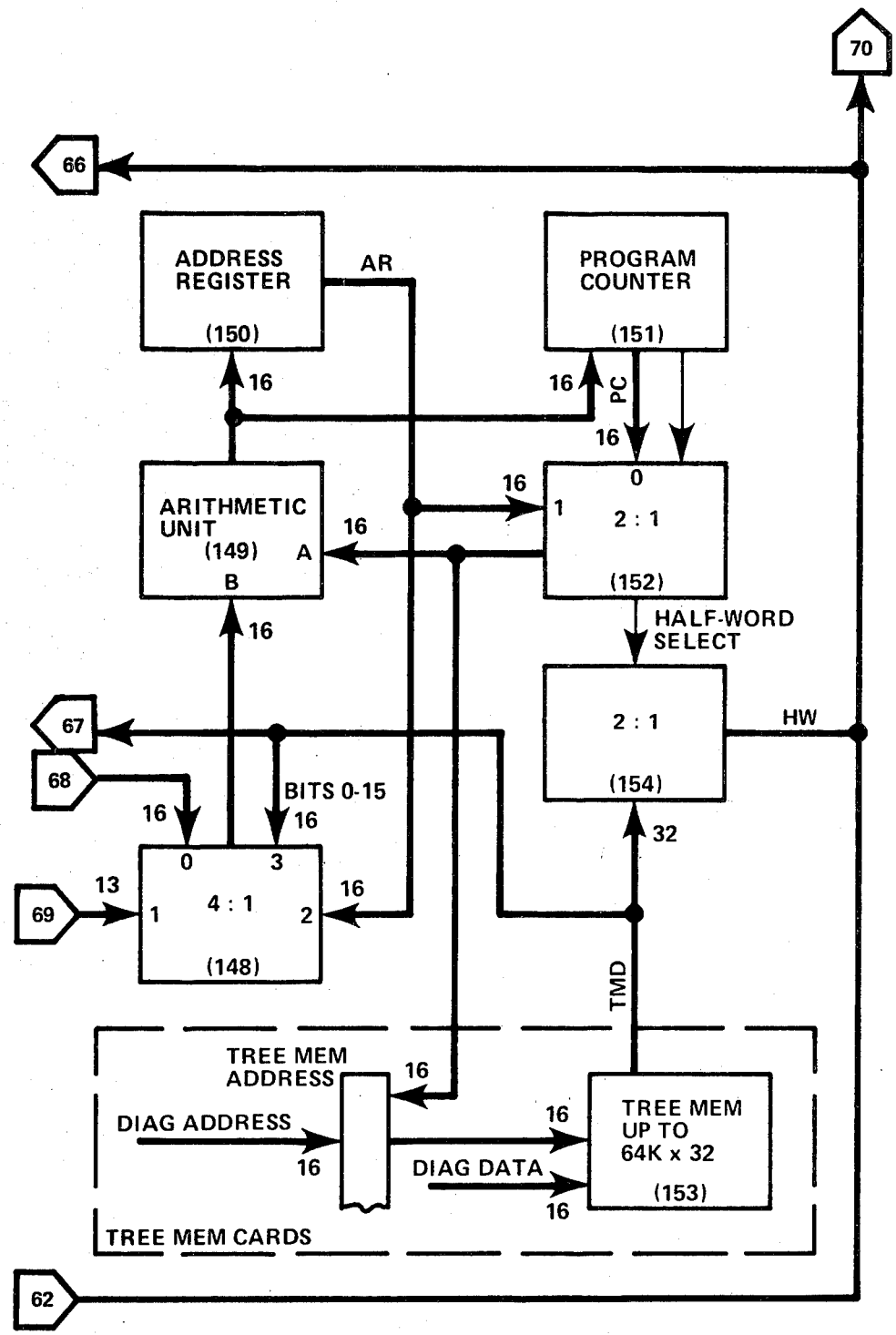
Figure 1:
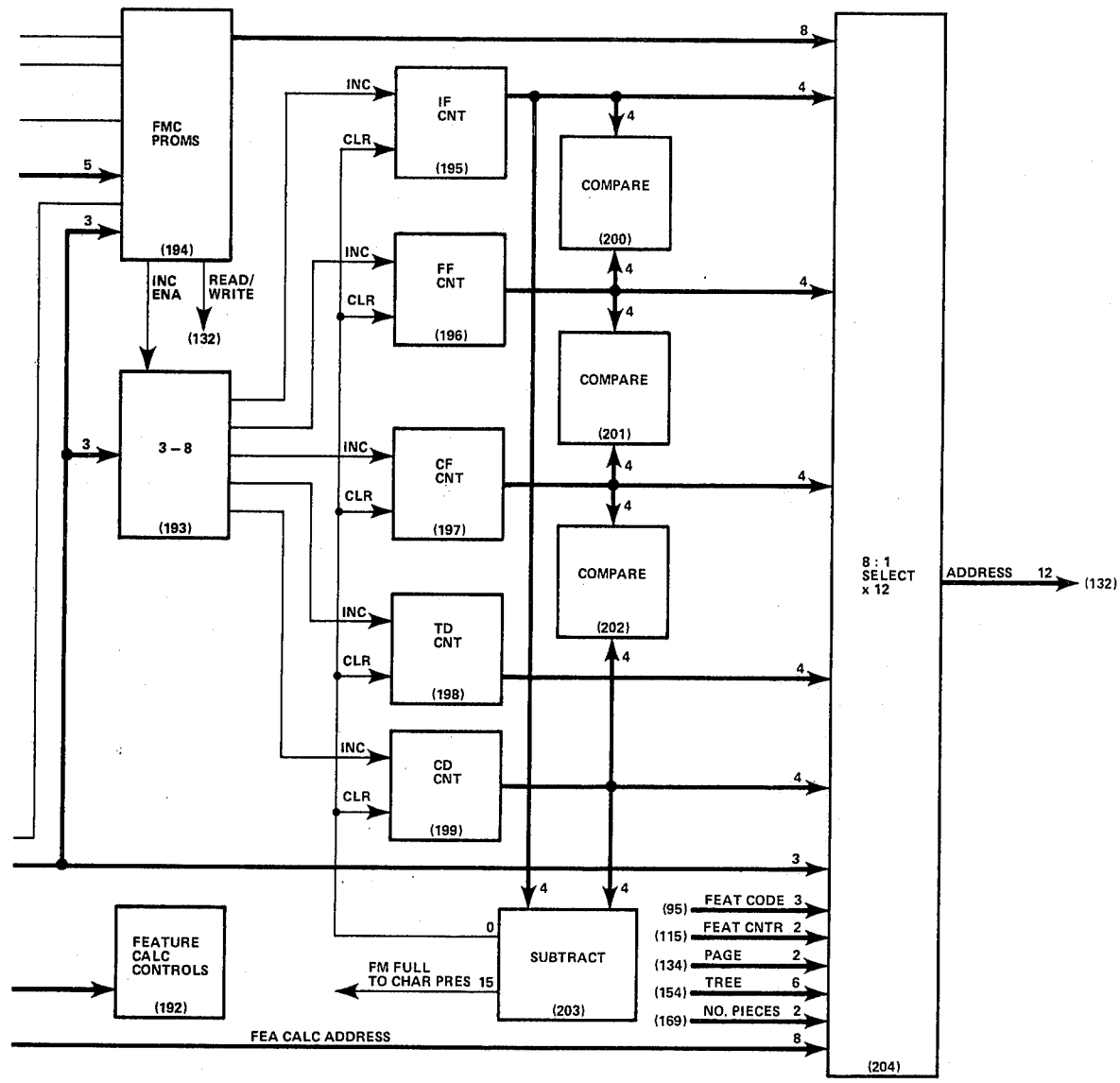
Figure 1H:
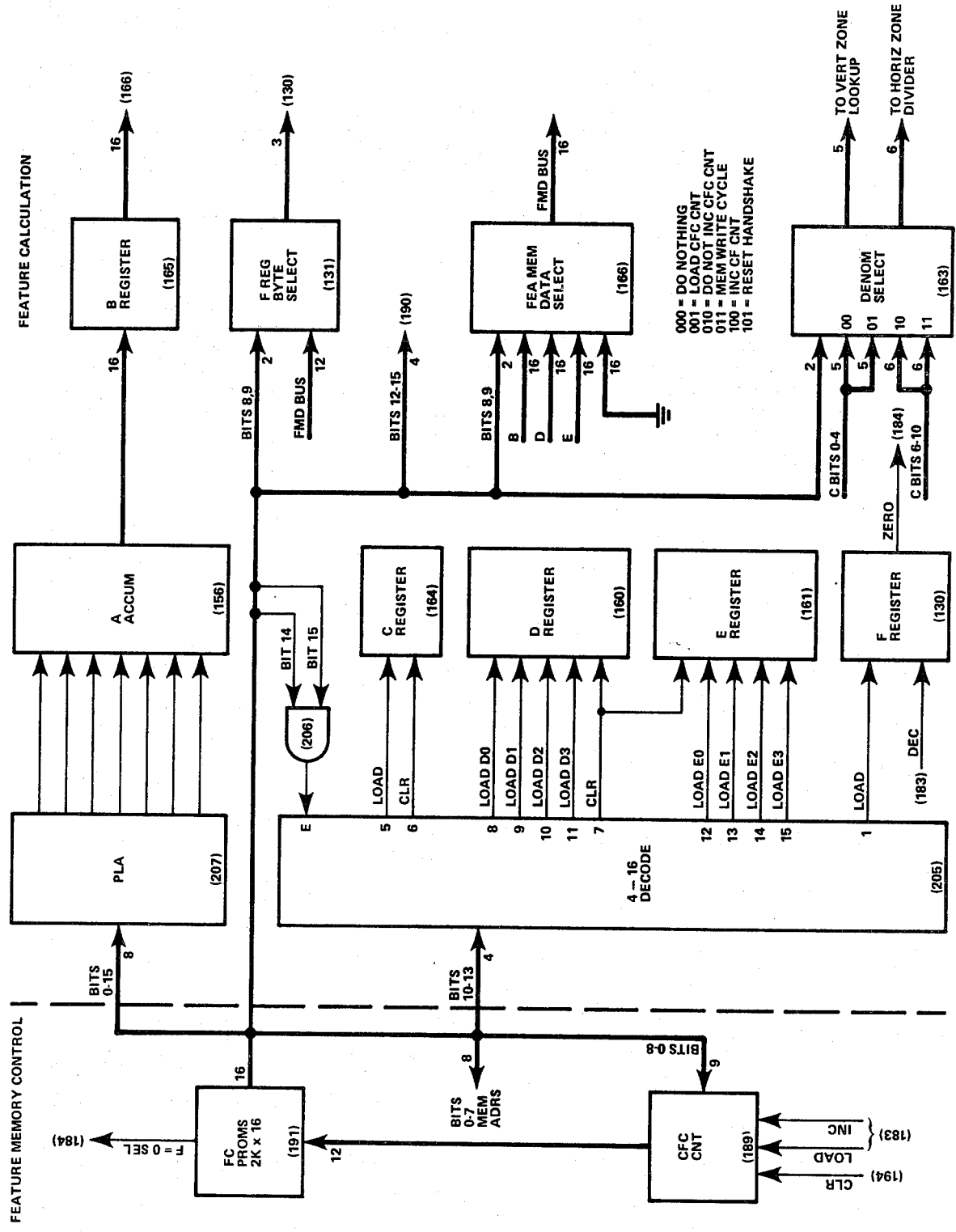

FIG. 1 is a functional block diagram of the character recognition system embodying invention. As is noted, a document is illuminated and scanned through an optical system by video lift which generally is either a single column or matrix array of photo diodes. The video data is then correlated to identify black cells or white cells wherein the black cells identify portions of characters and the white cells are background of the document on which the characters are formed. The video is scanned to detect a character present and stored. The video representation of a character is stored in the cell memory and the video data therein. A boundary trace is performed and features are derived.

The outer circumference of the character and inner sum of any of the loops are traced from an arbitrary point as previously discussed. As the entire boundary is traced the slope information is input to the feature derivation block and also the feature position is placed into the feature memory. Initial feature such as strokewidth of the character, area, circumferance count are derived in the initial feature block and stored in the feature memory. Information from the feature memory is passed onto a character decision tree and a character code is output which is representative of the character identified. The tree memory is programmed to instruct the trace memory controller to look for specific features or combination of features to make the character decision.

The Feature Module attempts to recognize characters based on their shape without reference to their size, and is intended to complement the template module. The feature module processes fonts that are not correctly sized for the template module. The resolver, which compares the feature and template decisions, resides in the feature module.

FIG. 1a–1h is a block diagram of the feature module. The feature module receives nine input signals from the character presence module. The signals are:

a. Data—Data is sent serially as correlated (black/white), normalized (nominally 16-cell tall characters), vertically analyzed (lines above and below the character that appear in this line have been removed) video. Each bit of video represents a cell, approximately 0.1524 millimeter tall by 0.0762 millimeter wide, on paper, if lifted at a 1:1 normalization factor, and is in order as scanned from bottom to top, 32 cells-per-scan. The scans are in order from right to left on the document.

b. Data Clock—The data clock is a 6 MHz square wave. The data line defined above changes on the high to low transition of this clock.

c. Begin Scan—The begin scan signal is true for one complete clock cycle, once each thirty-second clock, during the cell zero (bottom cell) data time.

d. Left—The left signal is generated in the character presence module. It is true during the left scan of a frame of video that the character presence module has determined to contain a character.

e. Center—The center signal is generated within the character presence module and is true during the center scan of a frame of video.

f. Right—The right signal, generated in the character presence module, is true during the right scan of a frame. The right of one frame may or may not be adjacent in time to the left of the preceding frame, but frames may not overlap. The minimum frame consists of only three scans, a right, center and left. There is no maximum frame width within practical limits. A frame could range up to 1,024 scans wide.

g. End-of-Line—The end-of-line signal goes true after the left signal of the last frame on a line and remains true throughout approximately 24 scans of white video following the line. The feature module requires only two scans of white to flush out the line; the remaining 22 scans are for the template module. No lefts, centers or rights are generated by the character presence module during the end-of-line signal.

h. End-of-Document—The end-of-document signal goes true simultaneously with the end-of-line signal if the line just entered was the final line of video on the document.

i. Space—The space signal goes true to indicate that the character presence module has detected a space (as between words). The space signal is as wide as the space with a minimum width of three scans.

All of the input lines enter the feature module at the initial feature card. The data first enters the SAM (scan assembler memory, block 1) which is a 3-scan wide by 32-bit long shift register. The SAM is represented by detail drawing A in FIG. 2. Data is shifted in at the top of the left 32-bit register, out of the bottom of the left register and into the top of the center register, out of the bottom of the center register and into the top of the right register. After 41 clocks (one scan and 9 clocks) the 30 bits indicated by the dashed lines 10 (FIG. 2) are moved into the register (block 2) and a write request is generated to the 9-cell memory. This action is repeated each 8-cell times for the remainder of the frame.

Simultaneously, the encoder (block 3) has encoded the left, center and right signals into a 2-bit code. The codes are: 00=normal scan; 01=right scan; 10=left scan; and 11=center scan.

Figure 2:
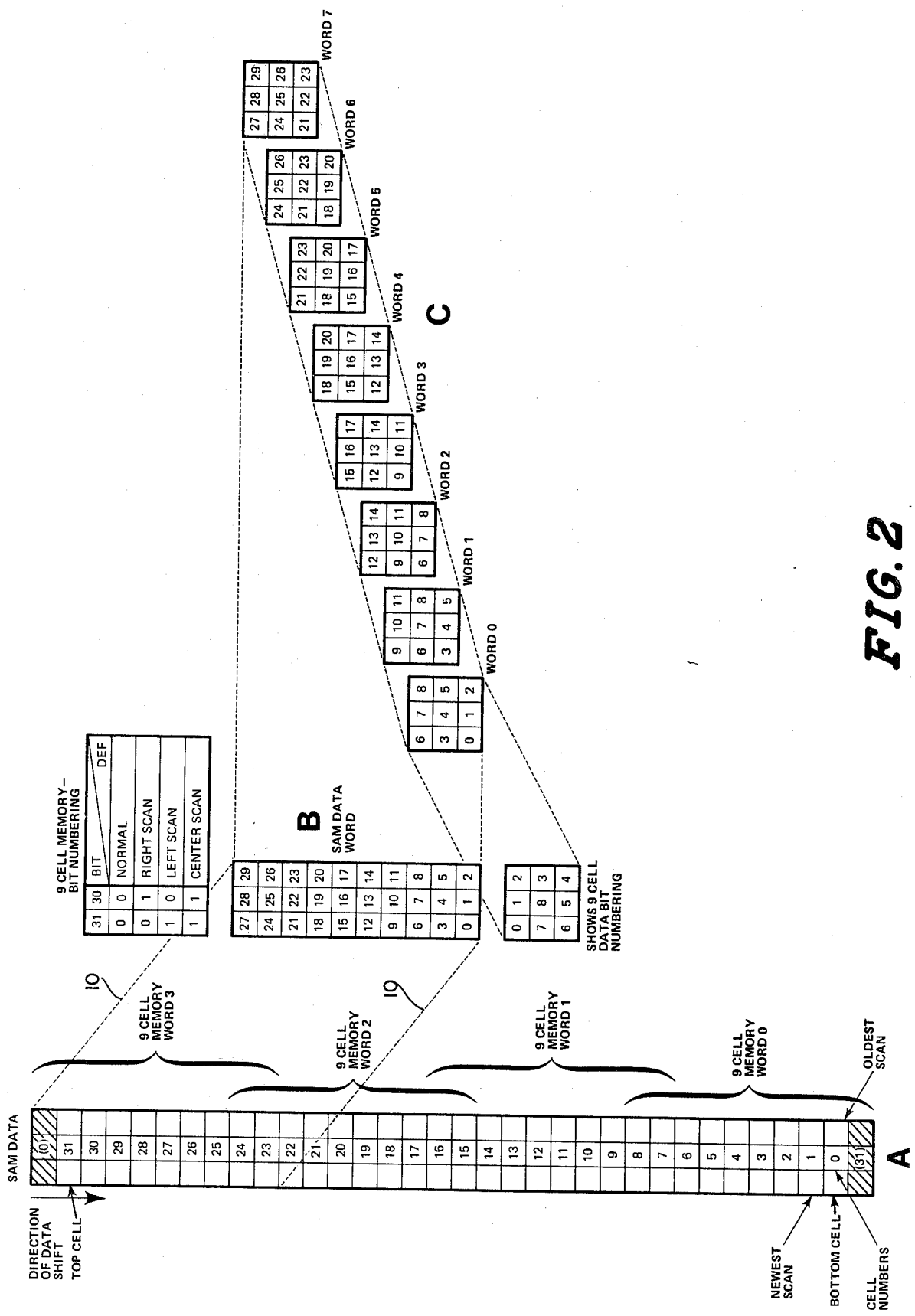
Figure 7A:
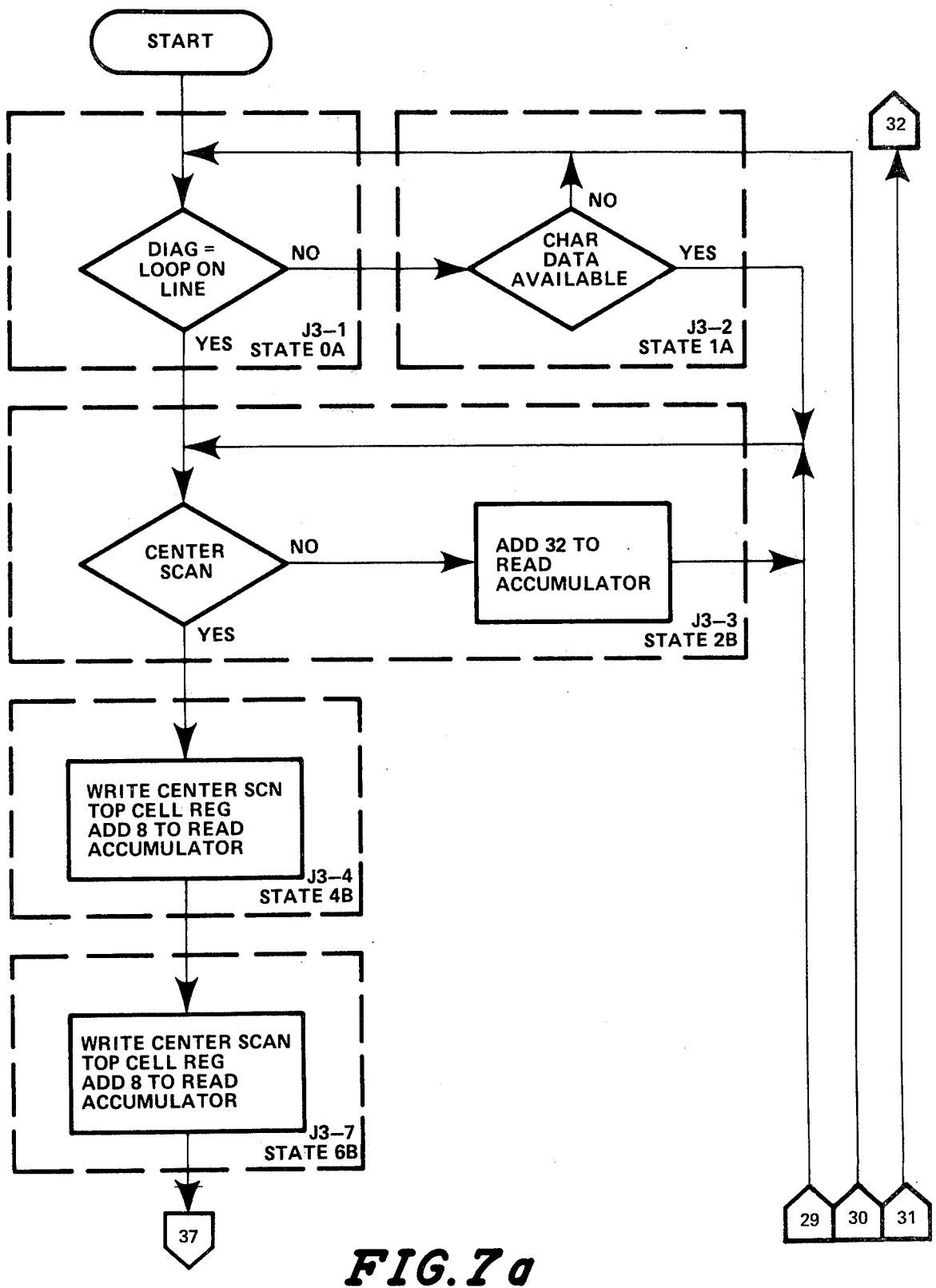
FIGS. 7a-7g is a control flow chart of the 9-cell memory control.
Figure 7B:
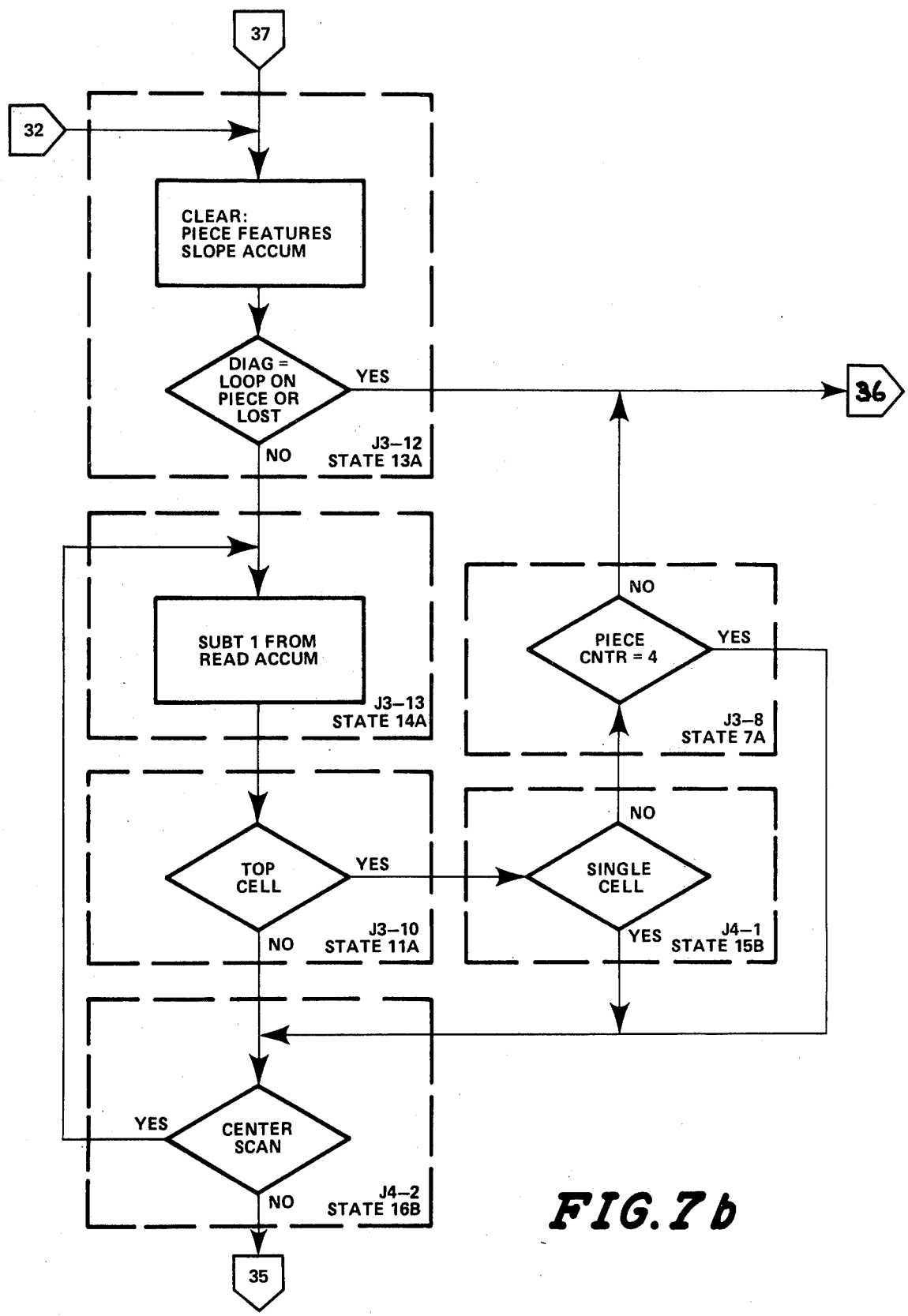
Figure 7C:
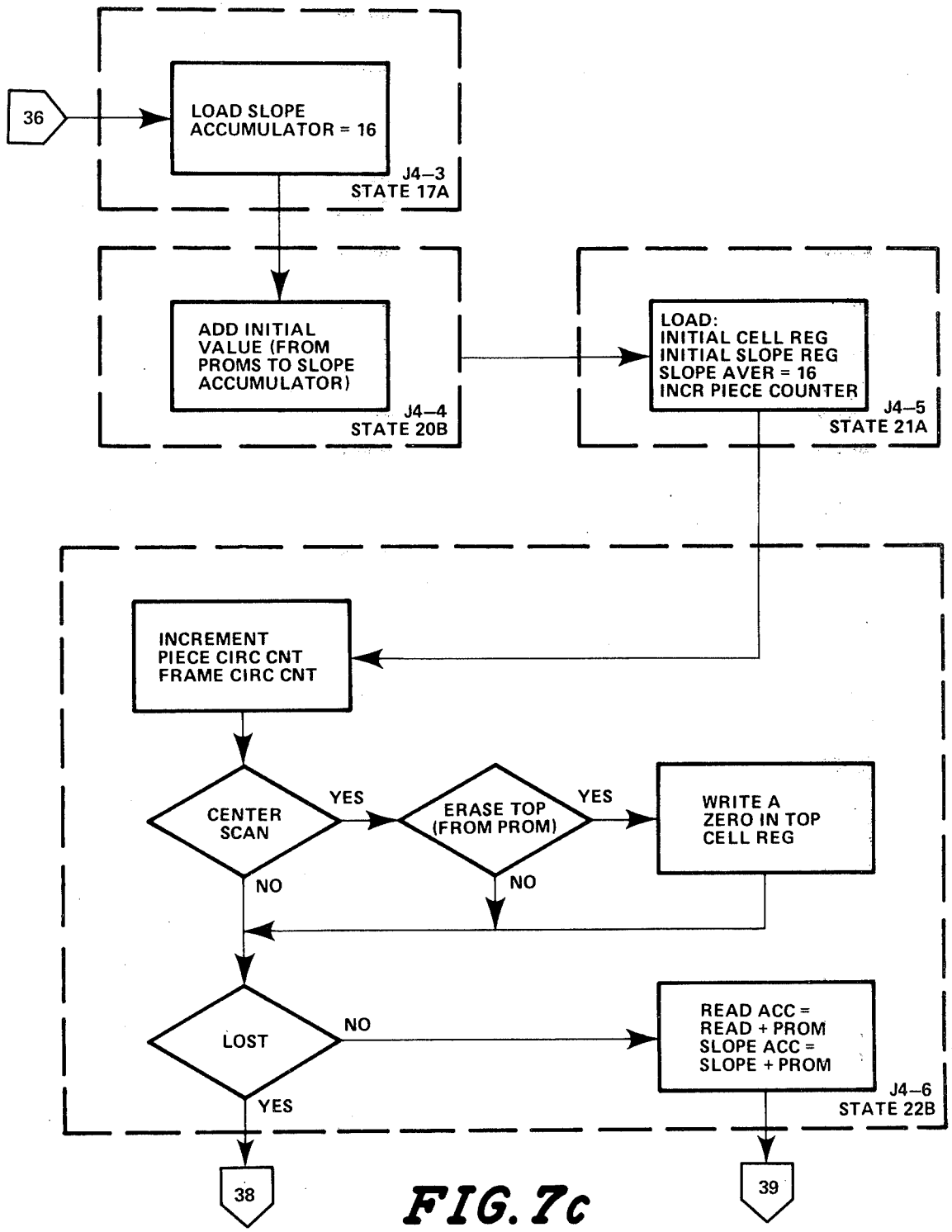
Figure 7D:
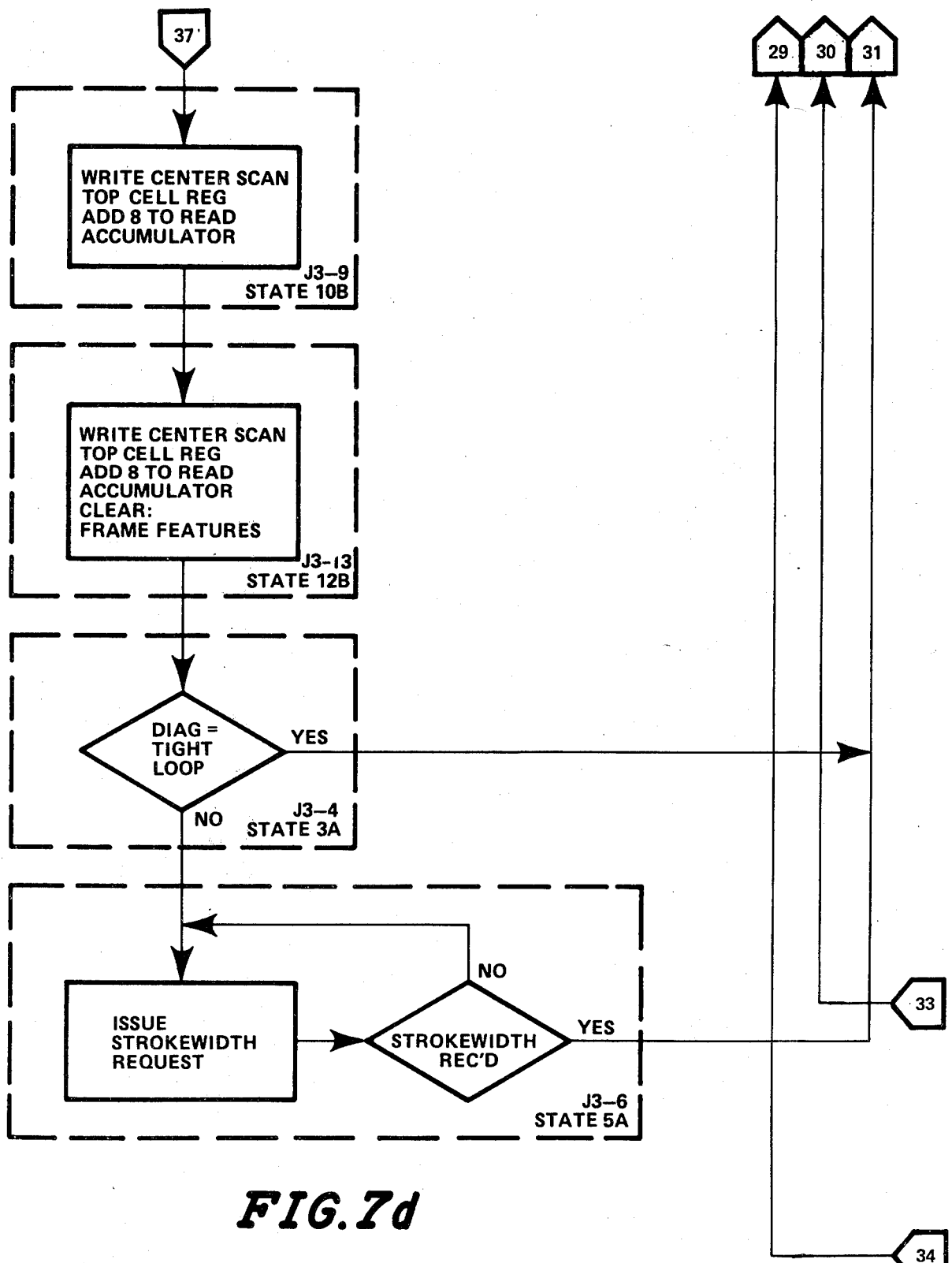
Figure 7E:
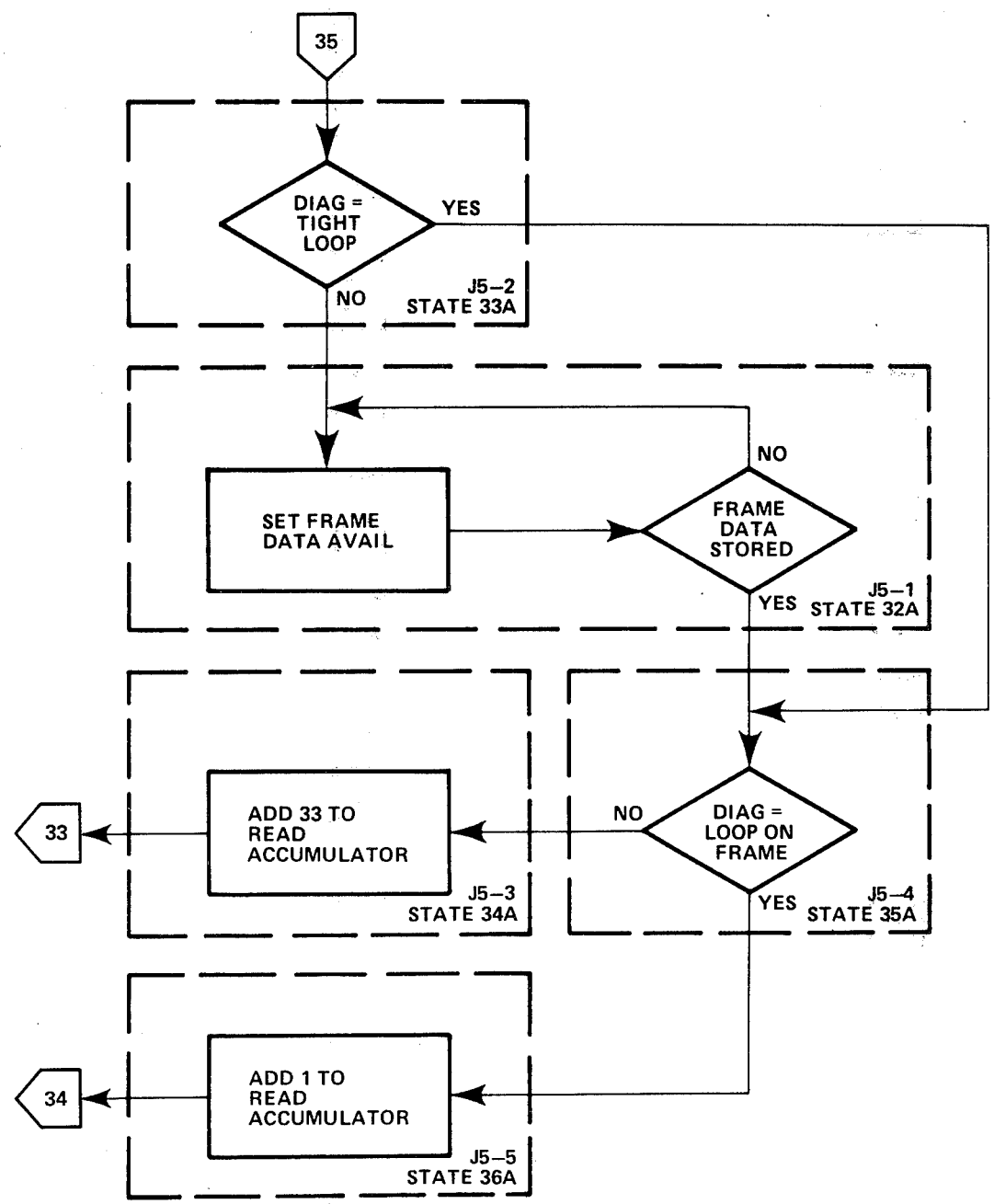
Figure 7F:
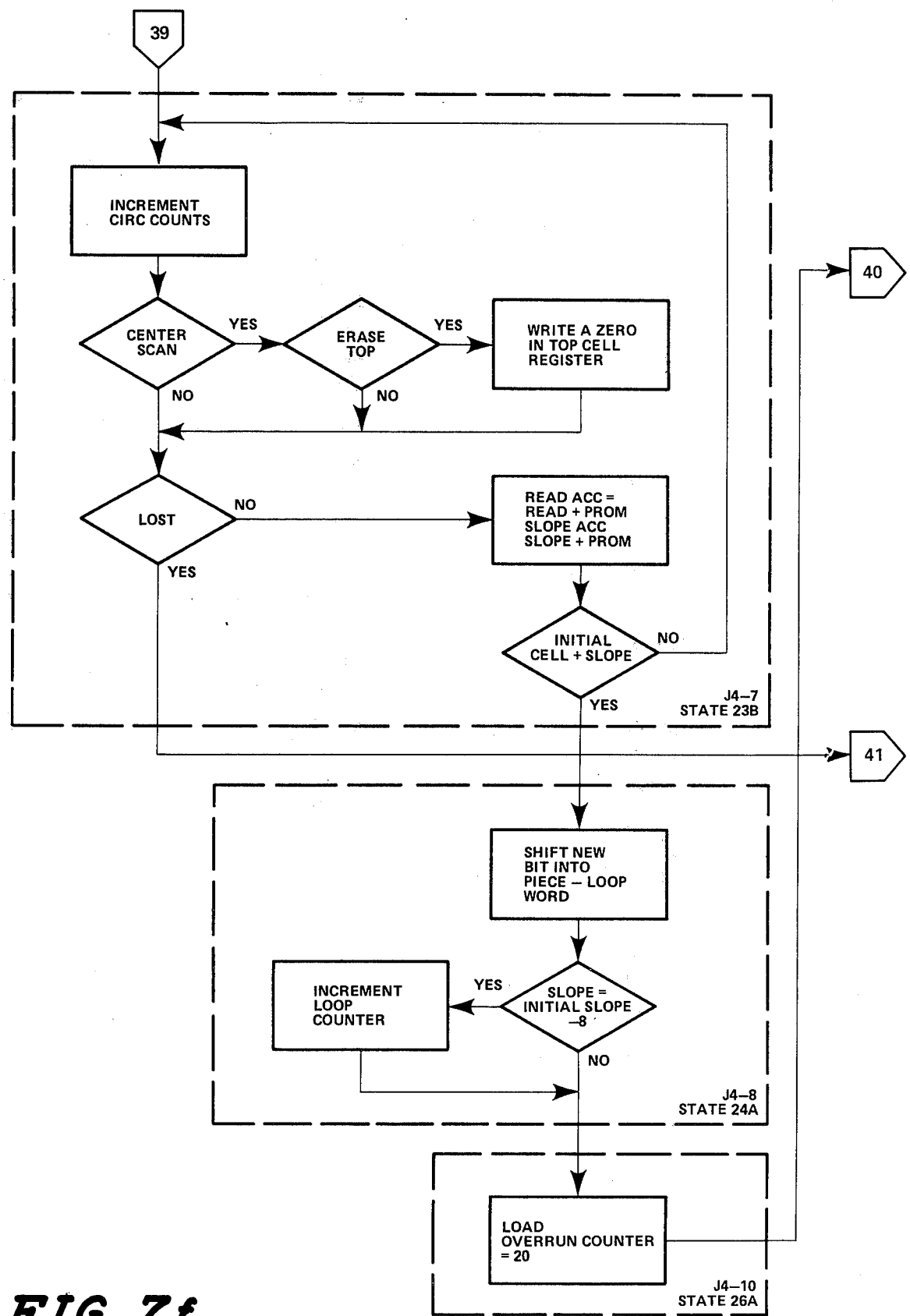
Figure 7G:
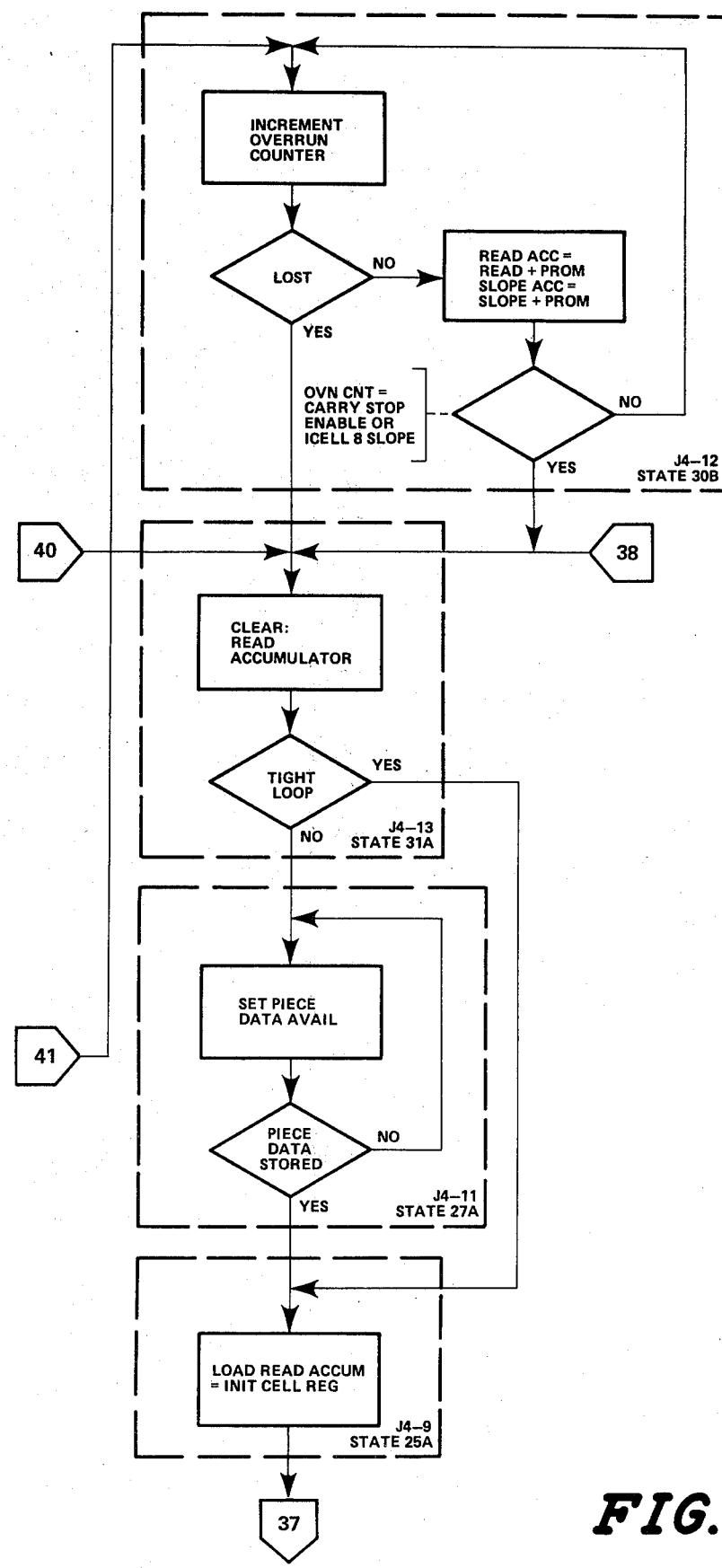

The code is delayed the proper amount to be loaded into the register (block 2) simultaneously with the 30 bits of SAM data. The net effect is to load into the 9-cell memory, four 32-bit words for each scan which contain 30 bits of video data and two bits of code to mark that scan as a right, center, left or normal. Note that, as shown in FIG. 2 word 0 overlaps word 1 at the top and contains cell 31 of the previous scan at the bottom. Word 1 overlaps word 0 at the bottom and word 2 at the top. Word 2 overlaps words 1 and 3, and word 3 overlaps word 2 and contains cell 0 of the next scan. The reason for storing so much redundant data will become apparent in the explanation of the 9-cell memory control.

Figure 3A:
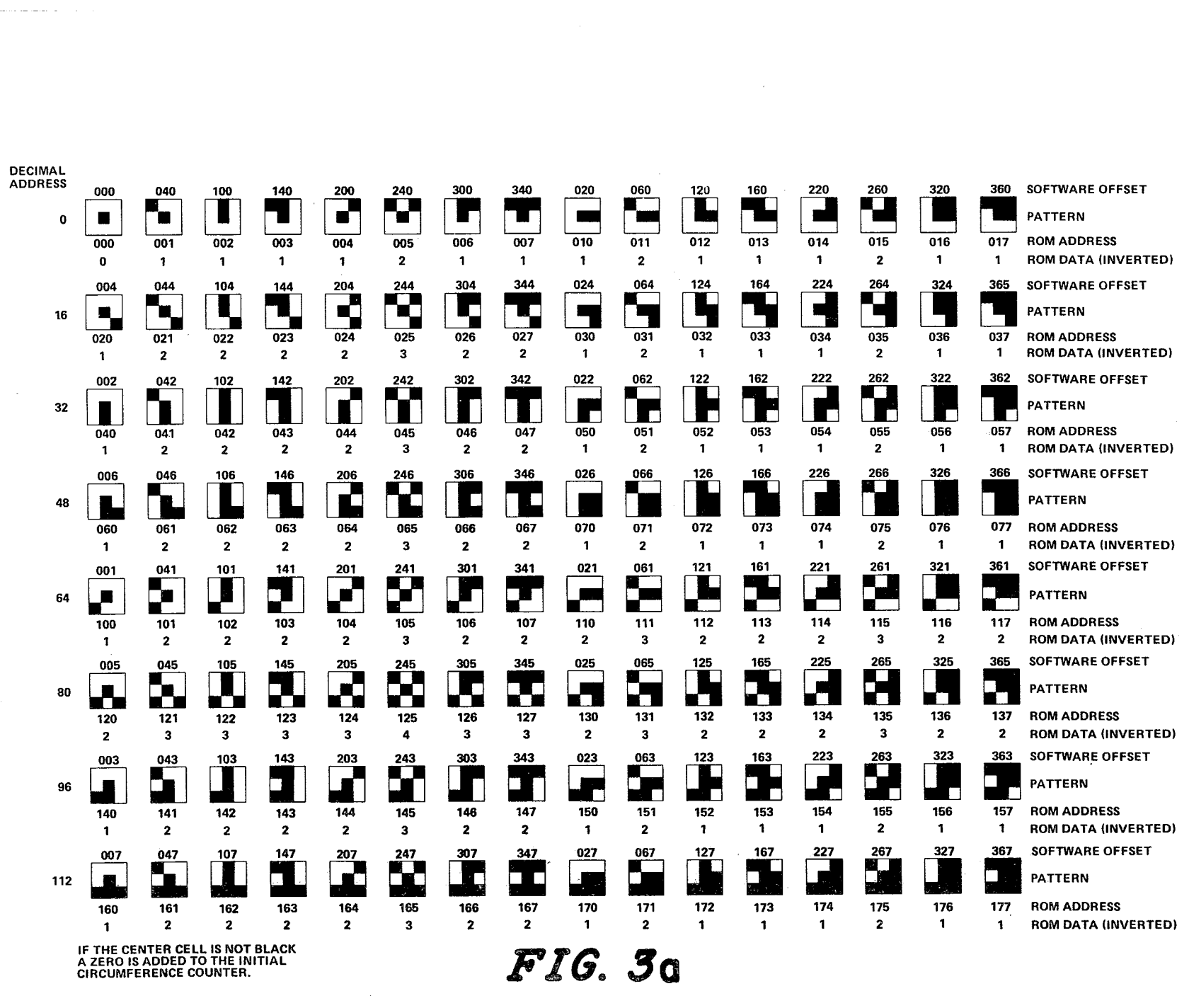
Figure 3B:
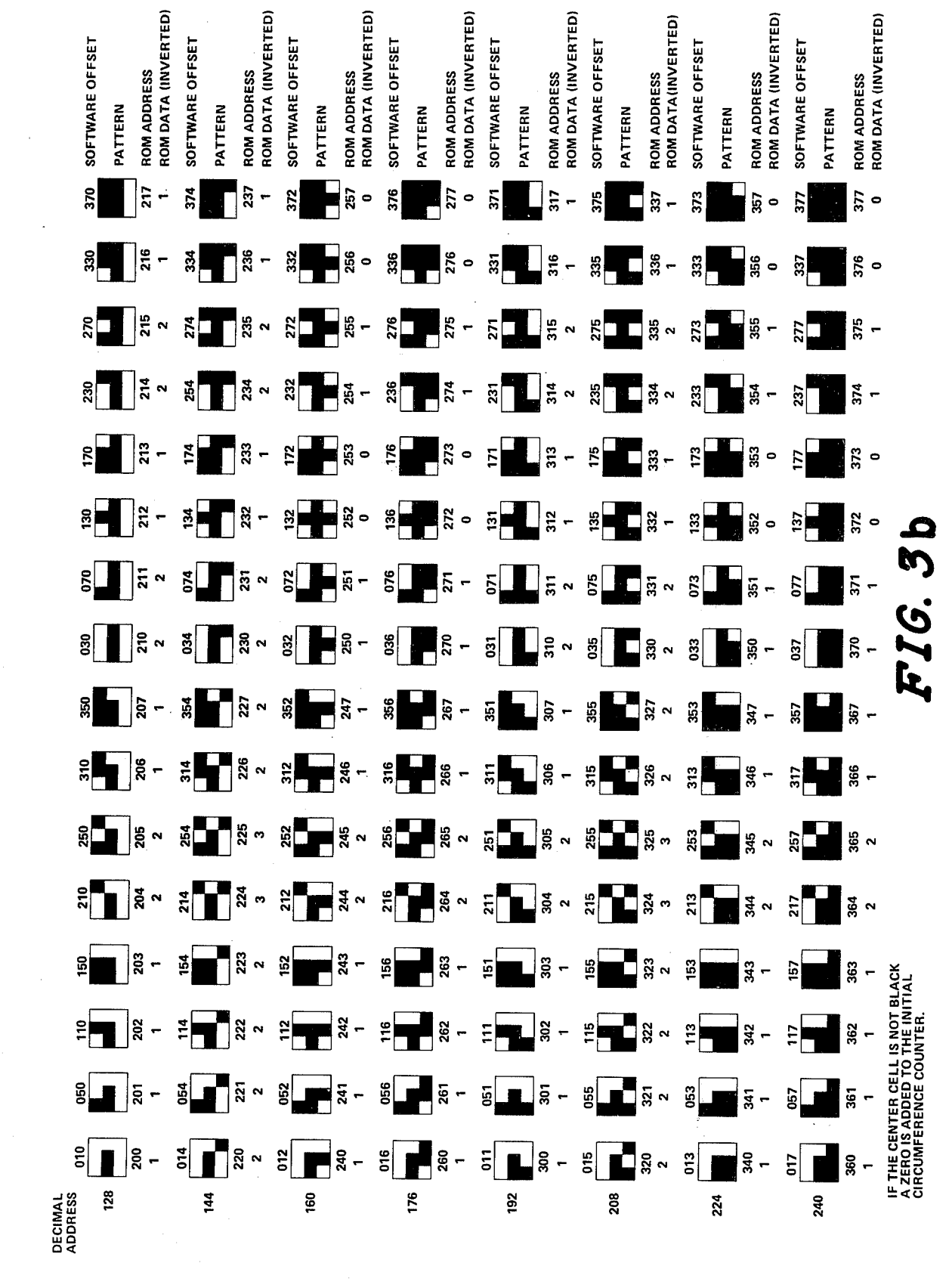

The area counter, block 4, counts the number of black cells in the frame. The initial circumference count accumulator, block 5, is an adder that looks up a value, from 0 to 4 inclusive (depending upon the color of the 8 cells surrounding the center cell), in a programmable read only memory (PROM). If the center cell is white, a 0 is added, if the center cell is black, a value from the PROM is added. The patterns, the PROM address and the value added are shown in FIG. 3a and 3b. The software tab address in the simulation program is shown above each pattern and is different from the PROM address only because the bits are numbered differently.

A strokewidth is calculated for each frame, by block 6, by applying the area and circumference count to a PROM. The formula is roughly, strokewidth=(-2×area) divided by the circumference count, which is an accurate formula for a long, thin rectangle. As an example—a frame with an area of 165 cells and a circumference count of 100 cells will have a strokewidth of 4.

A vertical STAR (state transition algorithm) feature is generated, in block 7, that reports the number of black to white transitions in each scan. A new number is reported only if it is different from the previous number reported. A horizontal STAR feature is also generated, by block 8, that reports the number of black to white transitions in each of the 32 rows of a frame. A new number is reported only if it is different from the previous number. The field for both the horizontal and vertical STAR features is filled when 5 numbers have been generated. Therefore, additional features beyond 5 are not reported.

An example of a frame of video showing the horizontal and vertical STAR features is shown in FIG. 4. The vertical STAR digits are entered at the right of a 5-bit shift register and examine the character from right to left. The horizontal STAR digits are similarly entered at the right end of a 5-bit shift register and examine the character from bottom to top.

At the end of the left scan of a frame the initial features are transferred to a register and a write request signal is generated to write these features in the feature memory. In addition, right, center and left signals are generated for a space or end of line, causing a 3-scan wide frame to be written in the 9-cell memory.

The 9-cell memory control (block 22) traces around the outline of the character, generating a sequence of slopes that describe the direction to move to get to the next cell of the perimeter. The slopes are defined as illustrated in FIGS. 5a, b and c.

FIG. 6 illustrates a frame of video showing one of each type of slope. The 9-cell memory control produces the sequence of slopes to trace around the perimeter of the character by manipulating a read accumulator (block 9) and a slope accumulator (block 10).

FIG. 7a–7g is the 9-cell memory control flowchart. The flowchart is executed by the read only memory (ROM) and the PLA (programmable logic array). A timing diagram of a portion of a cycle is shown in FIG. 8. The character data available signal is from the feature memory control and if in State 1 indicates that a complete, unanalyzed frame has been written into the 9-cell memory. The character data available signal causes the 9-cell memory control to move to state 2.

The read accumulator (block 9) specifies a cell in the video. The three least significant bits specify one of the eight center cells stored in the 9-cell memory (see FIG. 2). The next two bits, 3 and 4, specify a quarter scan and the remaining 10 bits specify a scan in the 9-cell memory. Another way to describe the read accumulator is that it specifies, with a 15-bit word, a scan and cell of video located in the 9-cell memory. When the read accumulator is applied to the 9-cell memory (block 11) and the 8:1 divider (block 12) the center cell and its 8 surrounding cells are applied to the PROMs (block 13).

Assume that the read accumulator is starting from zero. This is equivalent to scan 0, cell 0. The 9-cell memory control in state 2 will add 32 which is equivalent to scan 1, cell 0. Assuming that the answer to the center scan question remains no, the read accumulator will advance to scan 2, cell 0, scan 3, cell 0, scan 4, cell 0, etc., until it finds a scan marked center scan, at which time the 9-cell memory control will advance to state 4. In state 4, 10 of the 30 bits (bits 1, 4, 7, 10, 13, 16, 19, 22, 25 and 28) are analyzed for black to white transitions by the top detector (block 14). If one or more transitions are found they are stored in the top register (block 15) as a bit at a location corresponding to the black cell at which the transition was found. The top register is organized as 4 words of 8 bits. Word 0 is written in state 4. Also, 8 is added to the read accumulator which moves it to the next quarter scan in state 6 where word 1 of the top register is written and another 8 is added, etc., until, at the end of state 12, the entire scan has been analyzed for tops and the read accumulator is located at cell 0 of the scan past the center cell. Also, in state 12, all counters and registers for frame features are cleared. The frame features are: Most significant piece; Piece-loop sequence; Number of loops; Number of pieces; Frame circumference count; Frame horizontal and vertical maximum; and Frame horizontal and vertical minimum.

State 3 is provided for diagnostics. The 9-cell memory control will normally move to state 5. It will remain in state 5 until the strokewidth, which was generated on the initial feature card, is retrieved from the feature memory and loaded into a register (Block 62) on the roadmap feature derivation circuit, at which time it will advance to state 13. In state 13 the piece features are cleared and the 9-cell memory control is advanced to state 14 which subtracts one from the read accumulator. Subtracting one from the read accumulator causes it to point to the center scan, cell 31, during state 11. In state 11 the top register (block 15) is read to determine if a black to white transition occurred on this cell. If a transition did not occur the 9-cell memory control advances through states 16, 14, 11, 16, 14, 11, etc., moving down the center scan a cell-at-a-time until it finds a top recorded in the top register. The 9-cell memory control then moves to state 15.

The single cell question in state 15 asks if the top was due to a single cell surrounded by white on all sides. If this is true, the top is ignored and the 9-cell memory control returns to the 16, 14, 11 state sequence searching for a new top. If the single cell is not surrounded by white on all sides the 9-cell memory control moves to state 7.

State 7 checks the number of pieces found in the frame. At this time the piece counter will be zero because it was cleared in state 12. The piece counter is checked because the feature memory has space allocated for only four pieces. The first four pieces found are analyzed. Any remaining pieces are ignored. A piece is defined as a trace around either an outer circumference or an inner loop and return to the starting point. The 9-cell memory control now moves to state 17.

In state 17 the slope accumulator (block 10) is initialized to 16 (decimal). No change is made to the read accumulator and the 9-cell memory control advances to state 20.

In state 20 a value is added to the slope accumulator from the initial slope PROM. This value may be read from FIG. 9 and is based on the 8 cells surrounding the top cell presently selected by the read accumulator. This results in the slope accumulator being set to a slope near 16 which it would have normally had tracing around this piece of a character.

The dashes in FIG. 9 for some values of the initial slope PROM (addresses 002, 003, 006, 007 etc.) indicate that there was a cell over the center cell. In these instances the top cell is not legitimate so there is no correct value for the initial slope PROM. All of the PROMs in these cases are programmed zero. FIG. 9 documents all of the PROMs in block 13 of the block diagram FIG. 16. The 9-cell memory control now advances to state 21.

In state 21 the initial cell register (block 16) is loaded with the contents of the read accumulator to determine when the read accumulator has returned to its starting point. Also, the initial slope register (block 17) is loaded with the current value of the slope accumulator. The slope averager (block 18) is initialized to 16. The slope delay line (block 42) is initialized to be full of 16s and the piece counter (block 169) is incremented (from 0 to 1) so that any features found on this first piece will be entered as piece 1 features. The 9-cell memory control now advances to state 22.

The initial step of the boundary trace is taken in state 22. The frame and piece circumference counters are incremented (blocks 171 and 172), the top in the top register (block 15) is erased by writing a zero at a place determined by a 3 of 8 decoder (block 20), controlled by the three least significant bits of the read accumulator. The slope and read accumulators are modified to cause the trace to advance to the next cell. These same functions are duplicated in states 23 and 30.

The effect of erasing tops on the center scan while tracing around the character is to prevent tracing the same boundary multiple times in the event the boundary crosses the center scan several times. For instance, in FIG. 10, the cells marked A, B, and C will all be written as tops when the 9-cell memory control passes through states 4, 6, 10 and 12. If B and C are not erased during the boundary trace around the E, additional traces around the same boundary would be initiated. However, it is important that the top at the cell marked E not be erased during the boundary trace initiated by the cell marked D even though the trace passes through the cell marked E. To accomplish this, an erase top PROM is provided (see FIG. 9) which allows the top to be erased (a 1 appears in the table) or does not allow the top to be erased (a 0 appears in the table) or the condition should not occur (a dash appears in the table, but the PROM is programmed with a 0). When more than one value appears, as at pattern 005, it is necessary to select a value based on the current slope accumulator. In this case, if the current slope is a 1 or a 2 (octal) the top will be erased. If the current slope is a 3 or 4 (octal) the top will not be erased. Pattern 005 should not have a slope of 5, 6, 7 or 0.

The slope accumulator is changed similarly by an amount from −2 through +4 as listed in the delta slope PROM FIG. 9. Here also, values that should not occur are shown as dashes and programmed as zeros.

The read accumulator is modified similarly by an amount from −33 to +33 as shown in the delta read accumulator PROM. The most significant bit of the delta read accumulator PROM is wired to bits 6 through 15 of the read accumulator input, bit 2 of the PROM is wired to bit 5 of the read accumulator input, bit 1 of the PROM to bits 1, 2, 3, and 4 of the read accumulator input and bit 0 of the PROM to bit 0 of the read accumulator. Therefore, a PROM code of 14 (octal) produces a read accumulator change of −32, etc. The −32 read accumulator change will move to the cell that came into the 9-cell memory one scan earlier, which corresponds to a slope of zero.

Eight of the possible values of the delta slope PROM are used in this way to program the change in the read accumulator that corresponds to the eight slopes. An unused value, 02, is used to signal a lost condition. A lost condition indicates an error in either the slope accumulator or the read accumulator that has resulted in reading the PROMs at one of the values that should not occur for that pattern. A lost condition will cause the 9-cell memory control to move to state 31 which terminates the trace.

State 22 of the 9-cell memory control functions to move the boundary trace from the initial cell. State 23 is identical to state 22 except that state 23 contains a decision diamond asking if the trace returned to the initial cell. The majority of the boundary trace is contained in state 22. When the trace has returned to the initial cell, at the initial nominal slope, the 9-cell memory control advances to state 24 where the slope is compared by block 32 to the slope in the initial slope register (block 17). If the slope has increased by 8 (as from 16 to 24) the boundary has been traced in a clockwise direction and is an outer circumference. If the boundary has been traced in a counterclockwise direction the slope will have decreased by 8 (as from 16 to 8) and this indicates that the boundary was an inside loop such as the inner circumference of an A, B or 0 etc. If the boundary has been traced in a counterclockwise direction the loop counter (block 173) is incremented and the loop-piece sequence register (block 174) is updated to reflect the loop or outside circumference. The loop-piece sequence register is a shift register. A one is shifted into it for a loop, a zero for an outer circumference. The 9-cell memory control now advances to state 26.

In state 26 the overrun counter (block 168) is set to −18. The 9-cell memory control advances to state 30 where it continues to trace around the circumference of the character until the counter reaches a count of −1. The counter stops at −1 and a stop enable signal from block 85 or a return to the initial cell at the initial slope (from block 23) will cause the 9-cell memory control to advance to state 31. The purpose of the last 18 or more circumference counts is to propagate the data for the initial cell through the slope averager (block 18) to the reference slope port of the slope delay line (block 42) because it is at this point that feature decisions are made.

Figure 10:
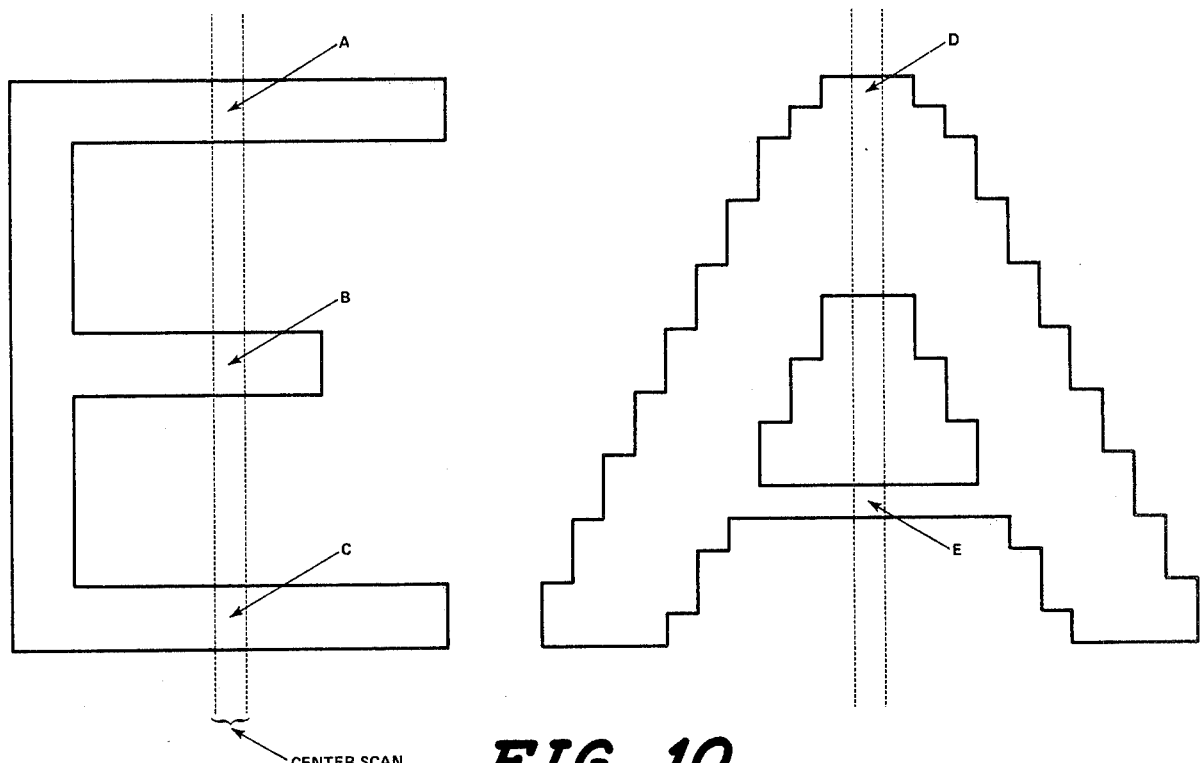
FIG. 10 illustrates Top cells of the character A and E.

The 9-cell memory control then advances to state 27 where the feature data collected for this piece is stored in the 9-cell memory. It then moves to state 25 where the read accumulator is loaded equal to the initial cell register and then jumps to state 13. The 9-cell memory control continues through the state 14, 11, 16 cycle while moving down the centerline of the character. If, as shown in FIG. 10, the other tops were erased during the boundary trace, the 9-cell memory control will reach the bottom of the character, move off of the center scan, advance through state 33 to state 32 where the frame feature data is stored and advance through state 35 to state 34 which causes it to jump over the centerline of this character and search out the next character as soon as data is available. If additional tops are found which were not erased during the boundary trace, the 9-cell memory control will trace around these boundaries also, up to a maximum of 4 per frame.

Various states of the 9-cell memory control flow diagram contain decision diamonds marked loop on line, frame, piece, etc. These commands are bits of OCW-03 which may be set to cause the 9-cell memory control to loop on the same data repeatedly as an aid to diagnosing troubles with an oscilloscope.

Figure 11:
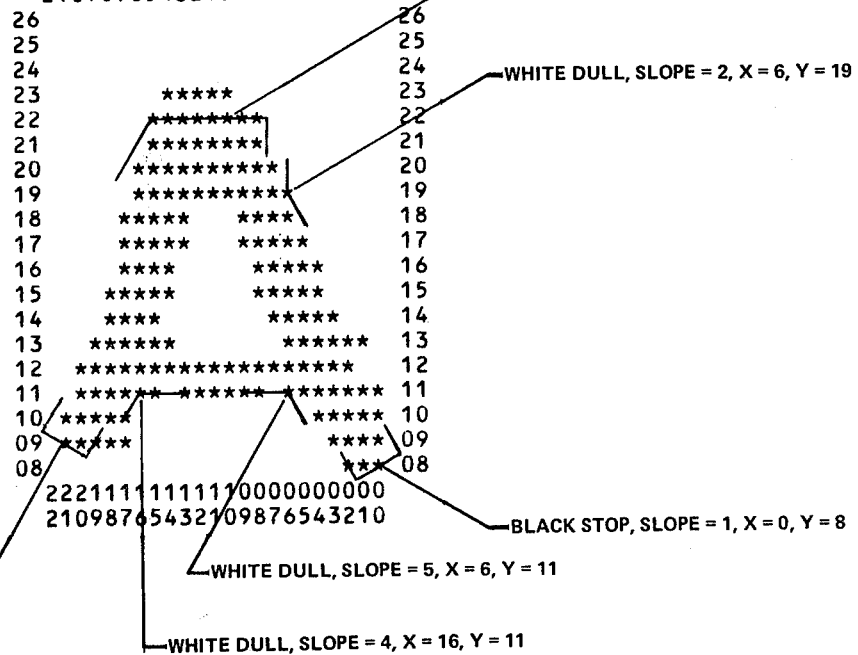
FIG. 11 shows the feature derived from a boundary trace of the letter A.

The states of the 9-cell memory control flow diagram FIG. 7 are marked A or B states. The A states are not dependent on data from the 9-cell memory and may operate even if a 9-cell memory write cycle is being performed. The B states are dependent on data from the 9-cell memory and will delay in that state if a 9-cell memory cycle is being executed. Therefore, 9-cell memory data may be flowing in continuously. Each one and one-quarter scan will require 5 write cycles and will allow 11 read cycles, requiring 80 of the 12 MHz clocks or 16, 9-cell memory cycles. Consequently, it is at the 9-cell memory that the feature recognition process has been converted from a continuous data stream to a batch process (one frame at a time is analyzed). At this point all of the information about the frame has been lifted and is contained in the sequence of slope values that the slope accumulator has taken. This may be proven by redrawing the character from the slope accumulator values. Manual reproduction of the boundary trace is difficult, so a simulation program has been developed to do this process for any video frame. FIG. 11 shows the frame of video input to this simulation.

Figure 12A:
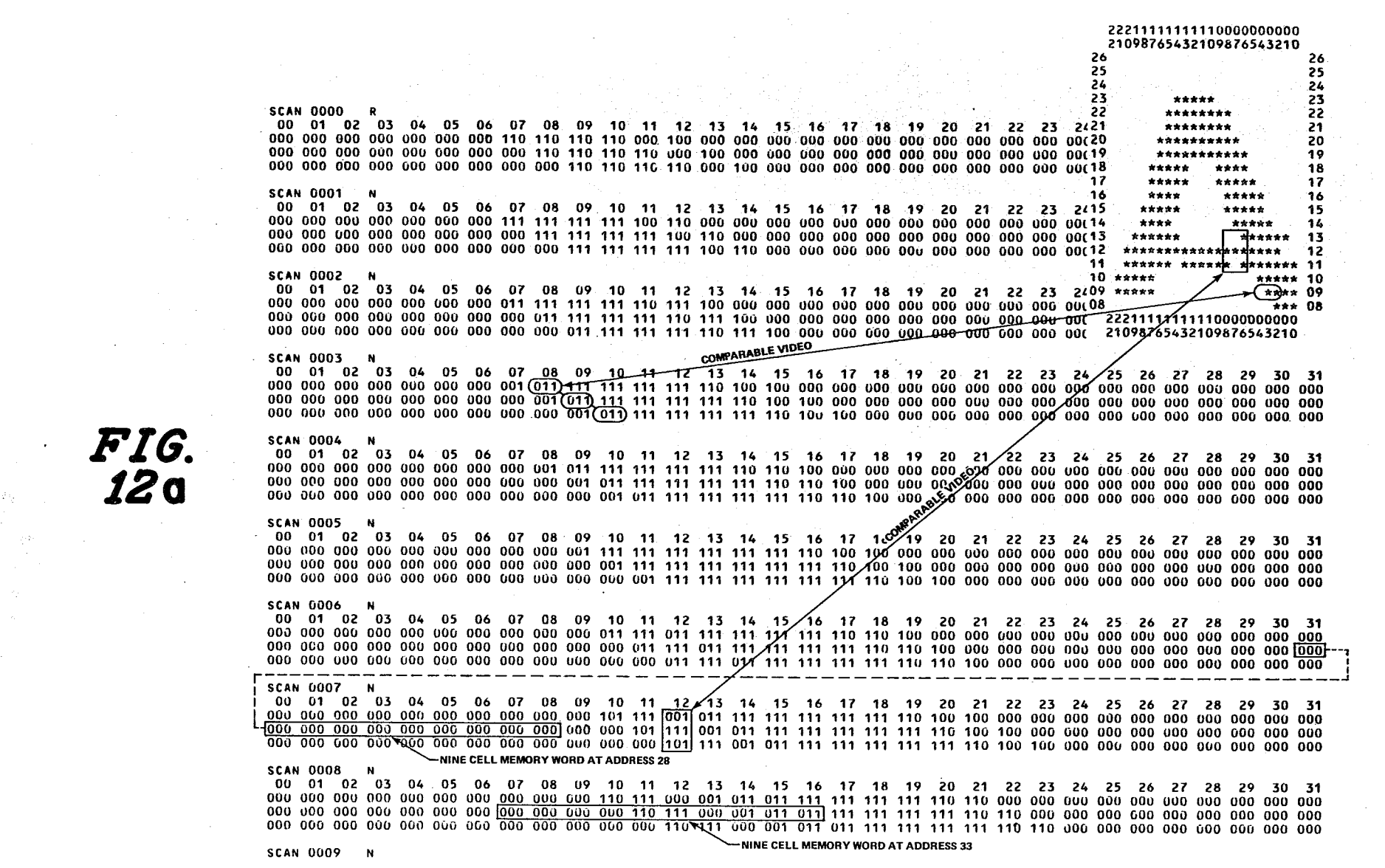
Figure 12B:
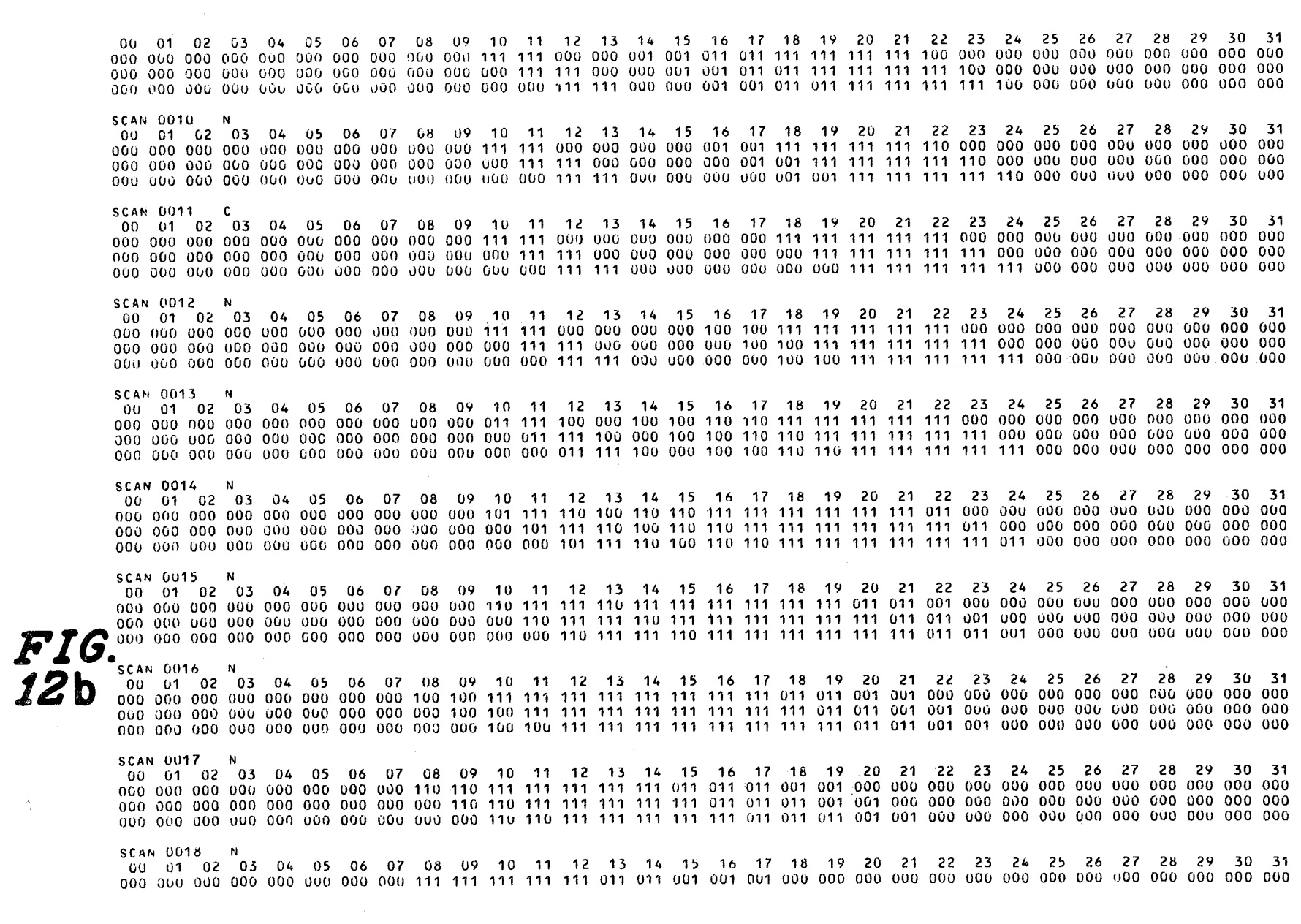
Figure 12C:
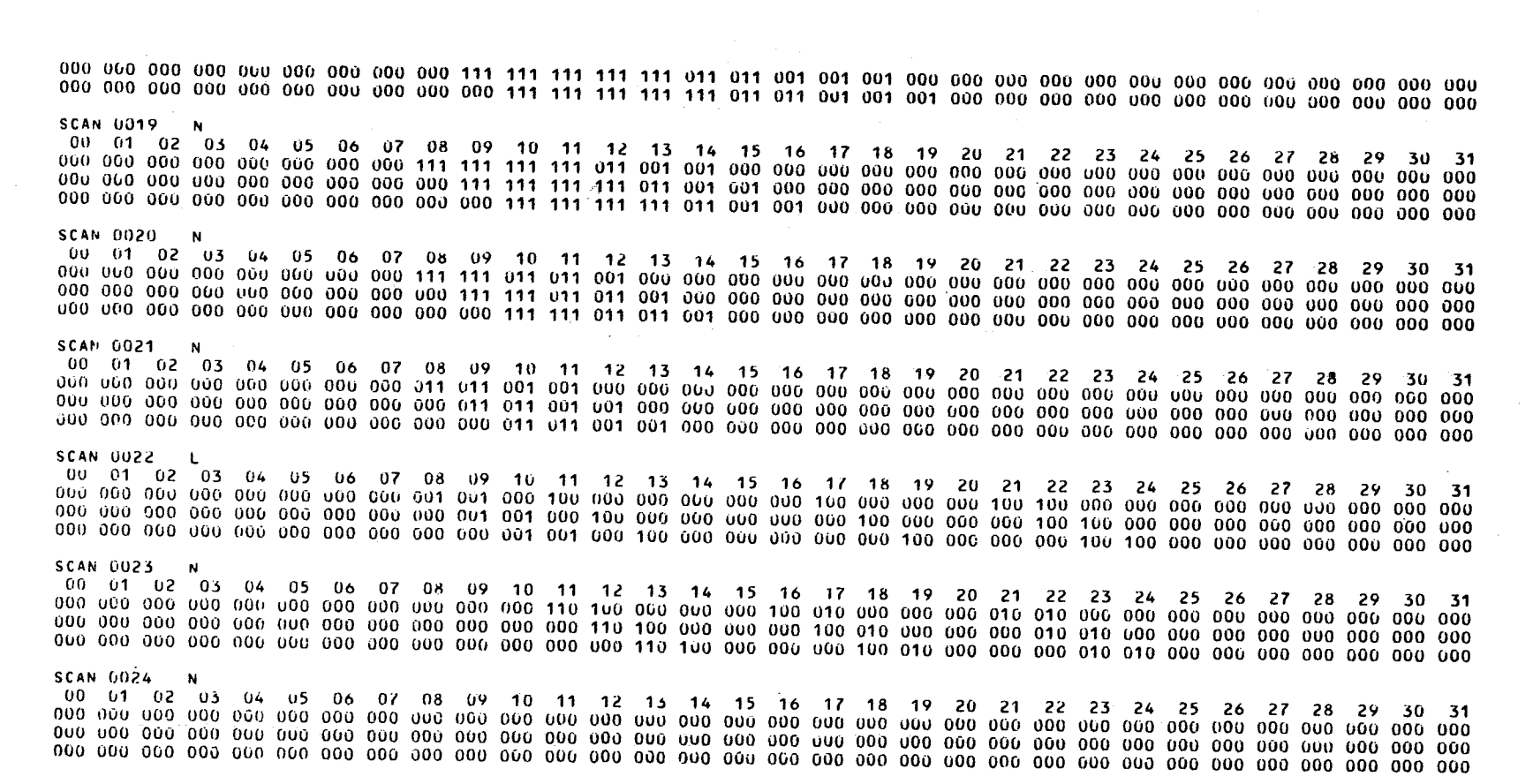
Figure 13B:
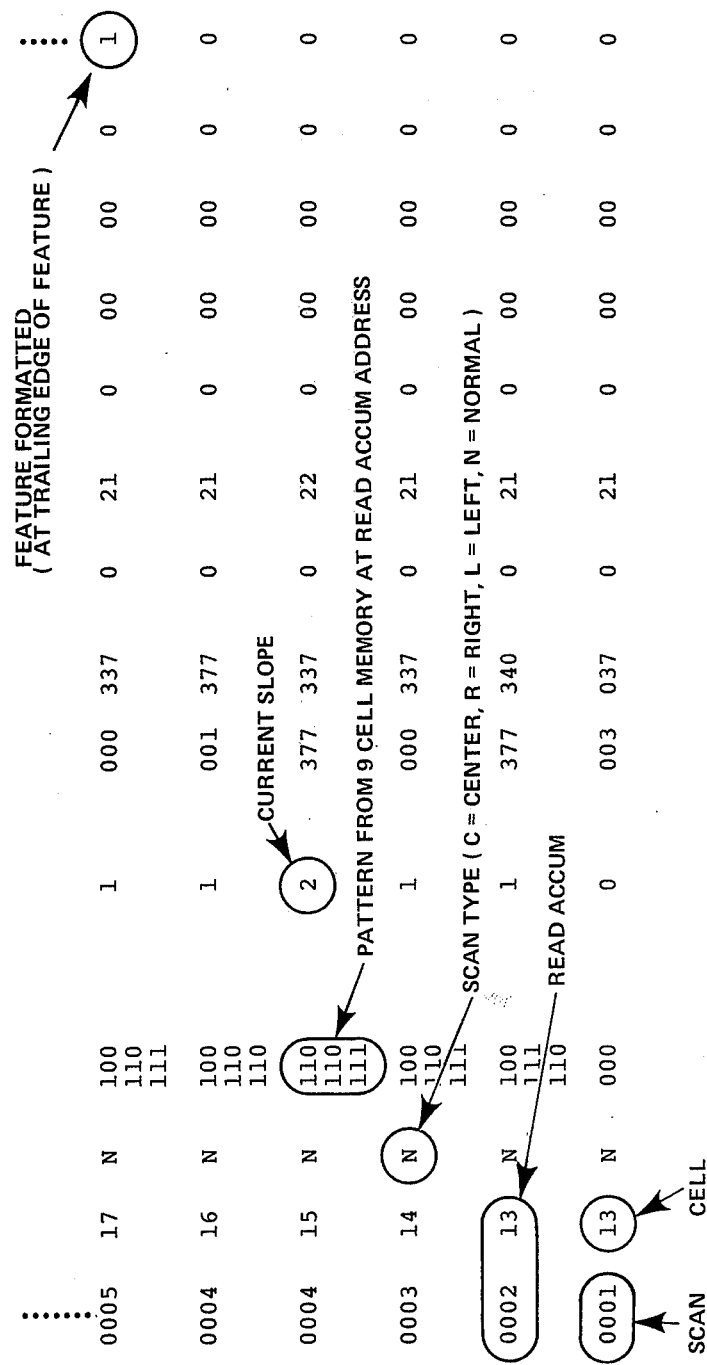

FIGS. 12a, b and c show the 9-cell pattern available from the 9-cell memory by addressing the memory with a scan and cell. FIG. 13a and 13b show a partial trace around the circumference of the character A. The column marked RA shows the read accumulator as a scan and cell. The next column is C if a center scan, R if a right limit, L if a left limit or N for normal. The next column shows the 9-cell pattern achieved by addressing the 9-cell memory with the read accumulator. The next column shows the current value of the slope accumulator. The column marked DSA shows the value from the delta slope accumulator PROM, DRA shows the value from the delta read accumulator PROM and ETP shows the value from the erase top PROM.

The column marked SBAR shows the slope, in octal, averaged over the previous four cells. The averaging is accomplished in the hardware by blocks 18 and 41 of the functional block diagram which simply sums the last four slope accumulator values, drops the least significant bit to divide by 2, then divides by 2 again with the slope roundoff which drops what is now the least significant bit if it is a 0 or adds one to the slope if it is a 1. This is equivalent to a true roundoff, values ending 0.00 or 0.25 are rounded down while values of 0.50 or 0.75 are rounded up.

Blocks 24 and 25 monitor the five least significant bits of the read accumulator to determine the highest cell encountered in the piece. Blocks 33 and 34 perform the same function except that they are not cleared after each piece and therefore they find the highest cell of the frame.

Blocks 28 and 29 monitor the 10 most significant bits of the read accumulator to determine the leftmost scan to the piece while blocks 37 and 38 do the same for the frame.

Blocks 26 and 27 monitor the inverted 5 least significant bits of the read accumulator to determine the lowest cell of the piece while blocks 37 and 38 do the same for the frame.

Blocks 30 and 31 monitor the inverted 10 most significant bits of the read accumulator to determine the rightmost scan of the piece while blocks 39 and 40 do the same for the frame.

To correctly analyze a frame or piece that overlaps the 37777-00000 boundary of the 9-cell memory, a sixteenth read accumulator bit is set when the boundary is crossed, but is reset with each frame.

A set of eight roadmap features is recognized during the boundary tracing. The features are shown in the table in FIG. 14. A more precise definition of the features is included in FIG. 15. As the table shows, the number of circumference counts in which a change takes place is dependent not only on the strokewidth but also on the reference slope. This is done to include an allowance for the cell size being a rectangle 0.0762 millimeter wide and 0.1524 millimeter tall. The slope delay line (block 42) is fed the rounded average slope generated by tracking around the circumference of the character and is shifted at each circumference point.

Figure 16:
FIG. 16 shows the code that exists between the delay line slopes and reference slope, and the name of the feature that is generated.

The slope at the end of the delay line (the 16th tap) is offset (block 44), inverted (block 43) and then added to the slope at each of the other 15 taps (blocks 45-59). There is now a code out of each of the adders (blocks 45-59) that corresponds to the feature that exists between that tap and the reference slope. Also, the code falls within the range of a BCD (binary coded decimal) decoder. FIG. 16 shows the code that exists at these points and the name of the feature that is generated. Those codes in FIG. 16 that are marked with a diagonal bar are codes that are not recognized by a BCD decoder. Fifteen BCD decoders (blocks 63-77) decode the summer outputs to produce one line (low) corresponding to the feature at that tap of the delay line. All 15 lines denoting white stop are wired to a priority encoder, block 79. Similarly, all 15 black stop lines are wired to a priority encoder (block 80), all 15 white sharp lines are wired to a priority encoder (block 81), all 15 black sharp lines are connected to a priority encoder (block 82), all 15 white corner lines are connected to a priority encoder (block 83) and all 15 black corner outputs are wired to a priority encoder (block 84).

In all cases the feature is connected to the priority encoder in such a way that the output of the priority encoder gives a code that specifies the distance from the reference slope to the delay line tap which first produced the feature. The decimal equivalent of the code is written on the tap below block 42. The code is compared (blocks 87-92) with the value from FIG. 15 that is stored in a PROM (block 86), and a signal is sent to a PLA (programmable logic array) (block 177) if the feature has occurred within the allowed distance. The PLA also receives inputs from a comparator (block 60) connected between the reference slope and the next delay line tap, from a first feature flip-flop (block 78) and from a feature enable counter (block 97).

The slope delay line is initialized to 16, the same as the slope averager and the slope accumulator. As long as there is no change in slope sensed by the comparator (block 60), no feature is output. When the first change in slope reaches the comparator, the PLA selects the sharpest feature of the same color as the change, (black features show an increase in slope and white features show a decrease), outputs a code to cause the code converter PROM (block 95) to select the correct feature on the 8:1 multiplexer and loads the feature enable counter (block 97) with the distance to the end of the feature. Simultaneously, the first feature flip-flop is set. Note that a format feature signal is not generated for the first feature. The first feature is skipped intentionally in the event the centerline of the character intersects the character in the middle of a feature. This may occur on characters such as an A, W, X, Y etc. After discarding the first feature the PLA does not output a feature until the feature enable counter (block 97) reaches a count of 15. The PLA then will not output a feature as long as the slope does not change from the reference slope. When a slope different from the reference slope reaches the comparator, the comparator signals the PLA to format a feature. The PLA selects the sharpest feature of the same color as the comparator. If no stop, sharp or corner of the proper color from the comparators (blocks 87-92) is true, a dull is formatted. One exception to this process is caused by the "flat" input to the PLA from the encoder (block 76). The flat input indicates that a white feature is immediately followed by an equivalent black feature or that a black feature is immediately followed by an equivalent white feature. Instead of being output these two features are cancelled and no feature is formatted. The adder (block 93), the register (block 94) and gates included in block 85 monitor the sum of the formatted features using the following values:

black stop = +4
black sharp = +3
black corner = +2
black dull = +1
white dull = −1
white corner = −2
white stop = −4.

The boundary trace around the character is terminated when the sum of the features is 24 or greater or when the sum of the features is 8 or less, starting from an initial value of 16, provided that the boundary trace has advanced such that the initial cell has passed the reference slope point after the character circumference has been traversed. In general, the initial feature that was discarded at the beginning of a boundary trace is retrieved at the end and the sum of the features of an outside circumference (using the above values) will be +8 or the sum of the features of an inner loop will be −8. There are rare exceptions where the sum of the features is greater than 8. This is caused by the end of the boundary trace overlapping the start of the trace by enough to end the trace at a different slope than it started. The traces overlap because of the different lengths at which the different features are recognized at different reference slopes.

FIG. 11 shows the features formatted as the result of a trace around the outer circumference of character A. The starting point was scan 11, cell 23. As noted on FIG. 17, the first feature found was a black corner. This black corner was not formatted because it was the first feature found. Also, four instances are shown where adjacent black and white dulls occur but are not formatted because they are within one count of each other. The features which were formatted were, in order of occurrence:

| Circumference Count | Feature | Slope | Feature Sum Value |
|---|---|---|---|
| 8 | white dull | 22 | −1 |
| 19 | black stop | 21 | +4 |
| 27 | white dull | 25 | −1 |
| 37 | white dull | 24 | −1 |
| 40 | black stop | 23 | +4 |
| 58 | black sharp | 27 | +3 |
| | Feature sum | | +8 |

At circumference count 59 the initial cell is reached and, because the feature sum is 8, tracing is discontinued. Note that the final black sharp included the portion of the boundary trace in which the first feature corner was found.

Figure 18A:
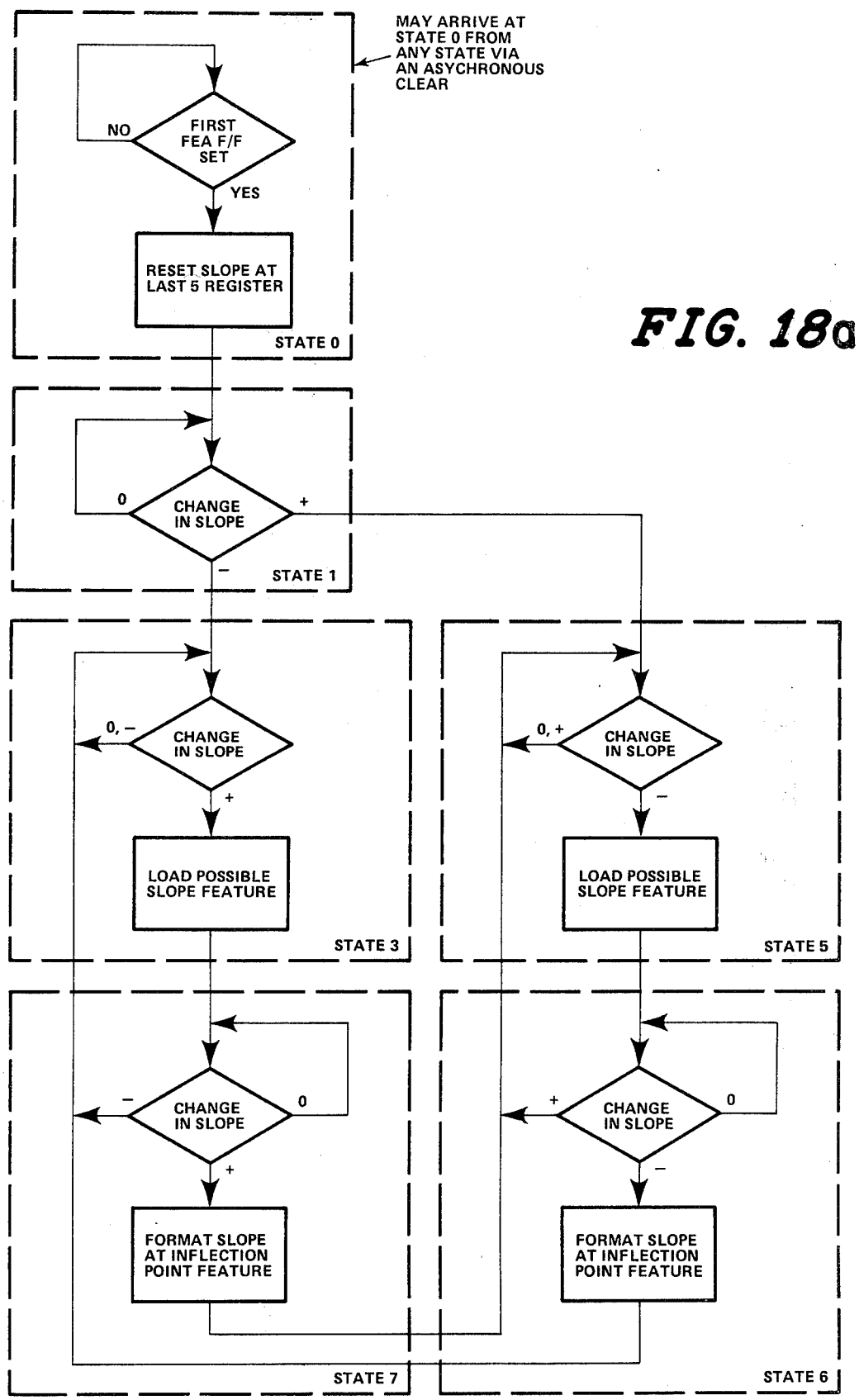
Figure 19A:
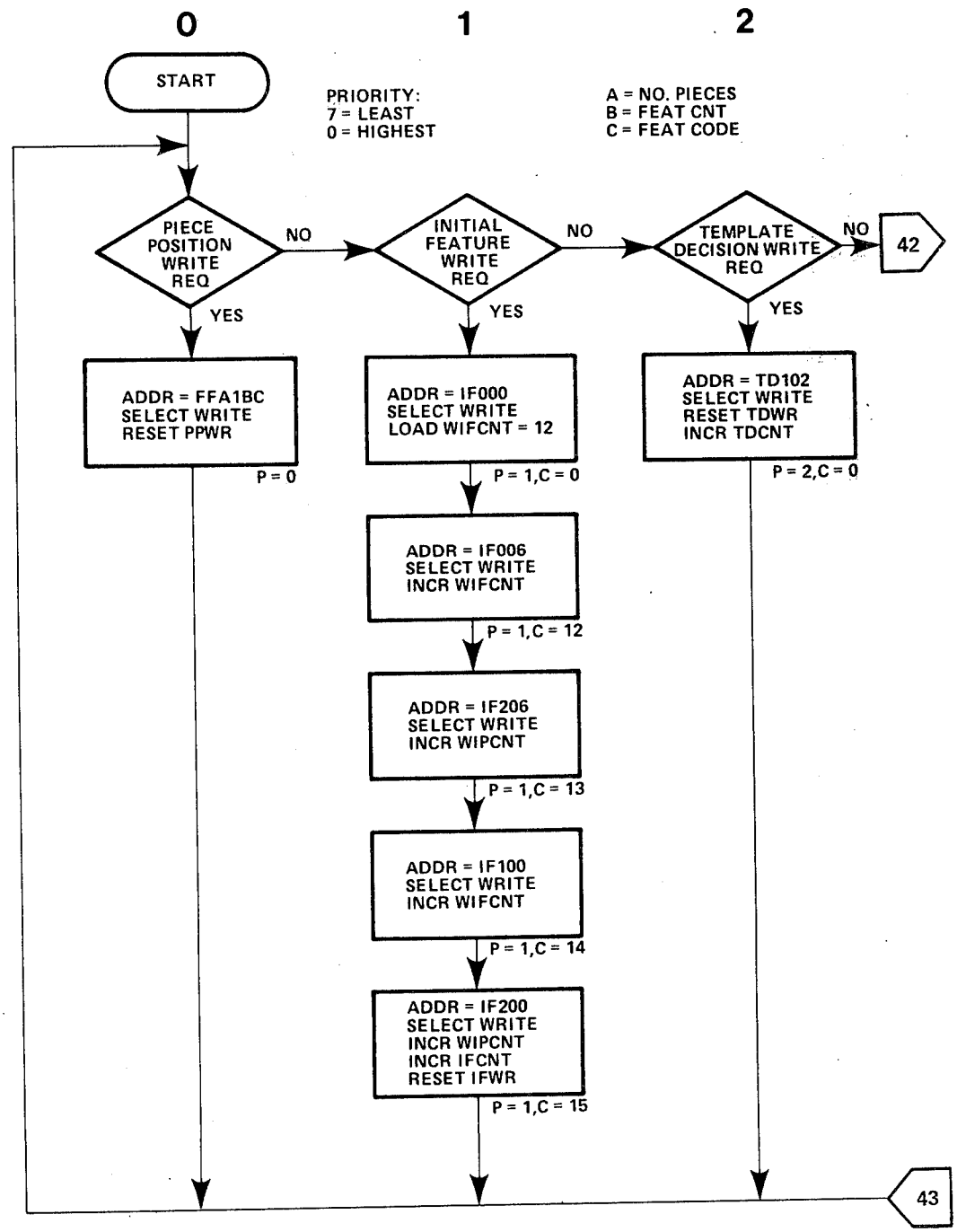
FIGS. 19a, 19b, 19c and 19d is a flow chart of the feature memory controller.
Figure 19B:
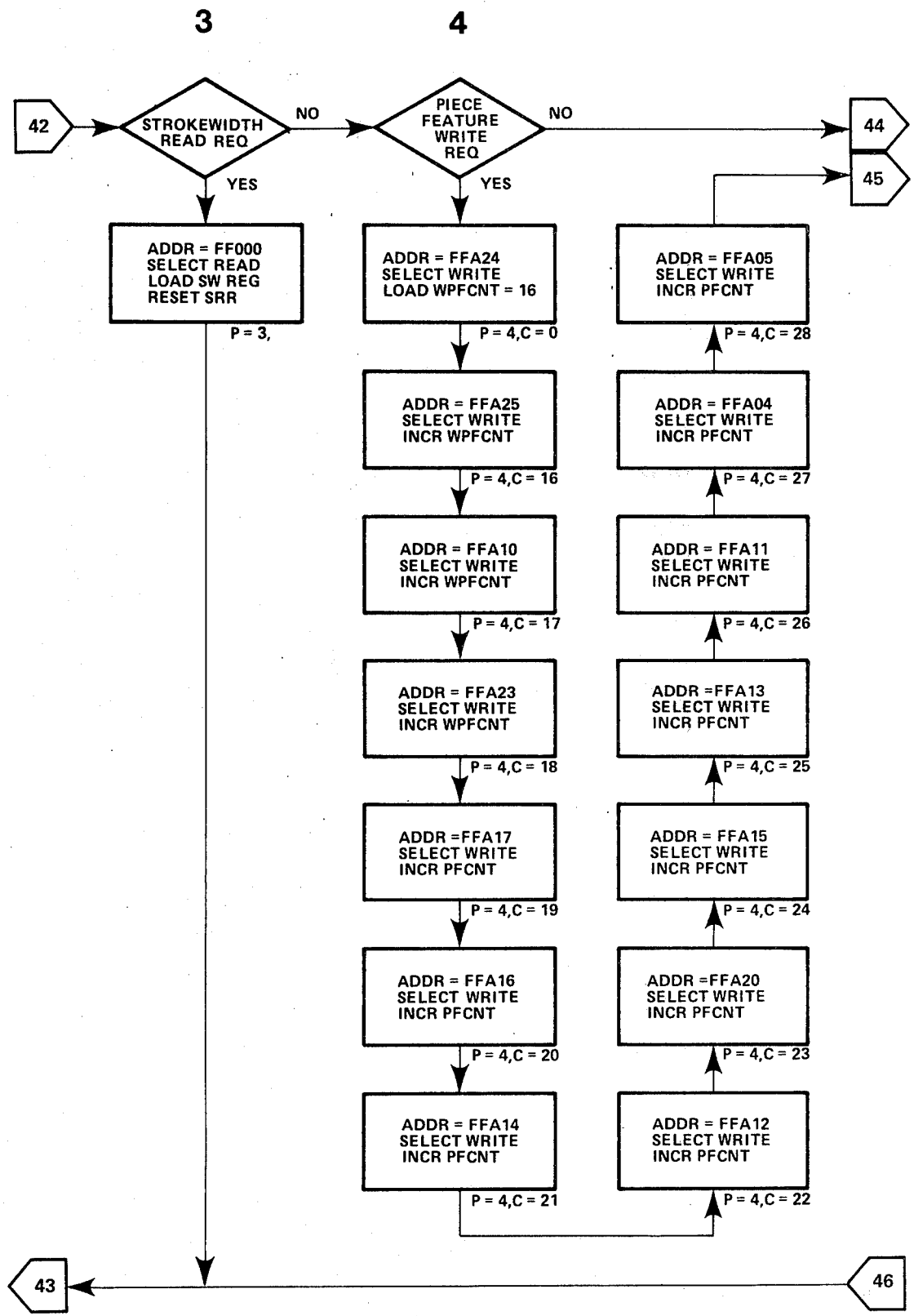
Figure 19C:
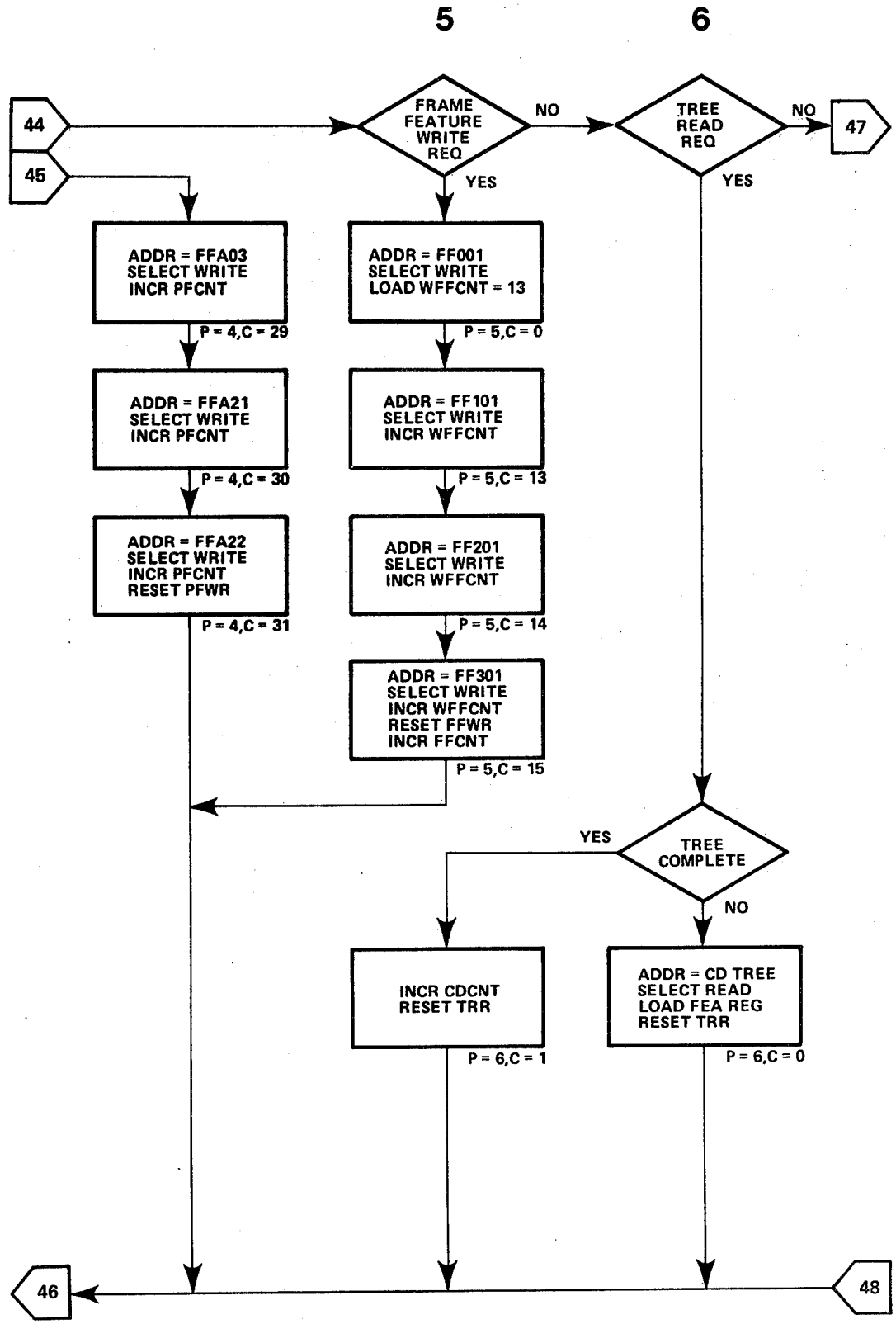
Figure 19D:
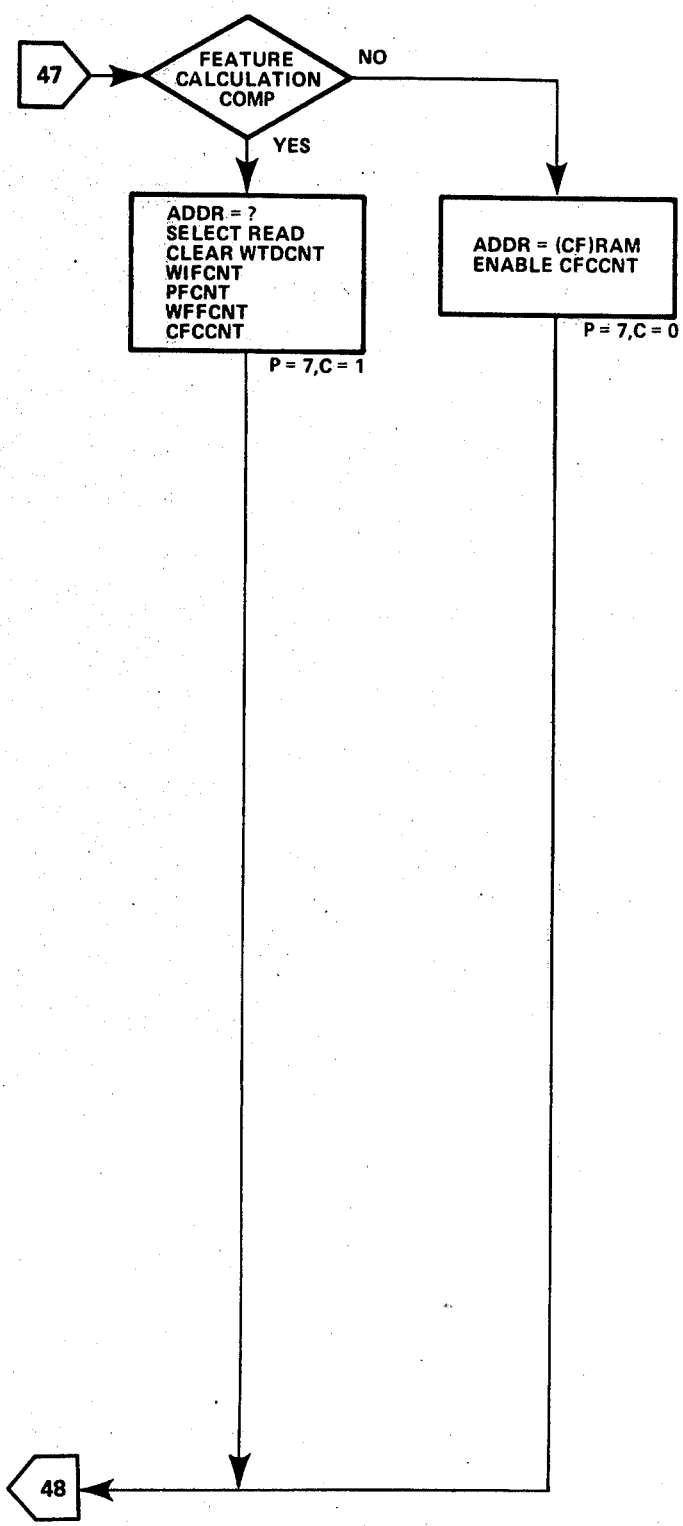

An inflection detector (block 61) is also driven by the reference slope. An inflection is defined as a point where the boundary trace slope changes from increasing to decreasing or from decreasing to increasing. To prevent the inflection detector from tripping on minor variations in slope, the change point is noted and the slope must move again in the same direction as the direction in which the change was noted in order to be recorded. A flowchart and the PROM that controls the process is included in FIG. 18.

When the PLA generates the format feature output the feature code is entered in the first 10 features register (block 102) and the last 5 features register (block 101), the total feature counter (block 105) is incremented, the appropriate feature counter (blocks 106-113) is incremented and the reference slope at the feature is recorded (blocks 120-127). Also, the read accumulator is recorded at a point approximately halfway between the two ends of the feature. The recording of the read accumulator is accomplished by a 15-bit wide-by-18-bit long shift register (block 98) that stores the last 18 values of the read accumulator. One of the values is selected by the 8:1 data selector (block 99) that is driven by the three most significant bits of the feature position (from block 96). The value is loaded into the feature position register (block 100) and a write request is generated to write the position into the feature memory. The position is written into an address dependent upon the piece, feature and feature count.

Gates (blocks 116-118) are used to recognize when the count of a particular feature has exceeded 4 (to prevent writing feature positions beyond that point), when the count has exceeded 5 (to stop shifting the slope at the feature beyond that point) and when the count has exceeded 7 (to prevent the counter from rolling over). Similarly, the total feature counter (block 105) stops the shifting of the first 10 features register beyond 10 features and will not count beyond 15 total features.

The feature memory controller is the primary central control for the feature module. Characters are processed through five stages. The stages are: (a.) The initial features are gathered; (b.) The features of the frame and the pieces in the frame are gathered; (c.) The template module decision is recorded; (d.) The frame features are processed through a feature calculation phase in which they are normalized (converted from X-Y positions to zones, etc.); and (e.) The features are applied to a decision tree that decides the character name from the features present.

A maximum of 16 characters may be in the feature module at any one time. The feature memory control card monitors the characters at each stage of processing and controls the feature calculation process.

The feature memory control is shown as one block (block 133). A detailed block diagram of the feature memory control card is shown in FIG. 1g. FIGS. 19a, 19b, 19c, 19d make up the flow chart of the feature memory controller.

The feature memory is a 4K by 16 memory divided into 16 sections of 256 words each. Counters (blocks 195–199) control the four most significant bits of the memory address to achieve the division. The counters control which section of memory a feature is written into and are incremented as the characters pass through the five processing stages.

The counters are controlled as follows:

When a feature memory cycle request is issued by another portion of the feature module the request is latched into the handshake block (block 179) with a 12 MHz clock. At the next feature memory clock the state of the handshake block is transferred to the priority register (block 180). The request with the highest priority causes the priority encoder (block 181) to output a 3-bit binary code specifying the operation to be executed during the feature memory cycle. The priorities are shown in decimal form across the top of FIG. 19.

If a piece position write request is active (priority 0=highest priority), the 8:1 selector (block 204) selects a 12-bit address. The address is composed of the four most significant bits selected from the frame feature counter (block 196), the next two most significant bits selected from the piece counter (block 169), the next bit is wired high, the next two bits come from the feature counter (block 115) and the three least significant bits are the feature code (from block 95). The write mode of the feature memory is selected by the feature memory control PROMs (block 194) and a reset enable signal is sent to a 3-of-8 decoder (block 182) that resets the proper flip-flop in the handshake block (block 179). The handshake block remembers that the cycle has occurred and will not allow another cycle to occur until the piece position write request has cycled low and then high again.

Other states are handled similarly, except that most states also include a substate counter (blocks 185–189) that monitors states within a priority. The substate counters may also be loaded or incremented under the control of the feature memory control PROMs (block 194) through two, 3-of-8 decoders (block 183). For example, if an initial feature write request is the active priority, the write initial feature counter (block 186) will be at zero initially. The selected feature memory address will have the initial feature counter (block 195) supply the four most significant bits, the remaining eight bits are held low by the feature memory control PROMs. This procedure selects word 000. The initial feature card responds to the address 000 and the write command by placing the area and circumference count on the feature memory data lines. When the memory cycle is complete the write initial feature counter (block 186) is loaded to 12 and a write address of 006 is generated, causing the initial feature card to put the vertical STAR feature on the feature memory data lines. When the cycle is completed the write initial feature counter is incremented to 13 which creates an address of 206, causing the initial feature card to supply the feature memory with the horizontal STAR data. This process is repeated until all of the initial features are written into the feature memory.

The piece position write request could go true at any time during the process and a priority 0 cycle could occur. If this happens the write initial feature counter will remember the point in the cycle at which the priority 0 interrupt occurred and will resume processing from that point when the priority 0 interrupt has been satisfied.

Template module decisions are written into the feature memory in a similar manner. The strokewidth is read from memory prior to tracing a character, the piece features are written into memory, frame features are written into memory, data is read from the feature memory for the tree and when there are no higher priorities, the feature calculation program is executed for any frames that have not completed this stage of processing.

In priority 4, time is alloted to allow the first 10 roadmap feature data words to be shifted into position (left justified) before they are written into memory.

The feature calculation process normalizes data to make it independent of character size. The equations used are as follows:

$$\text{Aspect Ratio} = \frac{\text{frame width}}{\text{frame height}} \qquad a.$$

$$= \frac{FM306 \text{ bits } 5\text{-}10}{FM306 \text{ bits } 0\text{-}4}$$

($FM306$ = feature memory word at address 306)

$$\text{Relative Untraced Frame} = \frac{\text{total frame circumference count}}{\text{initial circumference count}} \qquad b.$$

$$= \frac{FM001 \text{ bits } 5\text{-}10}{FM200 \text{ bits } 5\text{-}10}$$

$$\text{Relative Size} = \frac{\text{piece circumference count}}{\text{frame circumference count}} \qquad c.$$

$$= \frac{FMP03 \text{ bits } 5\text{-}10}{FM001 \text{ bits } 5\text{-}10}$$

where P=1,2,3,0 for piece 1,2,3 or 4

Figure 20:
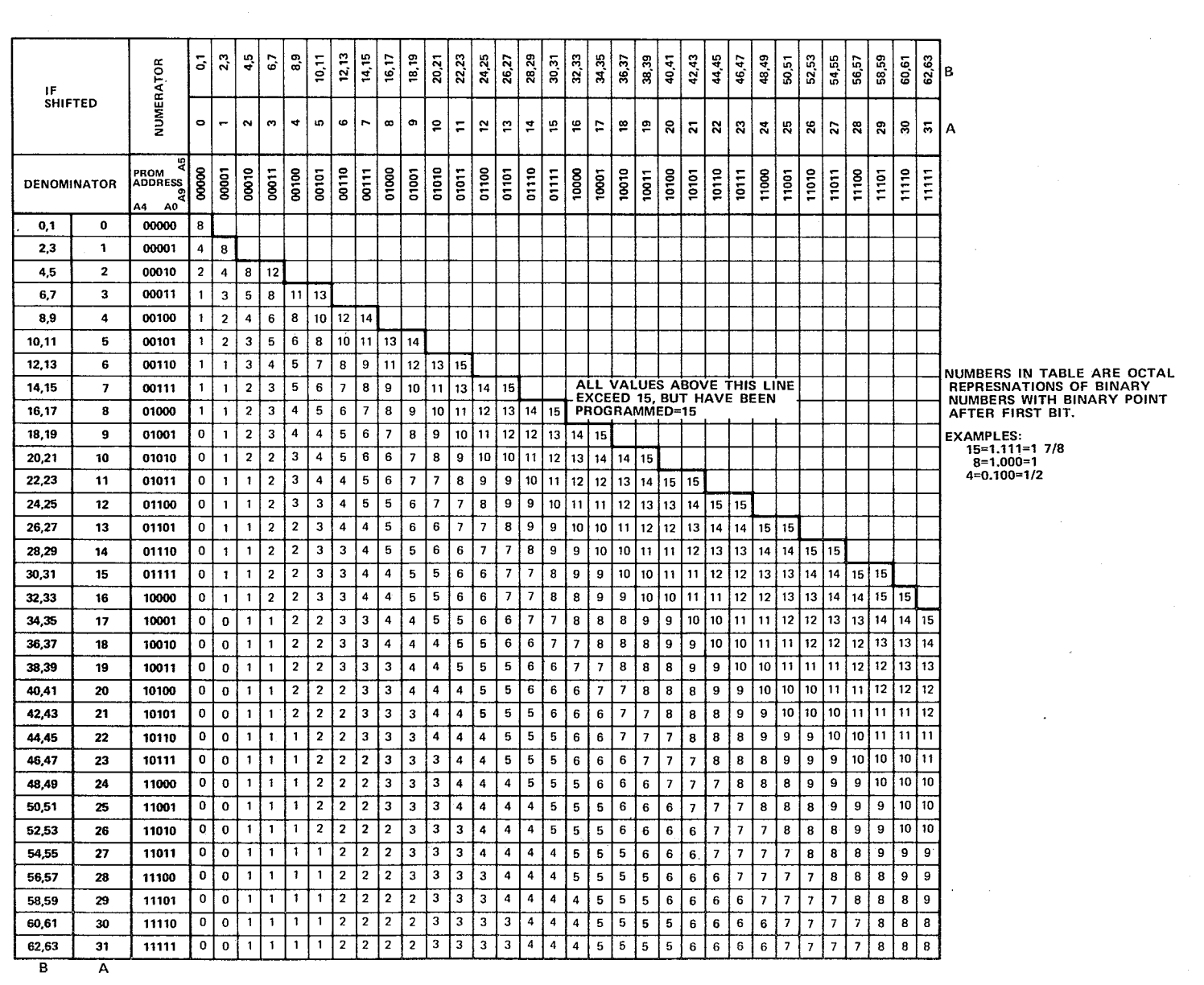

The three divisions shown above are made to the nearest eighth by the PROM whose program is shown in FIG. 20. For example, if a frame width is 25 cells (FM306 bits 5–10=11001) and a frame height is 17 cells (FM306 bits 0–4=10001) the aspect ratio is 12 (1100) which implies that the frame is 12 eights or one and one half times as wide as it is tall. If either the numerator or denominator has a one as bit 10, the inputs to the PROM are shifted, causing the values to be taken from the outside row (row B) and outside column (column B) of the figure rather than from row A and column A.

d. Zone of Centerline—The horizontal and vertical zones are calculated simultaneously. The vertical zones are calculated from bits 0–5 and the horizontal zones are calculated from bits 6–14 with no carries or borrows being allowed to cross the bit 5–6 boundary. The equation is:

$$\text{Zone Centerline} = \frac{\text{piece max} + \text{piece min}-2(\text{frame min})}{2(\text{frame max} - \text{frame min})}$$

$$= \frac{FMP04 + FMP05\text{-}2(FM301)}{2(FM201 - FM301)}$$

Where P=1,2,3,0 for piece 1,2,3 or 4.

The division by 2 is accomplished by shifting the numerator right one bit.

$$\text{Zone of Feature} = \frac{\text{feature position} - \text{frame min}}{\text{frame max} - \text{frame min}} \quad \text{e.}$$

$$= \frac{FMPNF - FM301}{FM201 - FM301}$$

where
P=1,2,3,0 for piece 1,2,3,4
N=4,5,6,7 for feature 1,2,3,4
F=0 for white stop
F=1 for white dull
F=2 for black dull
F=3 for white corner
F=4 for black corner
F=5 for white sharp
F=6 for black sharp
F=7 for black stop.

Rather than dividing out the zone, it is looked up in two zone lookup PROMs whose program is contained in FIG. 2. The two most significant bits from the horizontal and vertical are paired and the two least significant bits are paired to make a 4-bit zone word as follows:

| X | X | X | X | X = 1 or 0 |
|---|---|---|---|---|
|   |   |   |   | LSB vertical |
|   |   |   |   | LSB horizontal |
|   |   |   |   | MSB vertical |
|   |   |   |   | MSB horizontal |

This results in the frame being divided into the 16 zones shown below.

| 1100 | 1110 | 0110 | 0100 | A 2 | 30 | 32 | 12 | 10 |
|------|------|------|------|-----|----|----|----|----|
| 1101 | 1111 | 0111 | 0101 | D 3 | 31 | 33 | 13 | 11 |
| 1001 | 1011 | 0011 | 0001 | C 1 | 21 | 23 | 03 | 01 |
| 1000 | 1010 | 0010 | 0000 | B 0 | 20 | 22 | 02 | 00 |
| A | D | C | B | (numbers that appear on printout) |
| 2 | 3 | 1 | 0 | |

Dividing the frame into 16 zones (as shown above) permits the later processing to determine which one-quarter of the frame a feature is located in by interrogating only two bits.

```
MSBs = 0 = 00 = lower right-hand quadrant
       1 = 01 = upper right-hand quadrant
       2 = 10 = lower left-hand quadrant
       3 = 11 = upper left-hand quadrant
LSBs = 0 = 00 = extreme outside corners
       1 = 01 = center, right or left side
       2 = 10 = center, top or bottom
       3 = 11 = center of frame.
```

The PROM is such that if the frame is a height or width divisible by four, all zones are the same size. If the frame contains one row/column in excess the extra row/column is added at row/column A. If there are two extra rows/columns they are added at row/column A and B. If there are three extra rows/columns they are added at row/column A, B and C, and if there are four extra scans the total is divisible by 4 again. For example:

| 16 cells wide (tall) | A = 4, B = 4, C = 4, D = 4 |
| 17 cells wide (tall) | A = 5, B = 4, C = 4, D = 4 |
| 18 cells wide (tall) | A = 5, B = 5, C = 4, D = 4 |

-continued

| 19 cells wide (tall) | A = 5, B = 5, C = 5, D = 4 |
| 20 cells wide (tall) | A = 5, B = 5, C = 5, D = 5 |

The final phase of recognizing the character is the decision tree. (See the Tree Memory Control flow diagram FIGS. 22a through 22c.) The tree memory (block 153) is a 32-bit wide by up to 64K RAM (random access memory). The decision tree is stored in the RAM and must be loaded from the SC after each removal of power from the CRU. The decision tree consists of a sequence of instructions that access the feature memory and then access the tree memory at an address dependent on that found in the feature memory. The tree memory continues to access a different feature until enough features have been surveyed to name the character with the desired degree of confidence. At that time the output register is loaded with the feature decision and a branch is made to a location in the tree memory dependent on the template decision. The result is a resolved decision that is also loaded into the output register. Additional branches may be made to generate a numerics only decision. When the output register is fully loaded the data it contains is transferred to the SC, the character decision counter (block 199) is incremented and the decision tree begins processing the next character.

The Instruction for the decision line are:

a. Indexed Branch. The indexed branch word causes the tree memory to branch to another address in the tree memory. The branch address is determined by adding to the base address (bits 0-15) a binary number generated by masking off bits specified by the mask width (bits 26-28) and the mask end bit (bits 22-25) from a word obtained from the feature memory. The word from the feature memory is taken from an address whose bits 0-15 are specified by bits 16-21 of the indexed branch instruction, bits 6 and 7 are specified by the most recently executed set page instruction in the tree memory and bits 8-11 are specified by the character decision counter (block 199).

Example:
Tree memory=$031301_8$   $001000_8$
Most recent set page=$01_2$
Reads feature memory address 101 (page 1 plus 01 from bits 16-21)
Feature memory address 101=$011423_8$ (3 pieces, 2 loops, most sig piece=first sequence was outer, inner, inner)
Decoded tree memory word as mask width of $4_{10}$ (bits 26-28)
Decoded tree memory mask end bit of $11_{10}$ (bits 22-25)
Takes bits 8-11 (4 bits wide, ending at 11) of feature word=$0011_2$=$3_8$
Adds this to base address $001000_8$
Branches to (i.e., loads program counter to) address $001003_8$ The procedure is accomplished in the following manner. In state 0 (see FIG. 21) the instruction is decoded and a feature memory cycle is requested. The mask width counter (block 136) and the mask end bit counter (block 135) are also loaded in state 0. When the feature data available signal is issued by the feature memory handshake control (block 179) the feature register (block 137) has been loaded. The tree memory control now moves to state 7 where the compare register (block 140) is shifted left at the same time that the mask end bit counter (block 135) and the mask width counter (block 136) are counted down. The 16:1 selector (block 138) is caused to select the specified area of the feature register (block 137) and to load the area into the least significant bits of the compare register (block 140). When the mask width counter has counted down to zero the tree memory control advances to state 8. While in state 7 the address register (block 150) is loaded with the base address taken from bits 0–15 of the tree memory through the 4:1 selector (block 148) and through the arithmetic unit (block 149). In state 8 the address register is gated through the 2:1 selector (block 152) to the A input of the arithmetic unit. The compare register is gated through the 4:1 selector (block 148) to the B input of the arithmetic unit. The A and B inputs are added together and loaded into the program counter (block 151) to determine the next tree memory instruction to be executed.

b. Binary Search. The binary search instruction determines whether or not a word in the compare register is included in an ordered table. If the word is found in the table the tree memory controller branches to an address associated with that word. If the word is not found in the table the tree memory control increments the program counter to the next instruction and executes the instruction found there.

In the table Bits 16–31 contain the data against which the data from the feature memory is compared. Bits 0–15 contain the address of the instruction to be executed next if bits 16–31 match the data in the compare register. The table must be ordered so the data in bits 16–31 increases as the address of the word increases. Before beginning a search, the compare register (block 140) is loaded by other instructions. When the binary search instruction is decoded the address register (block 150) is loaded with bits 0–15 of the binary search instruction and the table size register (block 147) is loaded with bits 16–28 of the binary search instruction. The tree memory control then advances to state 9.

In state 9 the most significant bit of the table size register is determined by the priority encoder (block 146). The most significant bit is gated to the decoder (block 143) by the 2:1 data selector (block 144). The decoder translates the most significant bit information back into a binary number equivalent to the value of the table size register with all but the most significant bits being zero. This value is known as delta. Examples are listed below.

| Table Size | Delta |
|---|---|
| 1101 | 1000 |
| 100 | 100 |
| 101 | 100 |
| 111 | 100 |
| 1010101 | 1000000 |

Figure 23:
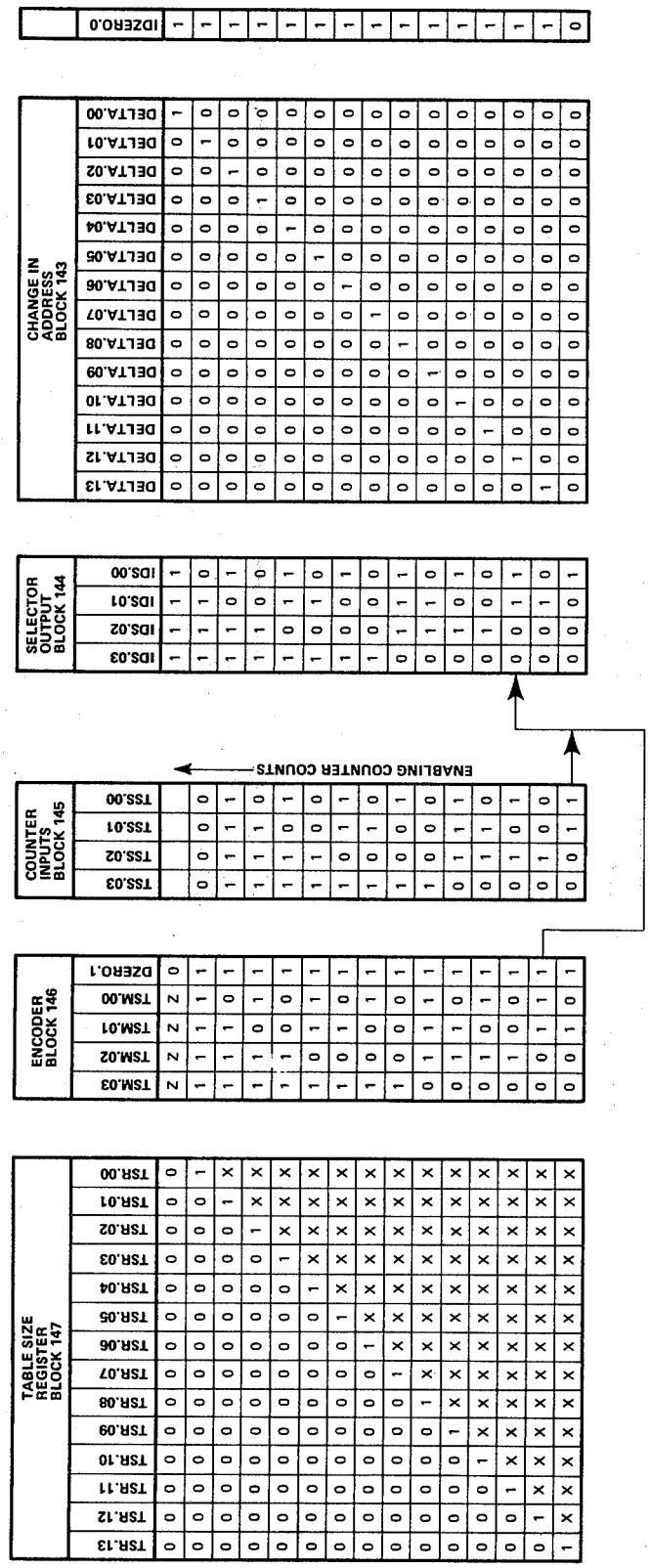
FIG. 23 shows the Tree Memory Table Size Register and Controller Operation.

FIG. 23 shows the generation of the delta value and is useful in understanding the logic diagrams because the data is inverted at several points. Delta is returned to the table size register to reset the most significant bit of the table size register at the end of state 9. Delta is also selected through the 4:1 selector (block 148) and added in the arithmetic unit (block 149) to the data in the address register (block 150) to form a new address that is loaded into the address register at the end of state 9. Also, the table size counter (block 145) is loaded with a count one less than the output of the priority encoder (block 146) at the end of state 9. The tree memory control then advances to state 10.

In state 10 the address generated from state 9 is applied to the tree memory and the data in bits 16–31 are compared with the compare register. One of four events may now occur:

1. If the compare register equals the memory data the program counter (block 151) will be set to the address contained in bits 0–15 of the data word and the tree memory control will return to state 0.

2. If the compare register is greater than the memory data the most significant bit of the table size register (block 147) is reset, the table size counter is reloaded with one less than the output of the priority encoder and a new address register is calculated from the current value plus delta.

3. If the compare register is less than memory the tree memory control moves to state 11.

4. If the compare register is consistently greater than memory, the most significant bit of the table size register will be repeatedly reset until delta reaches zero. This is an indication that the value in the compare register is greater than any value in the table. In this case, the program counter is incremented and the tree memory control returns to state 0.

In state 11 the same four situations may occur except that delta is now generated from the table size counter (block 145) rather than from the table size register (block 147). If the compare register is less than the memory data, delta is subtracted from the current address register. If the compare register is greater than the memory data, delta is added to the current address register. In state 11 the table size counter is decremented once each cycle to halve the value of delta which is added to or subtracted from the current address register as in state 10. Delta reaching zero is an indication that the search has failed to find a match and the program counter is incremented by one as the tree memory control returns to state 0.

Figure 24A:
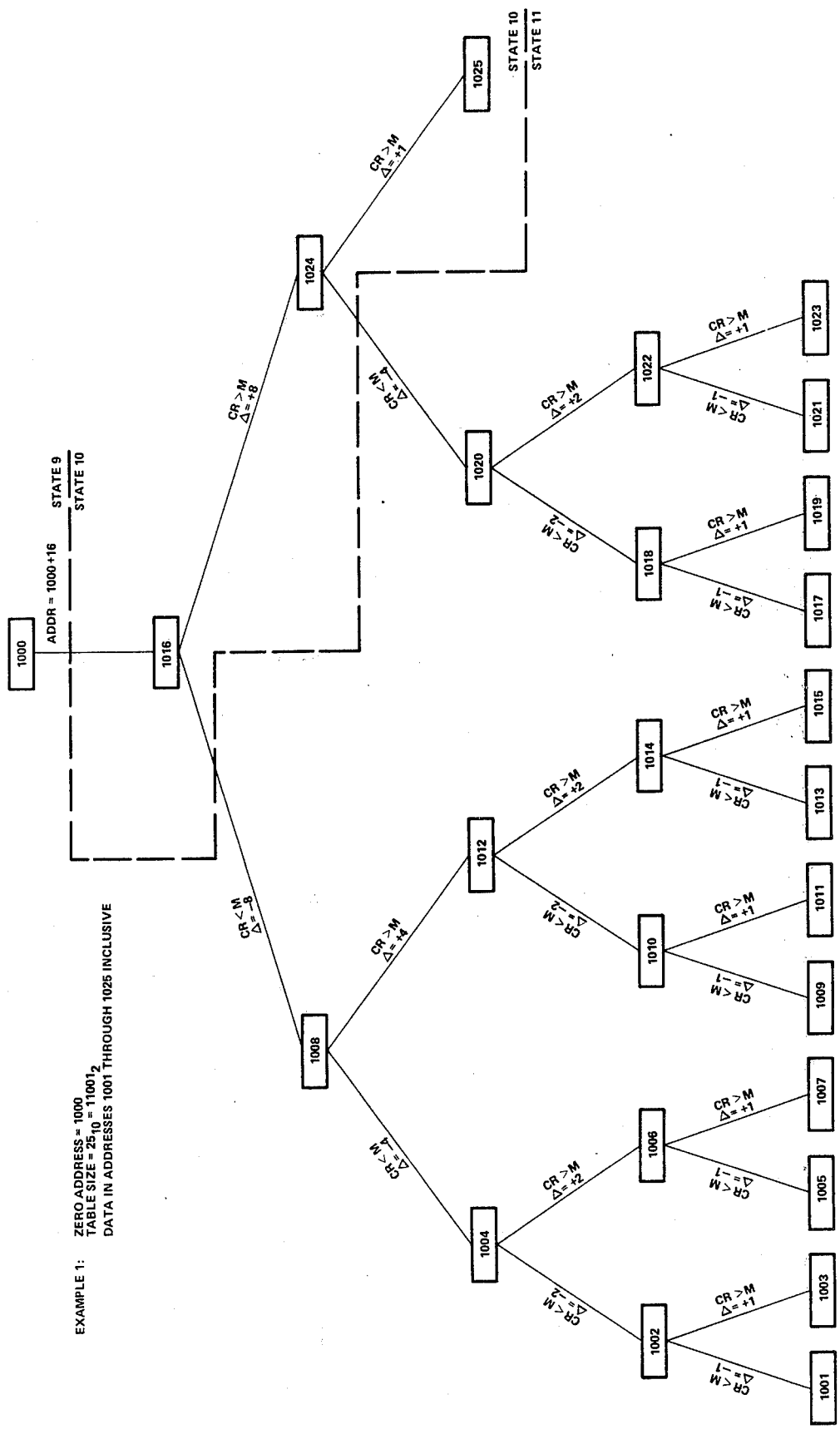
FIG. 24a and 24b show two typical binary search examples.
Figure 24B:
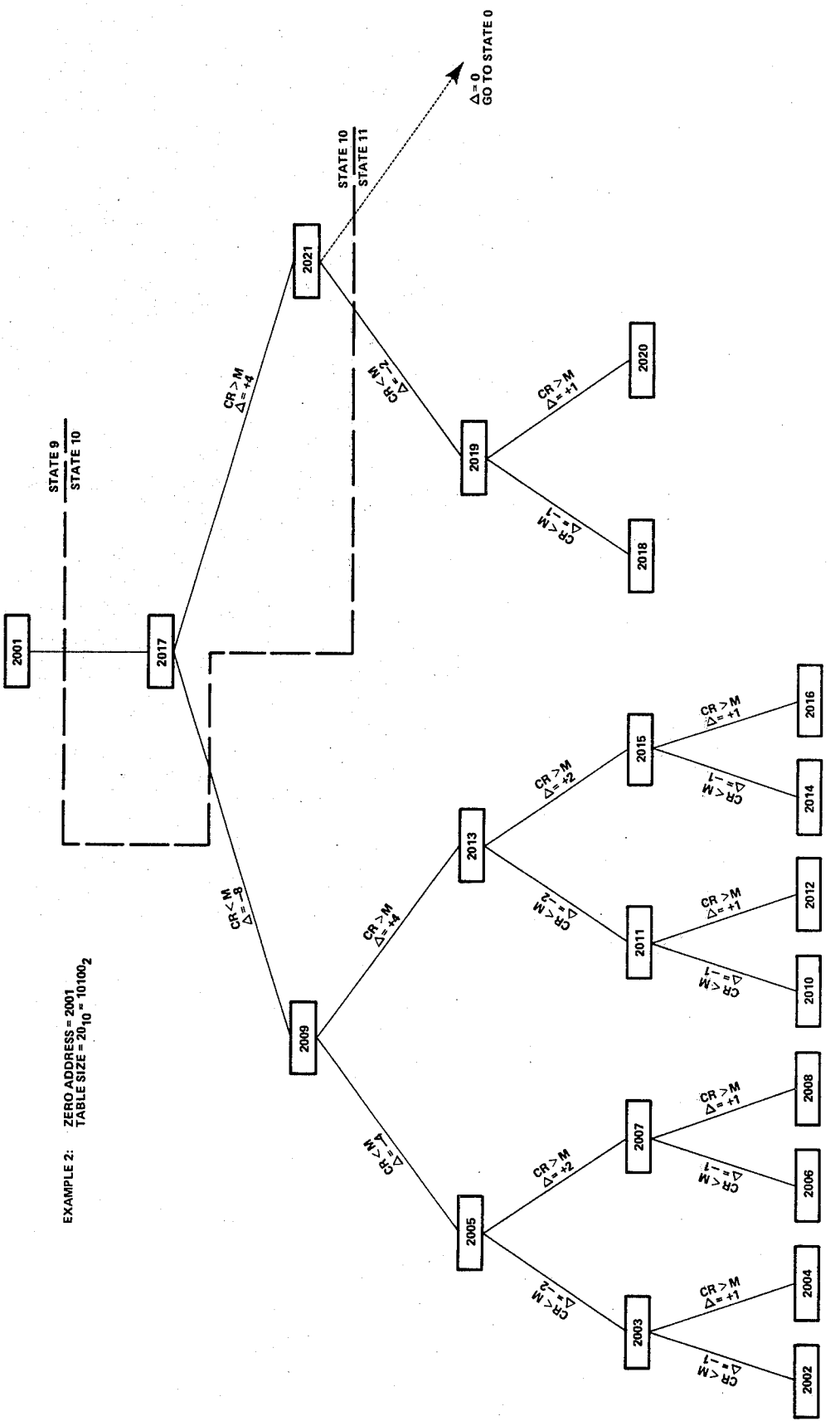

FIGS. 24a, 24b and 24c show two typical binary searches. Note that the time required to search a table is determined by the number of digits required to express the table size as a power of two. Also, a table entry not in the correct ascending order will not only be rarely selected by a match, but will cause any other searches that pass through it to be misdirected, usually resulting in a reject. If the compare register equals the data in bits 16–31 of the tree memory, the program counter is loaded with the address in bits 0–15 and the tree memory control returns to state 0.

c. Execute Memory. The execute memory instruction causes the tree memory control to load the compare register (in a manner similar to the way the register is loaded by the indexed branch instruction), to add the compare register to the base address contained in bits 0–15 of the instruction and execute the instruction at the address generated. When the instruction has been executed the program counter is incremented and the instruction following the execute memory instruction is executed.

Feature memory data is requested in state 0 and shifted into the compare register in state 12. The address register is loaded with bits 0–15 of the execute memory command in state 13. The compare register is added to the address register in state 14 and an execute memory flip-flop is set. The tree memory control then returns to state 0. In state 0 the instruction fetched from memory is executed, the only difference from ordinary instructions being that the address register, rather than the program counter, is used to address memory. The execute memory flip-flop is reset at the conclusion of each instruction (whether it was set or not) in order to return control to the program counter and the program counter is incremented by either one or one-half as appropriate.

d. Load Compare Register Immediate. The compare register is loaded with bits 0–15 of the instruction. This instruction is mainly useful in diagnostic programs, particularly in diagnosing the binary search instruction.

e. Branch Unconditionally. The program counter is loaded with bits 0–15 of the instruction, causing the next instruction to be executed from the address specified.

f. Execute Memory (Index=Compare Register). This instruction assumes that the compare register is already loaded with the desired offset. Otherwise, it operates exactly the same as the execute memory instruction described in subparagraph c, entering the process at state 13.

g. Load Compare Register, Masked. This instruction requests a feature memory cycle to fetch the feature word specified in bits 0–5 or 16–21 into the feature register, then masks the feature word into the compare register similarly to the operation of the indexed branch instruction described in subparagraph a.

h. Load Compare Register, Word. This instruction requests a feature memory cycle to fetch the feature word specified in bits 0–5 or 15–21 into the feature register than loads the entire 16-bit word into the compare register.

i. Halt. The halt instruction causes the tree memory control to advance to state 15 and stop. It is useful only as a diagnostic tool and does not appear in a checked out, assembled tree program. The tree may be continued from the halt point by setting, then resetting OCW-03, bit 7 or may be restarted from the beginning by a master clear signal.

j. No Operation. The no operation instruction has no effect other than to increment the program counter by a half-address (or a full address when executed from an execute memory instruction). It is useful only as a filler to fill in a group of half-word instructions up to the whole word boundary so that a full-word instruction may be inserted.

k. Terminal Word. The terminal word instruction is the final instruction after a character has been analyzed. It indicates that the output register has been loaded and causes the transfer of the output register to the SC. The transfer is accomplished as two, 16-bit words.

In state 1 the data available from card signal is raised and a signal is sent to the feature memory controller to increment the character decision counter (block 199) and the program counter is loaded to 1 in preparation for starting the next character. The tree memory control advances to state 2 when both the feature memory and the I/O interface card (in the character presence card cage) have sent data accept signals. When the I/O interface card lowers its data accept signal, the tree memory control advances to state 3 where a second data available signal is sent to the I/O interface card to transfer the second half of the output register to the SC. When the data has been accepted the tree passes through state 16 to send an EOD interrupt if an EOD instruction has set the EOD flip-flop. The tree returns to state 0 and will begin immediately (from program counter=1) to analyze the next character if it has completed the calculation process.

l. Send EOD Interrupt. The send EOD interrupt instruction raises a line to the I/O interface card that causes the card to set the EOD status bit and to send an interrupt to the SC signaling end-of-document. This actually occurs at the end of state 3 of the terminal word instruction.

m. Specify Page. Bits 0–5 or 16–21 in the indexed branch, execute memory, load compare register (masked) and load compare register (word) instructions are able to specify only 6 bits of the feature memory address. The specify page instruction specifies the next two bits that correspond to the piece 1, 2, 3 or 4 boundary trace. The specify page instruction, once set, is remembered until another specify page instruction changes it. Therefore, the normal mode of operation of the tree is to specify the page, equal to the most significant piece, early in the process and to leave it unchanged throughout the tree process.

n. Load Output Byte. The load output byte instruction causes the data in bits 0–7 or 16–23 to be loaded into the portion of the output register specified by bits 8 and 9 or 24 and 25 as follows:

| Bits 8, 9 24, 25 | |
|---|---|
| 0  0 | Outut Register Bits 0–7 (resolved decision) |
| 0  1 | Bits 8–15 (numberic decision) |
| 1  0 | Bits 16–23 (template decison) |
| 1  1 | Bits 24–31 (feature decision) |

The tree memory control logic is incorporated into four PLAs.

The tree program must be loaded into the CRU, before operating, after each power off period. The program consists of combinations of the instructions necessary to resolve the features derived for each character into a feature and numeric decision, then to further resolve the feature and template decision into a resolved decision and then to transfer all four decisions to the SC.

Having described the invention in connection with certain specific embodiments thereof it is to be understood that further modifications may now be suggested to those skilled in the art and is intended to cover such modifications as follow in the scope of the appended claims.

What is claimed is:

1. An improved method of recognizing descriptive features of characters, which have been scanned with a plurality of sensor cells, from binary representation thereof stored in a memory means, and tracing around the stored character representations, comprising the steps of (a) deriving initial features of a character such as circumference count prior to tracing around the character;

(b) generating a single boundary trace on the boundary of the character to locate character features;

(c) defining the contours of the character without regard to size of the character based upon the character shape and features derived during the boundary trace;

(d) Weighting the derived features; and (e) generating a character code based upon the weighted features of the character.

2. The method according to claim 1 including the step of generating during the single boundary trace first signals representing the outer boundaries and inner loops of said character by a vector slope analysis means in communication with said memory means.

3. The method according to claim 2 including the steps of generating second signals which are vector representations of said boundaries by a trace control means receiving said first signals, each of said representations comprising one of a set of a plurality of equal divergent vectors and generating a set of indicia representative of said characters based upon averages of selected sets of said second signals by said trace control means.

4. An improved method of recognizing descriptive features of characters derived from tracing around stored character representation, which have been scanned with a plurality of sensor cells, from binary representations thereof stored in a memory means comprising the steps of:

(a) deriving the initial features of circumference, area and stroke width of each character.

(b) generating without regard to size during a single trace weighted features representative to the character;

(c) determining the slope of the generated features; and (d) deriving a character code based upon the weighted features, slope of the features and sequence of the features representative of the character.

5. An improved method of recognizing descriptive features of characters by tracing around the circumference thereof, which had been scanned with a plurality of sensor cells, from binary representations thereof stored in a memory means comprising the steps of:

(a) generating an initial set of weighted features representative of the scanned character including stroke width, area and measurement of the circumference prior to tracing around the character;

(b) tracing around the character a single time to detect a set of roadmap features;

(c) calculating feature data based upon the initial features and the roadmap features;

(d) storing the calculated feature data; and (e) presenting the data to a decision tree to make a character decision.

* * * * *